United States Patent
Morikawa et al.

(10) Patent No.: US 7,877,576 B2
(45) Date of Patent: Jan. 25, 2011

(54) PROCESSING SYSTEM HAVING CO-PROCESSOR FOR STORING DATA

(75) Inventors: Toru Morikawa, Osaka (JP); Jiro Miyake, Osaka (JP); Hiroyuki Mizohata, Osaka (JP)

(73) Assignee: Panasonic Corporation, Osaka (JP)

( * ) Notice: Subject to any disclaimer, the term of this patent is extended or adjusted under 35 U.S.C. 154(b) by 527 days.

(21) Appl. No.: 12/033,538

(22) Filed: Feb. 19, 2008

(65) Prior Publication Data

US 2008/0313429 A1    Dec. 18, 2008

(30) Foreign Application Priority Data

Jun. 15, 2007  (JP) .............................. 2007-159388

(51) Int. Cl.
G06F 15/00  (2006.01)
G06F 15/76  (2006.01)
(52) U.S. Cl. ....................................................... 712/34
(58) Field of Classification Search .................... 712/34
See application file for complete search history.

(56) References Cited

U.S. PATENT DOCUMENTS

| | | |
|---|---|---|
| 5,881,257 A | 3/1999 | Glass et al. |
| 5,909,565 A | 6/1999 | Morikawa et al. |
| 5,983,338 A * | 11/1999 | Moyer et al. ................... 712/34 |
| 6,434,689 B2 * | 8/2002 | Fleck et al. ..................... 712/34 |
| 2006/0010305 A1 | 1/2006 | Maeda et al. |

* cited by examiner

*Primary Examiner*—Eddie P Chan
*Assistant Examiner*—Corey Faherty
(74) *Attorney, Agent, or Firm*—McDermott Will & Emery LLP

(57) ABSTRACT

When an interruption instruction occurs in an information processing apparatus including a CPU and a coprocessor, execution of a single dedicated instruction "GETACX Dm,Dn" performs saving of necessary data from all registers. "Dm" is a value output from a general register group 104 to a first data input bus 120. Each of calculation units implemented in a coprocessor 110 recognizes a value stored therein. If a value "Dm" specifies one of the calculation units, the specified calculation unit outputs, to a selector 116, data stored in a register included in the specified calculation unit. An implemented calculation unit information output circuit 117 stores therein the count of the calculation units implemented in the coprocessor 110. If a value of the first data input bus 120 is greater than the count of the calculation units, the implemented calculation unit information output circuit 117 outputs a value "1" to a flag register 102. Based on the fact that the value stored on the flag register 102 is "1", a CPU 100 recognizes that saving of the data from the register has been completed.

15 Claims, 29 Drawing Sheets

FIG. 2

| MNEMONIC | OPERATION OF CPU | OPERATION OF COPROCESSOR |
|---|---|---|
| MULQ Dm, Dn | GENERAL REGISTER Dm<br>→FIRST DATA INPUT BUS 120<br>GENERAL REGISTER Dn<br>→SECOND DATA INPUT BUS 121<br>DATA OUTPUT BUS 122<br>→GENERAL REGISTER Dn<br>OR CIRCUIT 118<br>→FLAG REGISTER 102 | FIRST DATA INPUT BUS 120<br>→MULTIPLICAND a<br>SECOND DATA INPUT BUS 121<br>→MULTIPLIER b<br>CALCULATE a × b<br>HIGHER BITS OF MULTIPLICATION RESULT<br>→FIRST CALCULATION RESULT STORAGE<br>  REGISTER 113<br>LOWER BITS OF MULTIPLICATION RESULT<br>→DATA OUTPUT BUS 122 |
| DIVQ Dm, Dn | GENERAL REGISTER Dm<br>→FIRST DATA INPUT BUS 120<br>GENERAL REGISTER Dn<br>→SECOND DATA INPUT BUS 121<br>DATA OUTPUT BUS 122<br>→GENERAL REGISTER Dn<br>OR CIRCUIT 118<br>→FLAG REGISTER 102 | FIRST DATA INPUT BUS 120<br>→DIVIDEND a<br>SECOND DATA INPUT BUS 121<br>→DIVISOR b<br>CALCULATE a ÷ b<br>SURPLUS<br>→SECOND CALCULATION RESULT STORAGE<br>  REGISTER 115<br>QUOTIENT<br>→DATA OUTPUT BUS 122 |
| GETACX Dm, Dn | GENERAL REGISTER Dm<br>→FIRST DATA INPUT BUS 120<br>GENERAL REGISTER Dn<br>→SECOND DATA INPUT BUS 121<br>DATA OUTPUT BUS 122<br>→GENERAL REGISTER Dn<br>OR CIRCUIT 118<br>→FLAG REGISTER 102 | FIRST DATA INPUT BUS 120<br>→CALCULATION UNIT SPECIFICATION NUMBER<br><br>CALCULATION UNIT SPECIFICATION NUMBER = 0<br>·OUTPUT VALUE OF FIRST CALCULATION RESULT<br>  STORAGE REGISTER 113 TO DATA OUTPUT BUS 122<br>·IMPLEMENTED CALCULATION UNIT INFORMATION<br>  OUTPUT CIRCUIT 117 = 0<br><br>CALCULATION UNIT SPECIFICATION NUMBER = 1<br>·OUTPUT VALUE OF SECOND CALCULATION RESULT<br>  STORAGE REGISTER 115 TO DATA OUTPUT BUS 122<br>·IMPLEMENTED CALCULATION UNIT INFORMATION<br>  OUTPUT CIRCUIT 117 = 1 |
| PUTACX Dm, Dn | GENERAL REGISTER Dm<br>→FIRST DATA INPUT BUS 120<br>GENERAL REGISTER Dn<br>→SECOND DATA INPUT BUS 121<br>OR CIRCUIT 118<br>→FLAG REGISTER 102 | FIRST DATA INPUT BUS 120<br>→CALCULATION UNIT SPECIFICATION NUMBER<br><br>CALCULATION UNIT SPECIFICATION NUMBER = 0<br>·STORE VALUE OF SECOND DATA INPUT BUS 121<br>  IN FIRST CALCULATION RESULT STORAGE<br>  REGISTER 113<br>·IMPLEMENTED CALCULATION UNIT INFORMATION<br>  OUTPUT CIRCUIT 117 = 0<br><br>CALCULATION UNIT SPECIFICATION NUMBER = 1<br>·STORE VALUE OF SECOND DATA INPUT BUS 121<br>  IN SECOND CALCULATION RESULT STORAGE<br>  REGISTER 115<br>·IMPLEMENTED CALCULATION UNIT INFORMATION<br>  OUTPUT CIRCUIT 117 = 1 |

FIG. 3

| MNEMONIC | OPERATION OF CPU | OPERATION OF RAM |
|---|---|---|
| MOV Dm, (SP) | SP STORAGE REGISTER 103 →OUTPUT ADDRESS TO RAM 140 GENERAL REGISTER Dm →FIRST DATA INPUT BUS 120 →OUTPUT DATA TO RAM 140 | WRITE INPUT DATA INTO MEMORY REGION AT INPUT ADDRESS |
| MOV (SP), Dn | SP STORAGE REGISTER 103 →OUTPUT ADDRESS TO RAM 140 DATA OUTPUT BY RAM 140 →DATA OUTPUT BUS 122 →GENERAL REGISTER Dn | OUTPUT DATA OUTPUT FROM MEMORY REGION AT INPUT ADDRESS |
| MOV #<Immediate>, Dn | IMMEDIATE DATA OF ROM 130 →DATA OUTPUT BUS 122 →GENERAL REGISTER Dn | NOT OPERATE |
| INC Dm | GENERAL REGISTER Dm →STORE VALUE INCREMENTED BY 1 | NOT OPERATE |
| INC SP | STORE VALUE OF SP STORAGE REGISTER 103 INCREMENTED BY CONSTANT VALUE | NOT OPERATE |
| Bcc <Label> | IF VALUE STORED IN FLAG REGISTER 102 IS "0", BRANCH TO ADDRESS OF LABEL | NOT OPERATE |
| CLR Dm | GENERAL REGISTER Dm →STORE VALUE "0" | NOT OPERATE |
| RTI | BRANCH TO INSTRUCTION FOLLOWING INSTRUCTION BEING EXECUTED AT OCCURRENCE OF INTERRUPTION | NOT OPERATE |

FIG. 8

| MNEMONIC | OPERATION OF CPU | OPERATION OF RAM |
|---|---|---|
| CMP Dm, Dn | COMPARE VALUE OF Dm WITH VALUE OF Dn, AND STORE COMPARISON RESULT IN FLAG REGISTER 102 | NOT OPERATE |

FIG. 12

| MNEMONIC | OPERATION OF CPU | OPERATION OF COPROCESSOR |
|---|---|---|
| MAC Dm, Dn | GENERAL REGISTER Dm →FIRST DATA INPUT BUS 120 GENERAL REGISTER Dn →SECOND DATA INPUT BUS 121 | FIRST DATA INPUT BUS 120 →MULTIPLICAND a SECOND DATA INPUT BUS 121 →MULTIPLIER b THIRD CALCULATION RESULT STORAGE REGISTER 315 → SUM c CALCULATE a × b + c CALCULATION RESULT →THIRD CALCULATION RESULT STORAGE REGISTER 315 |

FIG. 13

| MNEMONIC | OPERATION OF CPU | OPERATION OF RAM |
|---|---|---|
| MOV Dm, Dn | STORE VALUE OF Dm IN Dn | NOT OPERATE |
| AND #<Immediate>, Dm | CALCULATE LOGICAL MULTIPLICATION OF IMMEDIATE DATA OF ROM 140 AND VALUE OF Dn, AND STORE CALCULATION RESULT IN Dn | NOT OPERATE |

FIG. 17

| MNEMONIC | OPERATION OF CPU | OPERATION OF COPROCESSOR |
|---|---|---|
| PUTLVL Dm, Dn | GENERAL REGISTER Dm →FIRST DATA INPUT BUS 120 GENERAL REGISTER Dn →SECOND DATA INPUT BUS 121 | FIRST DATA INPUT BUS 120 →STORE DATA IN SAVING LEVEL CORRESPONDENCE CALCULATION UNIT INFORMATION OUTPUT CIRCUIT →DETERMINE THE COUNT OF REGISTERS FROM/TO WHICH DATA IS TO BE SAVED/RESTORED |

FIG. 21

| MNEMONIC | OPERATION OF CPU | OPERATION OF COPROCESSOR |
|---|---|---|
| PUTTSK Dm, Dn | GENERAL REGISTER Dm →FIRST DATA INPUT BUS 120 GENERAL REGISTER Dn →SECOND DATA INPUT BUS 121 | FIRST DATA INPUT BUS 120 →STORE TASK NUMBER IN EXECUTION TASK MANAGEMENT CIRCUIT →CLEAR VALUE OF EXTENDED CALCULATION EXECUTION FLAG REGISTER |
| EXTENDED CALCULATION INSTRUCTION OTHER THAN "GETACX" | — | SET VALUE OF EXTENDED CALCULATION EXECUTION FLAG REGISTER TO BE "1" |

FIG. 24

| MNEMONIC | OPERATION OF CPU | OPERATION OF COPROCESSOR |
|---|---|---|
| GETACX Dm, Dn | GENERAL REGISTER Dm →FIRST DATA INPUT BUS 120<br>GENERAL REGISTER Dn →SECOND DATA INPUT BUS 121<br>DATA OUTPUT BUS 122 →GENERAL REGISTER Dn<br>REGISTER ACCESS MANAGEMENT CIRCUIT →FLAG REGISTER 102 | FIRST DATA INPUT BUS 120 →CALCULATION UNIT SPECIFICATION NUMBER<br><br>ACCESS MANAGEMENT VALUE = 1<br>·OUTPUT VALUE OF FIRST CALCULATION RESULT STORAGE REGISTER TO DATA OUTPUT BUS 122<br>·FLAG OUTPUT BY REGISTER ACCESS MANAGEMENT CIRCUIT = 1<br><br>ACCESS MANAGEMENT VALUE = 0<br>·OUTPUT VALUE OF FIRST CALCULATION RESULT STORAGE REGISTER TO DATA OUTPUT BUS 122<br>·FLAG OUTPUT BY REGISTER ACCESS MANAGEMENT CIRCUIT = 0 |

FIG. 25

| MNEMONIC | OPERATION OF CPU | OPERATION OF RAM |
|---|---|---|
| MOV Flag, Dn | STORE FLAG VALUE IN Dn | NOT OPERATE |
| MOV Dm, Flag | STORE VALUE OF Dn IN FLAG REGISTER | NOT OPERATE |

FIG. 28

| MNEMONIC | OPERATION OF CPU | OPERATION OF COPROCESSOR |
|---|---|---|
| GETSTT Dm, Dn | GENERAL REGISTER Dm<br>→FIRST DATA INPUT<br>  BUS 120<br>GENERAL REGISTER Dn<br>→SECOND DATA INPUT<br>  BUS 121<br>DATA OUTPUT BUS 122<br>→GENERAL REGISTER Dn | EXECUTION INFORMATION OF<br>REGISTER ACCESS STATUS<br>MANAGEMENT CIRCUIT<br>→FIRST DATA INPUT BUS 120 |
| PUTSTT Dm, Dn | GENERAL REGISTER Dm<br>→FIRST DATA INPUT<br>  BUS 120<br>GENERAL REGISTER Dn<br>→SECOND DATA INPUT<br>  BUS 121 | FIRST DATA INPUT BUS 120<br>→STORE EXECUTION INFORMATION<br>  IN REGISTER ACCESS STATUS<br>  MANAGEMENT CIRCUIT |

```
  MOV D3, D2
  AND #0b0001, D2
  MOV #0b0001, D1
  CMP D1, D2
  Bcc <Label_1>
  INC SP
  GETACX D0, D1
  MOV D1, (SP)

Label_1 :
  INC D0
  MOV D3, D2
  AND #0b0010, D2
  MOV #0b0010, D1
  CMP D1, D2
  Bcc <Label_2>
  INC SP
  GETACX D0, D1
  MOV D1, (SP)

Label_2 :

.
    .
    .

STORE SP INITIAL VALUE
  MOV D3, D2
  AND #0b0001, D2
  MOV #0b0001, D1
  CMP D1, D2
  Bcc <Label_3>
  INC SP
  MOV (SP), D1
  PUTACX D0, D1

Label_3 :
  INC D0
  MOV D3, D2
  AND #0b0010, D2
  MOV #0b0010, D1
  CMP D1, D2
  Bcc <Label_4>
  INC SP
  MOV (SP), D1
  PUTACX D0, D1

Label_4 :
```

PROCESSING SYSTEM HAVING CO-PROCESSOR FOR STORING DATA

BACKGROUND OF THE INVENTION (1) Field of the Invention

The present invention relates to an information processing apparatus composed of a CPU and a coprocessor. The present invention particularly relates to saving of data relating to a calculation performed by the coprocessor and restoration of the saved data.

(2) Related Art

Some of information processing apparatuses have a CPU and a coprocessor coupled to the CPU for improving the basic capability of the information processing apparatus.

As an example of such an information processing apparatus, Patent Document 1 (Japanese Patent No. 2987308) discloses an information processing apparatus having a CPU that mainly operates to perform processing and a coprocessor that is physically coupled to the CPU and performs particular calculations. The coprocessor decodes an instruction that is the same as an instruction the CPU decodes. If the decoded instruction is executable, the coprocessor performs a calculation when data relating to the calculation is given from the CPU. The coprocessor outputs a result of the calculation to the CPU. While the coprocessor performs the calculation, the CPU executes another instruction. Accordingly, the basic capability of the information processing apparatus is improved.

By manufacturing a coprocessor having a different structure according to purpose and coupling such a coprocessor to the CPU, it is possible to easily improve the capability of the information processing apparatus without modifying the physical structure of the CPU. Also, since only the structure of the coprocessor needs to be modified according to purpose, it is possible to reduce a time period required for developing the information processing apparatus compared with a case where a new information processing apparatus designed exclusively for an intended purpose is manufactured.

Here, the coprocessor of the information processing apparatus disclosed in the Patent Document 1 temporarily stores data required for a calculation and calculation result data in a register included in the coprocessor. When an interruption occurs while the information processing apparatus performs normal processing, the coprocessor might perform a calculation and write a result of the calculation or the like over data stored in the register. Accordingly, it is necessary to save, from the register, the data relating to a calculation that has been executed before the interruption is occurred.

In order to handle the interruption, a dedicated instruction for saving data from a register is necessary. Also, after an interruption instruction has been executed, the saved data needs to be restored. Accordingly, an instruction for restoring the saved data is also necessary. As disclosed in the Patent Document 1, a dedicated instruction for directly specifying a register from which data is to be output may be generated for each register. However, the count of extended calculation instructions executable by the coprocessor is limited. Types of calculations executable by the coprocessor are expected to increase in the future. With this increase, the count of registers needs to be increased. In such a case, if a dedicated extended calculation instruction is allotted to each register, the count of dedicated extended calculation instructions will become too many.

SUMMARY OF THE INVENTION

In view of the above problem, the present invention aims to provide an information processing apparatus that includes a CPU and a coprocessor and can realize saving of data from registers and restoration of the saved data to the registers without uselessly increasing the count of dedicated instructions.

In order to solve the above problem, the information processing apparatus according to the present invention is an information processing apparatus that comprises a CPU that sequentially decodes and executes instructions included in an instruction sequence to perform calculations, and a coprocessor that is connected with the CPU via a first bus and a second bus, includes one or more registers for storing therein data relating to the calculations, decodes any of the instructions that is being decoded by the CPU in parallel with the CPU, performs a calculation relating to the any of the instructions based on data output from the CPU to the first bus, and outputs a result of the calculation to the second bus, the CPU including an information acquisition unit operable to, if an instruction to be decoded is an acquisition instruction for acquiring data stored in any of the registers, output a piece of register information designating the any of the registers to the first bus, and acquire the data stored in the any of the registers via the second bus, and the coprocessor including: a saving register specification unit operable to, if an instruction to be decoded is the acquisition instruction, acquire the piece of register information via the first bus, and specify, based on the acquired piece of register information, the register from which the data is to be saved; and a data output unit operable to output, to the second bus, the data stored in the register specified by the saving register specification unit.

EFFECT OF THE INVENTION

With the above structure, only a single acquisition instruction is required for the coprocessor to specify a register based on a piece of register information that is output by the CPU to the first bus, and for the CPU to acquire data from the specified register. According to this structure, only one instruction is used as an extended calculation instruction that is executable by the coprocessor for acquiring the data from the register. Therefore, it is possible to save data from all the registers of the coprocessor, with use of the minimum count of instructions.

Also, the information processing apparatus may further include a signal line for outputting, from the coprocessor to the CPU, a flag in accordance with the result of the calculation performed by the coprocessor, wherein the CPU may further include a holding unit operable to hold therein a flag, receive a flag indicating whether the data has been saved, from the coprocessor via the signal line, and replace the flag held therein with the received flag, the information acquisition unit may output, as the piece of register information, a register number for designating the register to the first bus, with incrementing the register number by 1 at every output, the coprocessor may further include an output unit operable to compare a total count of registers from which data is to be saved with a register number output to the first bus, and, if the register number is no less than the total count, output the flag indicating that the data has been saved, and when the flag held in the holding unit indicates that the data has been saved, the information acquisition unit may stop outputting the register number to the first bus.

According to the above structure, a register number is assigned to each of the registers of the coprocessor. The CPU outputs a register number to the first bus. Based on the output register number, the coprocessor can specify a register. This simple structure realizes saving of data from all the registers. Also, when the register number matches the count of registers that is stored in the coprocessor, the coprocessor outputs, to the CPU, a signal indicating that the register number matches the count of the registers. Therefore, the CPU can easily detect a time when saving of the data has been completed. Furthermore, according to conventional arts, the CPU stores, in a flag register thereof, data relating to a result of a calculation performed by the coprocessor such as plus/minus data of a result of a calculation. This flag register is also used as a flag register that stores therein a flag indicating whether saving of data has been completed. Therefore, the resources that have been conventionally used can be effectively used.

Also, the first bus may be composed of at least a first input bus and a second input bus each for transmitting a different type of data, the CPU may further include: a recording unit operable to sequentially record, to every N-th storage address value of a memory that is connected to the CPU, the data acquired by the information acquisition unit via the second bus, the N being a predetermined value; and a restoration direction unit operable to, if an instruction to be decoded is a restoration instruction for restoring the data that has been saved, read the data from the memory, output the read data to the first input bus, and output the register number for designating the register to the second input bus, and the coprocessor may further include: a restoration register specification unit operable to, if an instruction to be decoded is the restoration instruction, acquire the register number via the second input bus, and specify, based on the acquired register number, the register from which the data has been saved; and a restoration unit operable to restore, to the register specified by the restoration register specification unit, the data acquired via the first input bus.

According to the above structure, by using the restoration instruction that is a single extended calculation instruction, it is possible to restore data that has been saved. In other words, by using the single restoration instruction, it is possible to restore, to a state in which the acquisition instruction has not yet been executed, a state of data saved in accordance with the acquisition instruction.

Also, the coprocessor may further include: a first register count storage unit operable to store therein a total count of the registers; a register count output unit operable to output the total count to the CPU via the second bus, the CPU may further include a second register count storage unit operable to store therein the total count that has been output by the first register count output unit, the information acquisition unit may sequentially outputs, as the piece of register information, a register number for designating the any of the registers, to the first bus, with incrementing the register number by 1 at every output, and when the register number matches the total count stored in the second register count storage unit, the information acquisition unit may stop outputting the register number to the first bus.

According to the above structure, the coprocessor transmits the count of registers included therein to the CPU. Accordingly, the CPU can recognize the count of the registers from which data needs to be saved in accordance with the acquisition instruction, without inquiring the coprocessor for the count of the registers, so as to save data from all the registers.

Also, when the information processing apparatus is reset, the first register count output unit may output the total count to the CPU.

According to the above structure, at a time when the information processing apparatus is reset at start-up or based on a user's reset operation for example, the CPU can acquire information relating to the count of the registers from the coprocessor. When the information processing apparatus is reset, no calculation is performed in the coprocessor and no data relating to a calculation is stored in a register of the coprocessor. Accordingly, at this time, the coprocessor stores information relating to the count of the registers in a register for storing calculation results. Then, the CPU stores therein the information that is output from the register. In this way, when the information processing apparatus is reset, the information relating to the count of the registers is transmitted to the CPU. Accordingly, it is possible to efficiently save data from the coprocessor at any time.

Also, the coprocessor may include a calculation unit information output unit operable to output calculation unit information indicating a type of one or more calculation units that are implemented in the coprocessor, the CPU may further include: a calculation unit information storage unit operable to store therein the calculation unit information; and a determination unit operable to determine, based on the calculation unit information, a piece of register information to be output, and the information acquisition unit may output, to the first bus, the piece of register information determined by the determination unit.

According to the above structure, based on information indicating what type of a calculation unit is implemented in the coprocessor, the CPU can efficiently output, to the coprocessor, register information for saving data from a register.

Accordingly, even if the CPU does not store therein information indicating what type of a calculation unit is implemented in the coprocessor, the CPU can acquire the information. Furthermore, the count of necessary registers is different depending on a type of a calculation unit or a type of a calculation. The CPU can specify the count of the necessary registers based on calculation unit information.

Also, when the information processing apparatus is reset, the calculation unit information output unit may output the calculation unit information to the CPU.

According to the above structure, at a time when the information processing apparatus is reset at start-up or based on a user's reset operation for example, the CPU can acquire calculation unit information from the coprocessor. When the information processing apparatus is reset, no calculation is performed in the coprocessor and no data relating to a calculation is stored in a register of the coprocessor. Accordingly, at this time, the coprocessor stores the calculation unit information in a register for storing calculation results. Then, the CPU stores therein the calculation unit information that is output from the register. In this way, when the information processing apparatus is reset, the calculation unit information is transmitted to the CPU. Accordingly, it is possible to efficiently save data from the coprocessor at any time.

Also, when an interruption occurs while processing is being performed, the information processing apparatus may execute the acquisition instruction, the interruption having an interruption level corresponding to processing to be performed in the interruption, the coprocessor may further include: a determination unit operable to determine a count of registers from which data is to be saved, in accordance with the interruption level; and a level correspondence determination unit operable to determine, in accordance with the acquisition instruction, any of the registers from which the data is to be output based on the determined count, and when the determined count of the registers matches a register number output to the first bus, the data output unit may output the flag indicating that the data has been saved. According to the above structure, the information processing apparatus can save data in accordance with an interruption level. When interruption processing is performed, a calculation unit to be used is determined beforehand in accordance with an interruption level. Therefore, depending on interruption level, some of calculation units are not used for interruption processing. In such a case, it is unnecessary to save data from registers included in such calculation units that are not used. With the above structure, it is possible to avoid such an unnecessary saving and improve the processing efficiency.

Also, the coprocessor may be operable to execute a first task and a second task by switching between the first task and the second task, the coprocessor may further include an interruption request unit operable to, when the first task that is being executed is switched to the second task and data relating to a calculation performed in the first task is stored in any of the registers, request the CPU to cause an interruption, in response to the interruption request, the CPU may cause an interruption, and when the CPU causes the interruption, the CPU and the coprocessor may execute the acquisition instruction.

A plurality of different tasks are executed by switching between the tasks. This sometimes causes a necessity for saving data when a calculation is performed during execution of one of the tasks. For example, when a calculation result of a first task is stored in a register and task execution is to be switched from the first task to a second task, the calculation result of the first task needs to be saved. In such a case, the coprocessor requests the CPU to cause an interruption. Accordingly, it is possible to save the data by using the interruption as a trigger, and switch between tasks without writing data of a result of a calculation performed in interruption processing over data of a result of a calculation performed in each task.

Also, the coprocessor may further include: a calculation performance information storage unit operable to store therein calculation performance information indicating whether a calculation has been performed; and a calculation performance information output unit operable to, when the acquisition instruction is decoded, output the calculation performance information to the CPU, when the CPU decodes the acquisition instruction and the calculation performance information indicates that a calculation has been performed in the coprocessor, the CPU may acquire data from any of the registers, and when the CPU decodes the acquisition instruction and the calculation performance information does not indicate that a calculation has been performed in the coprocessor, the CPU may not acquire data from any of the registers.

When no calculation is performed in the coprocessor and no data relating to a calculation is stored in a register of the coprocessor for example, it is unnecessary to save data from the register. According to the above structure, it is possible to avoid such an unnecessary saving.

Also, the calculation performance information storage unit may further store therein register correspondence calculation performance information indicating whether each of the registers stores therein data relating to a calculation, the coprocessor may further include a register correspondence calculation performance information output unit operable to output the register correspondence calculation performance information to the CPU, and when the CPU decodes the acquisition instruction, the CPU may output a register number for specifying any of the registers to the first bus, based on the output register correspondence calculation performance information.

According to the above structure, based on whether each calculation unit has performed a calculation, whether data is stored in a register corresponding to the calculation unit is determined. Accordingly, the coprocessor judges whether data is stored in each register by judging whether a calculation unit corresponding to the register has performed a calculation, and stores therein calculation performance information. When an interruption occurs, the CPU acquires the calculation performance information to perform a calculation, and executes the acquisition instruction to only a register that stores the data therein to save the data. Accordingly, it is possible to avoid an unnecessary execution of the acquisition instruction to a register that stores therein no data, and improve the processing efficiency.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the Drawings:

FIG. 2 is a list showing an example of mnemonics of coprocessor instructions to be read from a ROM 130 by a CPU 100 and a coprocessor 110 and operations of the CPU 100 and operations of the coprocessor 110 corresponding to the mnemonics;

FIG. 3 is a list showing an example of mnemonics of CPU execution instructions to be used by the CPU 100 for saving/restoring data to/from the RAM 140, and operations of the CPU 100 corresponding to the mnemonics;

FIG. 8 is a list showing an example of mnemonics of instructions to be read from the ROM 130 by the CPU 200 for saving/restoring data to/from the RAM 140 and operations of the CPU 200 corresponding to the mnemonics;

FIG. 12 is a list showing an example of mnemonics of coprocessor instructions to be read from the ROM 130 by a CPU 300 and a coprocessor 310, and operations of the CPU 300 and operations of the coprocessor 310 corresponding to the mnemonics;

FIG. 13 is a list showing an example of mnemonics of instructions to be used by the CPU 300 for saving/restoring data to/from the RAM 140 and operations of the CPU 300 corresponding to the mnemonics;

FIG. 17 is a list showing an example of mnemonics of coprocessor instructions to be read from the ROM 130 by the CPU 400 and a coprocessor 410 and operations of the CPU 400 and operations of the coprocessor 410 corresponding to the mnemonics;

FIG. 21 is a list showing an example of mnemonics of coprocessor instructions to be read from the ROM 130 by a CPU 500 and a coprocessor 510, operations of the CPU 500, and operations of the coprocessor 510;

FIG. 24 is a list showing an example of mnemonics of coprocessor instructions to be read from the ROM 130 by a CPU 600 and a coprocessor 610 and operations of the CPU 600 and operations of the coprocessor 610 corresponding to the mnemonics;

FIG. 25 is a list showing an example of mnemonics of instructions to be used by the CPU 600 for saving/restoring data to/from the RAM 140 and operations of the CPU 600;

FIG. 28 is a list showing an example of mnemonics of coprocessor instructions to be read from the ROM 130 by a CPU 700 and a coprocessor 710 and operations of the CPU 700 and operations of the coprocessor 710 corresponding to the mnemonics;

FIG. 30 shows an instruction sequence representing an example of an assembler program according to the seventh embodiment.

Figure 1:
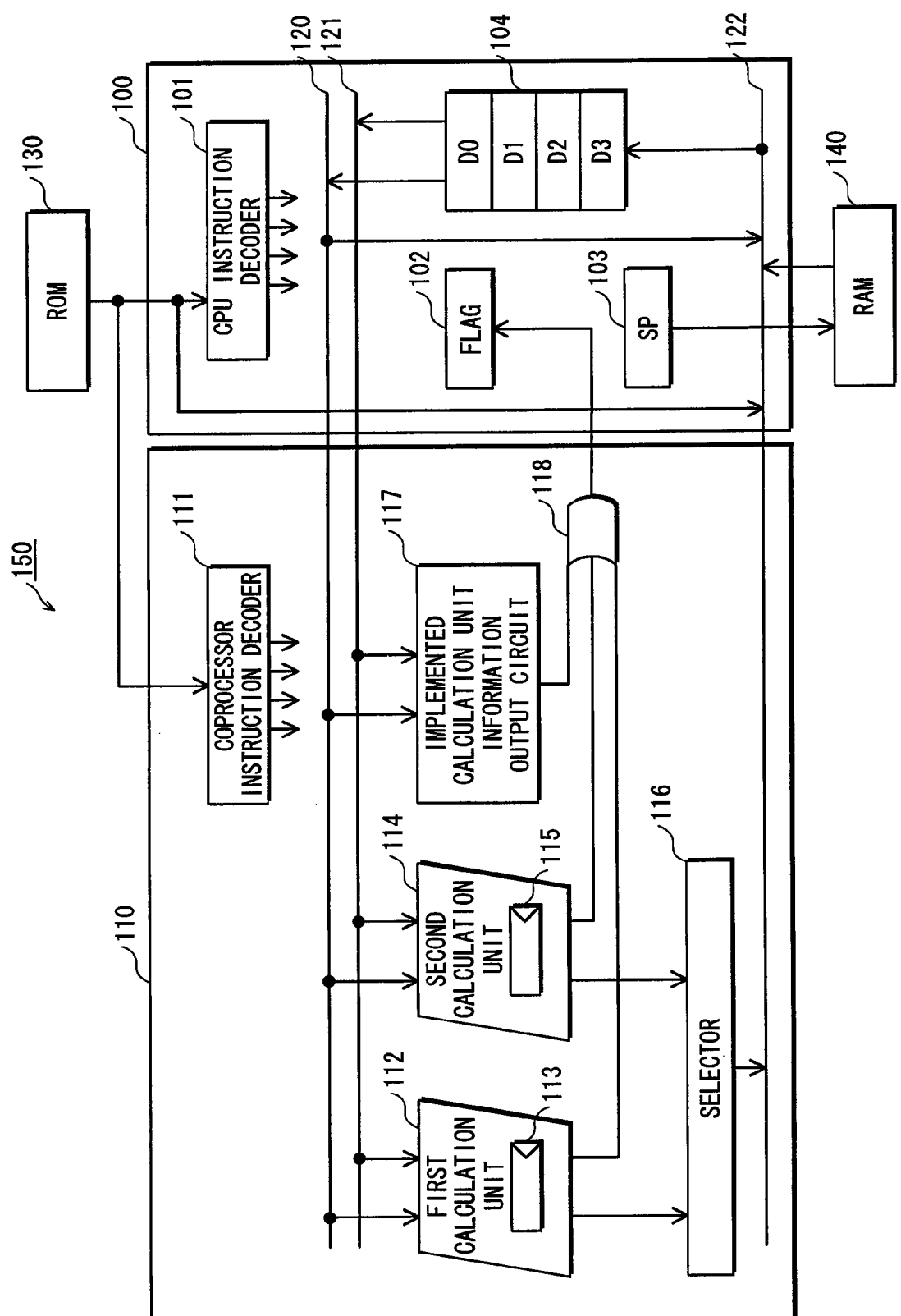
FIG. 1 is a block diagram showing the functional structure of an information processing apparatus 150 according to a first embodiment.

DESCRIPTION OF THE NUMERALS 100, 200, 300, 400, 500, 600, and 700: CPU
101: CPU instruction decoder
102, 202, 602, and 702: flag register
103: stack pointer storage register
104, 604, and 704: general register group
110, 210, 310, 410, 510, 610, and 710: coprocessor
111: coprocessor instruction decoder
112: first calculation unit
113, 213, and 313: first calculation result storage register
114: second calculation unit
115: second calculation result storage register
116 and 716: selector
117 and 417: implemented calculation unit information output circuit
118: OR circuit
120: first data input bus
121: second data input bus
122: data output bus
130: ROM
140: RAM
150, 250, 350, 450, 550, 650, and 750: information processing apparatus
211: register count generator
311: register information generator
517: execution task management circuit
518: extended calculation execution flag register
617: register access management circuit
717: register access status management circuit

DESCRIPTION OF THE PREFERRED EMBODIMENTS

The following describes an information processing apparatus as one embodiment of the present invention with reference to the drawings.

First Embodiment

Structure

FIG. 1 shows the functional structure of an information processing apparatus according to the present invention. An information processing apparatus 150 includes, as shown in FIG. 1, a CPU (Central Processing Unit) 100, a coprocessor 110, a ROM (Read Only Memory) 130, and a RAM (Random Access Memory) 140. Here, the information processing apparatus 150 is a 32-bit microcomputer.

The CPU 100 outputs an instruction address, and performs various information processing in accordance with instructions output by the ROM 130. The CPU 100 includes a CPU instruction decoder 101, a flag register 102, a stack pointer (SP) storage register 103, a general register group 104, a first data input bus 120, a second data input bus 121, and a data output bus 122. The first data input bus 120, the second input data bus 121, and the data output bus 122 are each a 32-bit data line.

The CPU instruction decoder 101 decodes instructions output by the ROM 130, and outputs various control signals to each circuit included in the CPU 100 in accordance with the decoded instructions. Note that arrows drawn from the CPU instruction decoder 101 in FIG. 1 represent that the CPU instruction decoder 101 is capable of outputting control signals to all the components of the CPU 100. The arrows shown in FIG. 1 are not directly connected to all the functional components of the CPU 100 from the CPU instruction decoder 101 for clear viewing of the drawing.

The flag register 102 stores therein calculation result flags of the CPU 100 and the coprocessor 110. Also, the flag register 102 stores therein a flag that indicates whether saving of data from a register of the coprocessor 110 has been completed. This flag is used when an interruption occurs during execution of an instruction. Furthermore, the flag register 102 stores therein a flag that indicates whether restoration of data to a register of the coprocessor 110 has been completed. This flag is used when the data that had been saved from the register of the coprocessor 110 due to an interruption is restored.

The stack pointer storage register 103 outputs, as an address value, a value stored therein to the RAM 140, in accordance with a control signal output by the CPU instruction decoder 101. Also, in accordance with a control signal output by the CPU instruction decoder 101, the stack pointer storage register 103 increments or decrements a value stored therein by a constant value, and stores therein the incremented or decremented value.

The general register group 104 stores therein calculation input/output values of the CPU 100 and the coprocessor 110. Each register of the general register group 104 stores therein 32-bit data.

The coprocessor 110 performs various information processing in accordance with instructions output by the ROM 130. The coprocessor 110 includes a coprocessor instruction decoder 111, a first calculation unit 112, a first calculation result storage register 113, a second calculation unit 114, a second calculation result storage register 115, a selector 116, an implemented calculation unit information output circuit 117, and an OR circuit 118.

The coprocessor instruction decoder 111 decodes instructions output by the ROM 130, and outputs various control signals to each circuit included in the coprocessor 110 in accordance with the decoded instructions. Note that arrows drawn from the coprocessor instruction decoder 111 in FIG. 1 represent that the coprocessor instruction decoder 111 is capable of outputting control signals to all the components of the coprocessor 110. The arrows shown in FIG. 1 are not directly connected to all the functional components of the coprocessor 110 from the coprocessor instruction decoder 111 for clear viewing of the drawing.

The first calculation unit 112 is a multiplier. In accordance with a control signal output by the coprocessor instruction decoder 111, the first calculation unit 112 acquires two pieces of data respectively transmitted via the first data input bus 120 and the second data input bus 121. Then, the first calculation unit 112 performs a multiplication of the two pieces of data acquired from the first data input bus 120 and the second data input bus 121. The bit count of the multiplication result of the two pieces of 32-bit data is 64 bits at a maximum. Accordingly, the first calculation unit 112 stores the higher 32 bits of the 64 bits in the first calculation result storage register 113, and outputs the lower 32 bits of the 64 bits to the selector 116. Also, the first calculation unit 112 outputs a calculation result flag indicating, for example, that a calculation result is negative to the OR circuit 118. Moreover, in accordance with a control signal output by the coprocessor instruction decoder 111, the first calculation unit 112 outputs data of the first calculation result storage register 113. Furthermore, in accordance with a control signal output by the coprocessor instruction decoder 111, the first calculation unit 112 stores therein a value of the second data input bus 121.

The first calculation result storage register 113 stores therein data relating to calculations performed in the first calculation unit 112.

The second calculation unit 114 is a divider. In accordance with a control signal output by the coprocessor instruction decoder 111, the second calculation unit 114 performs a division of two pieces of data respectively transmitted via the first data input bus 120 and the second data input bus 121. The second calculation unit 114 outputs a remainder of the division to the second calculation result storage register 115, and outputs a quotient of the division to the selector 116. Moreover, the second calculation unit 114 outputs a calculation result flag indicating for example a calculation overflow to the OR circuit 118. Moreover, in accordance with a control signal output by the coprocessor instruction decoder 111, the second calculation unit 114 outputs data of the second calculation result storage register 115. Furthermore, in accordance with a control signal output by the coprocessor instruction decoder 111, the second calculation unit 114 stores therein a value of the second data input bus 121.

The second calculation result storage register 115 stores therein data relating to calculations performed in the second calculation unit 114.

In accordance with a control signal output by the coprocessor instruction decoder 111, the selector 116 selects any of a calculation result value of the first calculation unit 112, an output value of the first calculation result storage register 113, a calculation result value of the second calculation unit 114, and an output value of the second calculation result storage register 115, and then outputs the selected value to the data output bus 122.

The implemented calculation unit information output circuit 117 stores therein the count of calculation units that are implemented in the coprocessor 110 (the count of calculation units in the first embodiment is two). In accordance with a control signal output by the coprocessor instruction decoder 111, the implemented calculation unit information output circuit 117 compares a value acquired via the first data input bus 120 with the count of calculation units stored therein. If the acquired value is no less than the count of calculation units, the implemented calculation unit information output circuit 117 outputs a flag value "1". If the input value is less than the count of calculation units, the implemented calculation unit information output circuit 117 outputs a flag value "0". Here, the implemented calculation unit information output circuit 117 stores therein a value "1" as the count of calculation units. This value "1" is smaller by 1 than the actual count of calculation units "2". This is because a value "0" is considered as one value.

The OR circuit 118 outputs an OR of a calculation result flag output by the first calculation unit 112, a calculation result flag output by the second calculation unit 114, and a value output by the implemented calculation unit information output circuit 117.

This completes the description of the functions of the compositional units included in the information processing apparatus 150.

<Command>

The following describes various instructions to be decoded and executed by the CPU instruction decoder 101 and the coprocessor instruction decoder 111.

<Extended Calculation Instruction>

First, the following describes an extended calculation instruction to be read and executed by both of the CPU 100 and the coprocessor 110.

FIG. 2 is a list showing the correspondence between extended calculation instructions and operations of the CPU 100 and the coprocessor 110. The extended calculation instructions are read from the ROM 130 by the CPU 100 and the coprocessor 110. Based on the list, the instructions and the operations of the CPU 100 and the coprocessor 110 in the execution of the instructions are described. The above "acquisition instruction" and the "restoration instruction" described in the "EFFECT OF THE INVENTION" respectively correspond to instructions "GETACX Dm,Dn" and "PUTACX Dm,Dn" shown in the list.

<Instruction "MULQ Dm,Dn">

An instruction "MULQ Dm,Dn" is an extended calculation instruction for the coprocessor 110 to perform a multiplication.

The CPU 100 reads the instruction "MULQ Dm,Dn" from the ROM 130. Then, the CPU instruction decoder 101 decodes the read instruction "MULQ Dm,Dn", and outputs a control signal to each circuit included in the CPU 100. Here, "m" and "n" are each a register number of a register included in the general register group 104 specified by an operand of the instruction. "Dm" is a value stored in an m-th register of the general register group 104, and "Dn" is a value stored in an n-th register of the general register group 104. The definitions of "m", "n", "Dm", and "Dn" that are made here are also applied to the subsequent descriptions.

Moreover, when the CPU instruction decoder 101 reads and decodes the instruction "MULQ Dm,Dn", the coprocessor instruction decoder 111 reads the instruction "MULQ Dm,Dn" from the ROM 130 and decodes the read instruction "MULQ Dm,Dn" at the same time. Then, the coprocessor instruction decoder 111 outputs a control signal to each circuit included in the coprocessor 110.

In accordance with the control signal, the general register group 104 outputs Dm to the first data input bus 120, and outputs Dn to the second data input bus 121.

The first calculation unit 112 reads Dm of the first data input bus 120, and reads Dn of the second data input bus 121. Then, the first calculation unit 112 performs a multiplication of Dm as a multiplicand and Dn as a multiplier. The first calculation unit 112 stores the higher bits of a multiplication result in the first calculation result storage register 113, and outputs the lower bits of the multiplication result to the selector 116, and outputs a calculation result flag to the OR circuit 118.

In accordance with the control signal output by the coprocessor instruction decoder 111, the selector 116 selects the output value of the first calculation unit 112, and outputs the selected output value to the data output bus 122. The CPU 100 stores, in the n-th register of the general register group 104, the lower bits of the multiplication result that has been output to the data output bus 122.

The OR circuit 118 performs an OR of a calculation result flag of the first calculation unit 112, a calculation result flag of the second calculation unit 114, and an output value of the implemented calculation unit information output circuit 117. In this case, the OR circuit 118 outputs the calculation result flag of the first calculation unit 112. Then, the flag register 102 stores therein the calculation result flag of the first calculation unit 112 that has been output by the coprocessor 110.

This completes the description of the instruction "MULQ Dm,Dn".

<Instruction "DIVQ Dm,Dn">

An instruction "DIVQ Dm,Dn" is an extended calculation instruction for the coprocessor 110 to perform a division.

The CPU 100 reads the instruction "DIVQ Dm,Dn" from the ROM 130. Then, the CPU instruction decoder 101 decodes the read instruction "DIVQ Dm,Dn", and outputs a control signal to each circuit included in the CPU 100.

Moreover, when the CPU instruction decoder 101 reads and decodes the instruction "DIVQ Dm,Dn", the coprocessor instruction decoder 111 reads the instruction "DIVQ Dm,Dn" from the ROM 130 and decodes the read instruction "DIVQ Dm,Dn" at the same time. Then, the coprocessor instruction decoder 111 outputs a control signal to each circuit included in the coprocessor 110.

The general register group 104 outputs Dm to the first data input bus 120, and outputs Dn to the second data input bus 121.

The second calculation unit 114 reads Dm of the first data input bus 120, and reads Dn of the second data input bus 121. Then, the second calculation unit 114 performs a division of Dm as a dividend and Dn as a divisor. The second calculation unit 114 stores a remainder of a division result in the second calculation result storage register 115, and outputs a quotient of the division result to the selector 116, and outputs a calculation result flag to the OR circuit 118.

In accordance with the control signal output by the coprocessor instruction decoder 111, the selector 116 selects the output value of the second calculation unit 114, and outputs the selected output value to the data output bus 122. The CPU 100 stores, in the n-th register of the general register group 104, the quotient that has been output to the data output bus 122.

The OR circuit 118 performs an OR of the calculation result flag of the first calculation unit 112, the calculation result flag of the second calculation unit 114, and the output value of the implemented calculation unit information output circuit 117. In this case, the OR circuit 118 outputs the calculation result flag of the second calculation unit 114. Then, the flag register 102 stores therein the calculation result flag of the second calculation unit 114 that has been output by the coprocessor 110.

This completes the description of the instruction "DIVQ Dm,Dn".

<Instruction "GETACX Dm,Dn">

The instruction "GETACX Dm,Dn" is an extended calculation instruction for saving data from a register of the coprocessor 110 when an interruption occurs.

The CPU 100 reads the instruction "GETACX Dm,Dn" from the ROM 130. Then, the CPU instruction decoder 101 decodes the read instruction "GETACX Dm,Dn", and outputs a control signal to each circuit included in the CPU 100.

Also, when the CPU instruction decoder 101 reads and decodes the instruction "GETACX Dm,Dn", the coprocessor instruction decoder 111 reads the instruction "GETACX Dm,Dn" from the ROM 130 and decodes the read instruction "GETACX Dm, Dn" at the same time. Then, the coprocessor instruction decoder 111 outputs a control signal to each circuit included in the coprocessor 110.

In accordance with the control signal, the general register group 104 outputs Dm to the first data input bus 120, and outputs Dn to the second data input bus 121.

The subsequent operations include two cases:

(1) a case where a value is read from the first calculation result storage register 113; and (2) a case where a value is read from the second calculation result storage register 115. Accordingly, the operations of the information processing apparatus 150 in the two cases are described separately.

(1) Case where Value is Read from First Calculation Result Storage Register 113

The first calculation unit 112 reads Dm "0" of the first data input bus 120 indicating the first calculation unit 112. The first calculation unit 112 outputs a value stored in the first calculation result storage register 113 to the selector 116. In accordance with the control signal output by the coprocessor instruction decoder 111, the selector 116 selects the output value of the first calculation result storage register 113, and outputs the selected value to the data output bus 122.

In accordance with the control signal output by the coprocessor instruction decoder 111, the implemented calculation unit information output circuit 117 compares the value acquired from the first data input bus 120 with the count of calculation units stored therein. The value "0" is smaller than the count of calculation units "1", and therefore the implemented calculation unit information output circuit 117 outputs a flag value "0". The OR circuit 118 performs an OR of the calculation result flag of the first calculation unit 112, the calculation result flag of the second calculation unit 114, and the output value of the implemented calculation unit information output circuit 117. In this case, the OR circuit 118 outputs the flag value "0" of the implemented calculation unit information output circuit 117.

The data output bus 122 transmits, to the general register group 104 of the CPU 100, the output value of the first calculation result storage register 113 that is output by the selector 116. The general register group 104 acquires the value of the data output bus 122, and stores the acquired value in the n-th register thereof. The flag register 102 stores, as a calculation result flag, the flag value "0" of the implemented calculation unit information output circuit 117 that is output by the coprocessor 110.

(2) Case where Value is Read from Second Calculation Result Storage Register 115

The second calculation unit 114 reads Dm "1" of the second calculation unit 114 indicating the second calculation unit 114. The second calculation result storage register 115 outputs a value stored therein to the selector 116. In accordance with the control signal output by the coprocessor instruction decoder 111, the selector 116 selects the output value of the second calculation result storage register 115, and outputs the selected value to the data output bus 122.

In accordance with the control signal output by the coprocessor instruction decoder 111, the implemented calculation unit information output circuit 117 compares a value acquired via the first data input bus 120 with the count of calculation units stored therein. The acquired value matches the count of calculation units, and therefore the implemented calculation unit information output circuit 117 outputs a flag value "1". The OR circuit 118 performs an OR of the calculation result flag of the first calculation unit 112, the calculation result flag of the second calculation unit 114, and the output value of the implemented calculation unit information output circuit 117. In this case, the OR circuit 118 outputs the flag value "1" of the circuit 117.

The data output bus 122 transmits, to the general register group 104 of the CPU 100, the output value of the second calculation result storage register 115 that has been output by the selector 116. The general register group 104 acquires the value of the data output bus 122, and stores the acquired value in the n-th register thereof.

The flag register 102 stores therein the flag value "1" of the implemented calculation unit information output circuit 117 that is output by the coprocessor 110.

This completes the description of the extended calculation instructions according to the first embodiment.

<Instruction "PUTACX Dm,Dn">

An instruction "PUTACX Dm, Dn" is an extended calculation instruction for restoring, to a register, data that has been saved from the register of the coprocessor 110 when an interruption has occurred.

The CPU 100 reads the instruction "PUTACX Dm,Dn" from the ROM 130. Then, the CPU instruction decoder 101 decodes the read instruction "PUTACX Dm,Dn", and outputs a control signal to each circuit included in the CPU 100.

Also, when the CPU instruction decoder 101 reads and decodes the instruction "PUTACX Dm,Dn", the coprocessor instruction decoder 111 reads the instruction "PUTACX Dm,Dn" from the ROM 130 and decodes the read instruction "PUTACX Dm,Dn" at the same time. Then, the coprocessor instruction decoder 111 outputs a control signal to each circuit included in the coprocessor 110.

In accordance with the control signal, the general register group 104 outputs Dm to the first data input bus 120, and outputs Dn to the second data input bus 121.

The subsequent operations include two cases:

(1) a case where a value is written into the first calculation result storage register 113; and (2) a case where a value is written into the second calculation result storage register 115. Accordingly, the operations of the information processing apparatus 150 in the two cases are described separately.

(1) Case where Value is Written into First Calculation Result Storage Register 113

If reading Dm "0" indicating the first calculation unit 112, the first calculation unit 112 reads Dn of the second data input bus 121, and stores Dn in the first calculation result storage register 113.

In accordance with the control signal output by the coprocessor instruction decoder 111, the implemented calculation unit information output circuit 117 compares a value acquired via the first data input bus 120 with the count of calculation units stored therein. The acquired value "0" is smaller than the count of calculation units "1", and therefore the implemented calculation unit information output circuit 117 outputs a flag value "0".

The OR circuit 118 performs an OR of the calculation result flag of the first calculation unit 112, the calculation result flag of the second calculation unit 114, and the output value of the implemented calculation unit information output circuit 117. In this case, the OR circuit 118 outputs the flag value "0" of the circuit 117.

The flag register 102 stores therein, as a calculation result flag, the flag value "1" of the implemented calculation unit information output circuit 117 that is output by the coprocessor 110. With this calculation result flag, the CPU 100 can detect that restoration of the data is not complete.

(2) Case where Value is Written into Second Calculation Result Storage Register 115

If reading Dm "1" indicating the second calculation unit 114, the second calculation unit 114 reads Dn of the second data input bus 121, and stores Dn in the second calculation result storage register 115.

In accordance with the control signal output by the coprocessor instruction decoder 111, the implemented calculation unit information output circuit 117 compares a value acquired via the first data input bus 120 with the count of calculation units stored therein. The acquired value matches the count of calculation units, and therefore the implemented calculation unit information output circuit 117 outputs a flag value "1".

The OR circuit 118 performs an OR of the calculation result flag of the first calculation unit 112, the calculation result flag of the second calculation unit 114, and the output value of the implemented calculation unit information output circuit 117. In this case, the OR circuit 118 outputs the flag value "1" of the calculation unit information output circuit 117.

Then, the flag register 102 stores therein, as a calculation result flag, the flag value "1" of the implemented calculation unit information output circuit 117 that is output by the coprocessor 110. Since the calculation result flag of the flag register 102 is updated to the value "1", the CPU 100 can detect that restoration of all the pieces of data that have been saved has been completed.

<CPU Execution Instruction>

The following describes CPU execution instructions to be executed by only the CPU 100.

FIG. 3 is an example showing mnemonics of CPU execution instructions used by the CPU 100 for saving/restoring data to/from the RAM 140 and operations of the CPU 100 corresponding to the mnemonics. The following is the description of the CPU execution instructions that the CPU 100 read from the RAM 130 and executes. Note that "SP" and "(SP)" included in the CPU execution instructions are described separately. "SP" is used for executing an operation on a value directly stored in the stack pointer storage register 103. "(SP)" is used for specifying an address value of the RAM 140 for reading/writing data from/into the specified address value.

<Instruction "MOV Dm, (SP)">

An instruction "MOV Dm, (SP)" is an instruction for storing, at an address of the RAM 140 specified by an address value stored in the stack pointer storage register 103, a value stored in the m-th register of the general register group 104.

The CPU 100 reads the instruction "MOV Dm, (SP)" from the ROM 130, and the CPU instruction decoder 101 decodes the read instruction "MOV Dm, (SP)". In accordance with the decoded instruction, the CPU instruction decoder 101 outputs a control signal to each circuit included in the CPU 100.

The general register group 104 outputs Dm to the first data input bus 120. The stack pointer storage register 103 outputs an address value stored therein to the RAM 140. The RAM 140 writes data acquired via the first data input bus 120 into a region specified by an address value that has been output by the stack pointer storage register 103.

This completes the description of the instruction "MOV Dm, (SP)".

<Instruction "MOV (SP), Dn">

An instruction "MOV (SP), Dn" is an instruction for storing, in the n-th register of the general register group 104, a value stored at an address of the RAM 140 specified by an address value stored in the stack pointer storage register 103.

The CPU 100 reads the instruction "MOV (SP),Dn" from the ROM 130, and the CPU instruction decoder 101 decodes the read instruction "MOV (SP),Dn". In accordance with the decoded instruction, the CPU instruction decoder 101 outputs a control signal to each circuit included in the CPU 100.

In accordance with the control signal, the stack pointer storage register 103 outputs an address value stored therein to the RAM 140. The RAM 140 acquires the address value from the stack pointer storage register 103, and outputs, to the data output bus 122, data stored in a region specified by the address value. Then, the general register group 104 reads the value of the data output bus 122, and stores the value in the n-th register.

This completes the description of the instruction "MOV (SP),Dn".

<Instruction "MOV #<Immediate>,Dn">

An instruction "MOV #<Immediate>,Dn" is an instruction for storing a value output by the ROM 130 in the n-th register of the general processor 104.

The CPU 100 reads the instruction "MOV #<Immediate>, Dn" from the ROM 130, and the CPU instruction decoder 101 decodes the read instruction "MOV #<Immediate>,Dn". In accordance with the decoded instruction, the CPU instruction decoder 101 outputs a control signal to each circuit included in the CPU 100. The general processor 104 reads a value of the data output bus 122, and stores the read value in the n-th register.

This completes the description of the instruction "MOV #<Immediate>,Dn".

<Instruction "INC Dm">

An instruction "INC Dm" is an instruction for incrementing a value stored in the m-th register of the general processor 104.

The CPU 100 reads the instruction "INC Dm" from the ROM 130, and the CPU instruction decoder 101 decodes the read instruction "INC Dm". In accordance with the decoded instruction, the CPU instruction decoder 101 outputs a control signal to each circuit included in the CPU 100. Then, the general processor 104 increments the value stored in the m-th register by 1, and stores the incremented value in the m-th register.

This completes the description of the instruction "INC Dm".

<Instruction "INC SP">

An instruction "INC SP" is an instruction for incrementing a value stored in the stack pointer storage register 103.

The CPU 100 reads the instruction "INC SP" from the ROM 130, and the CPU instruction decoder 101 decodes the read instruction "INC SP". In accordance with the decoded instruction, the CPU instruction decoder 101 outputs a control signal to each circuit included in the CPU 100. The CPU 100 increments the address value stored in the stack pointer storage register 103 by the constant value, and stores the incremented address value in the stack pointer storage register 103.

This completes the description of the instruction "INC SP".

<Instruction "Bcc <Label>">

An instruction "Bcc <Label>" is an instruction for performing branching based on a value stored in the flag register 102.

The CPU 100 reads the instruction "Bcc <Label>" from the ROM 130, and the CPU instruction decoder 101 decodes the read instruction "Bcc <Label>". In accordance with the decoded instruction, the CPU instruction decoder 101 outputs a control signal to each circuit included in the CPU 100. If a value stored in the flag register 102 is "0", the CPU 100 outputs an address value of <Label> to the ROM 130 so as to branch the processing to an address specified by the address value. If the value stored in the flag register 102 is "1", the CPU 100 does not perform branching.

This completes the description of the instruction of "Bcc <Label>".

<Instruction "CLR Dm">

The instruction "CLR Dm" is an instruction for initializing a value stored in the m-th register of the general register group 104.

The CPU 100 reads the instruction "CLR Dm" from the ROM 130, and the CPU instruction decoder 101 decodes the read instruction "CLR Dm". In accordance with the decoded instruction, the CPU instruction decoder 101 outputs a control signal to each circuit included in the CPU 100. The general register group 104 clears a value stored in the m-th register, and stores a value "0" in the m-th register.

This completes the description of the instruction "CLR Dm".

<Instruction "RTI">

An instruction "RTI" is an instruction for, when an instruction executed in an interruption has been completed, branching the processing to an address specified by an address value which has been executed in normal processing when an interruption has occurred.

The CPU 100 reads the instruction "RTI" from the ROM 130, and the CPU instruction decoder 101 decodes the read instruction "RTI". In accordance with the decoded instruction, the CPU instruction decoder 101 outputs a control signal to each circuit included in the CPU 100. The CPU 100 outputs, to the ROM 130, an address value that has been executed when the interruption has occurred, so as to branch the processing to the address value.

This completes the description of the instruction "RTI".

<Operations>

The following describes that data is saved when an interruption occurs, which is a characteristic of the information processing apparatus 150, and operations of the coprocessor instruction decoder 111 in data restoration. Then, the operations of the information processing apparatus 150 are described with use of specific instruction sequences.

Figure 4:
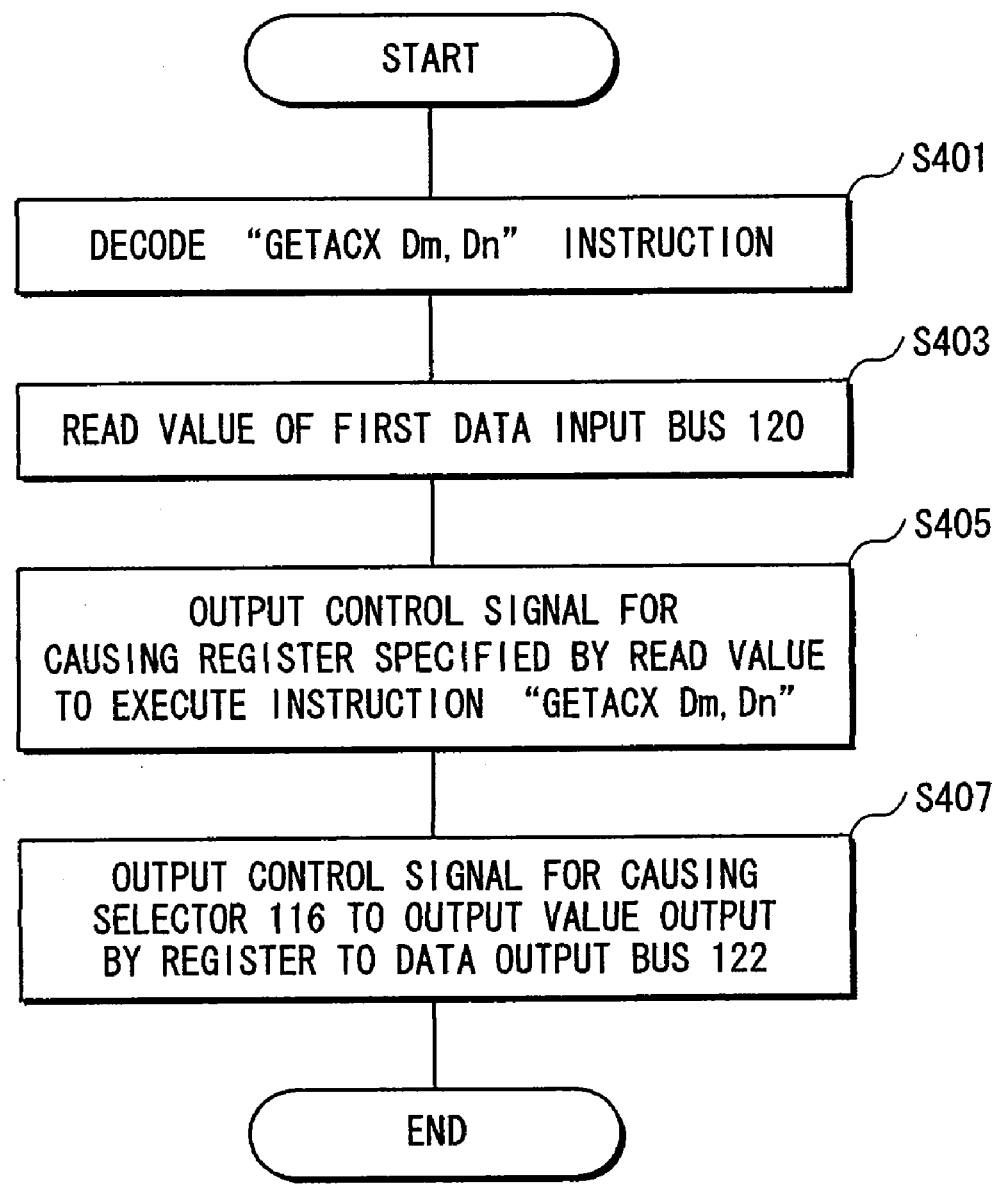
FIG. 4 is a flow chart showing operations of a coprocessor instruction decoder 111 in a case where an instruction "GETACX Dm,Dn" is executed.

Firstly, the operations of the coprocessor instruction decoder 111 in execution of an instruction "GETACX Dm,Dn" with reference to a flow chart shown in FIG. 4.

The coprocessor instruction decoder 111 reads the instruction "GETACX Dm,Dn" from the ROM 130, and decodes the read instruction "GETACX Dm,Dn" (Step S401).

The coprocessor instruction decoder 111 decodes that the instruction acquired from the ROM 130 is the instruction "GETACX Dm,Dn", and reads a value of the first data input bus 120 (Step S403).

The coprocessor instruction decoder 111 outputs a control signal for causing a register specified by the read value of the first data input bus 120 to execute the instruction "GETACX Dm,Dn" (Step S405). A calculation unit including the specified register receives the control signal, and outputs data of the register.

The coprocessor instruction decoder 111 outputs a control signal for causing the selector 116 to output, to the data output bus 122, the value that has been output by the specified register (Step S407). Accordingly, the data is saved from the register.

This completes the description of the operations of the coprocessor instruction decoder 111 in the decoding and execution of the instruction "GETACX Dm,Dn".

Figure 5:
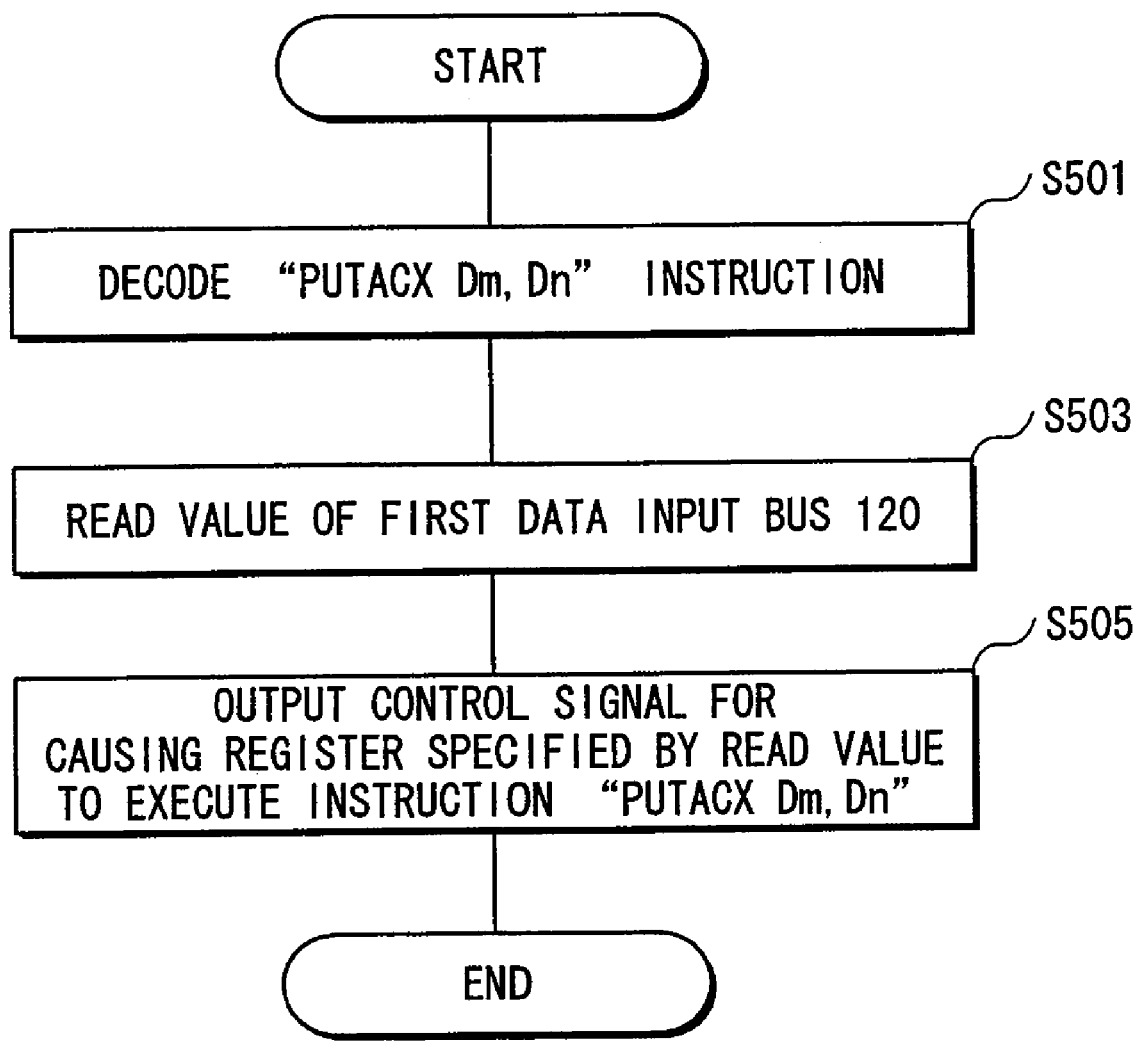
FIG. 5 is a flow chart showing operations of the coprocessor instruction decoder 111 in a case where an instruction "PUTACX Dm,Dn" is executed.

Next, the following describes the operations of the coprocessor 110 in execution of the instruction "PUTACX Dm, Dn", with reference to a flow chart shown in FIG. 5.

The coprocessor instruction decoder 111 reads the instruction "PUTACX Dm,Dn" from the ROM 130, and decodes the read instruction "PUTACX Dm,Dn" (Step S501).

The coprocessor instruction decoder 111 decodes that the instruction acquired from the ROM 130 is the instruction "PUTACX Dm, Dn", and reads a value of the first data input bus 120 (Step S503).

The coprocessor instruction decoder 111 outputs a control signal for causing a register specified by the read value of the first data input bus 120 to execute the instruction "PUTACX Dm,Dn" (Step S505).

This completes the description of the operations of the coprocessor instruction decoder 111 in the decoding and execution of the instruction "PUTACX Dm,Dn".

Figure 6:
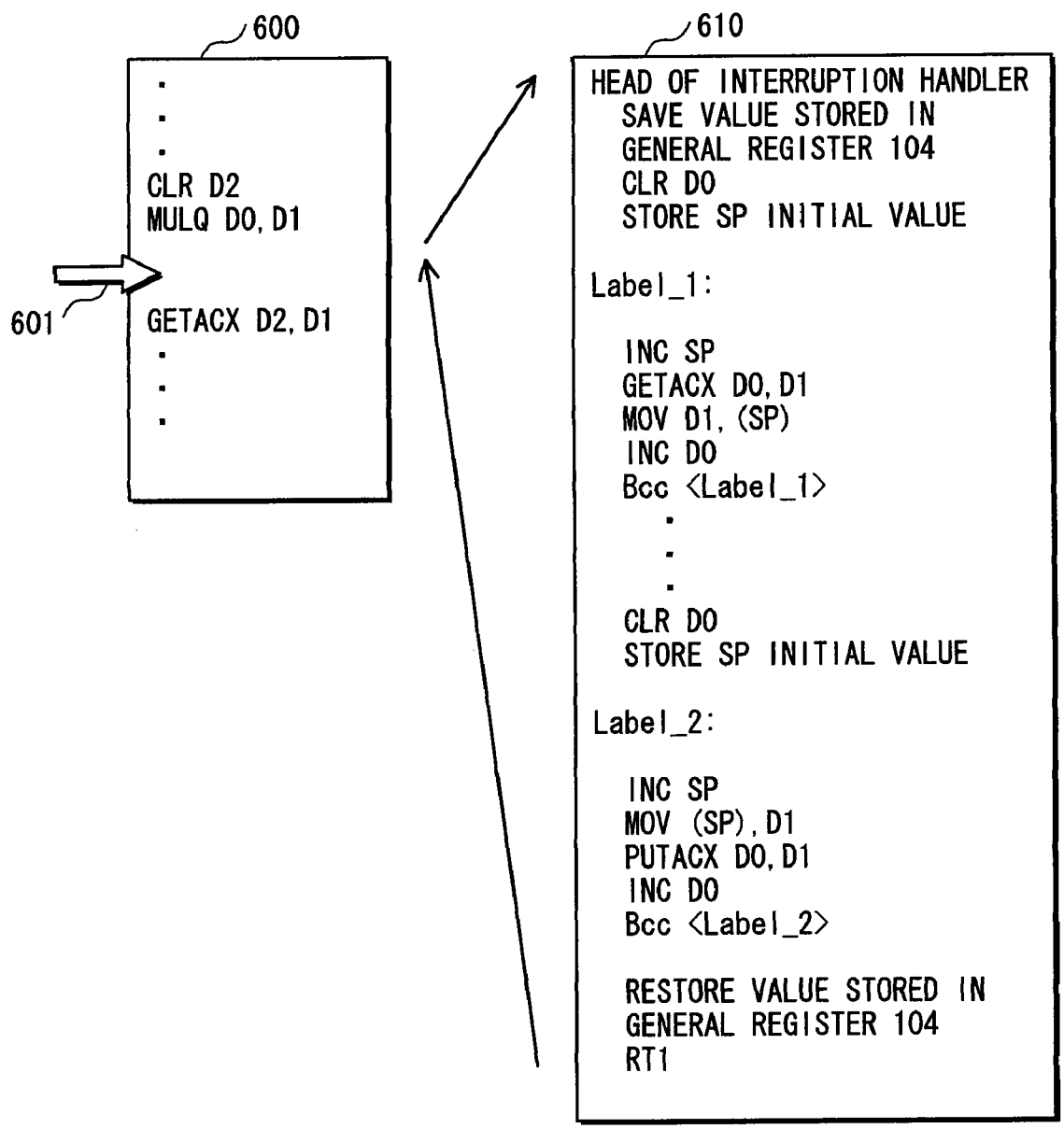
FIG. 6 shows an instruction sequence representing an example of an assembler program according to the first embodiment.
Figure 7:
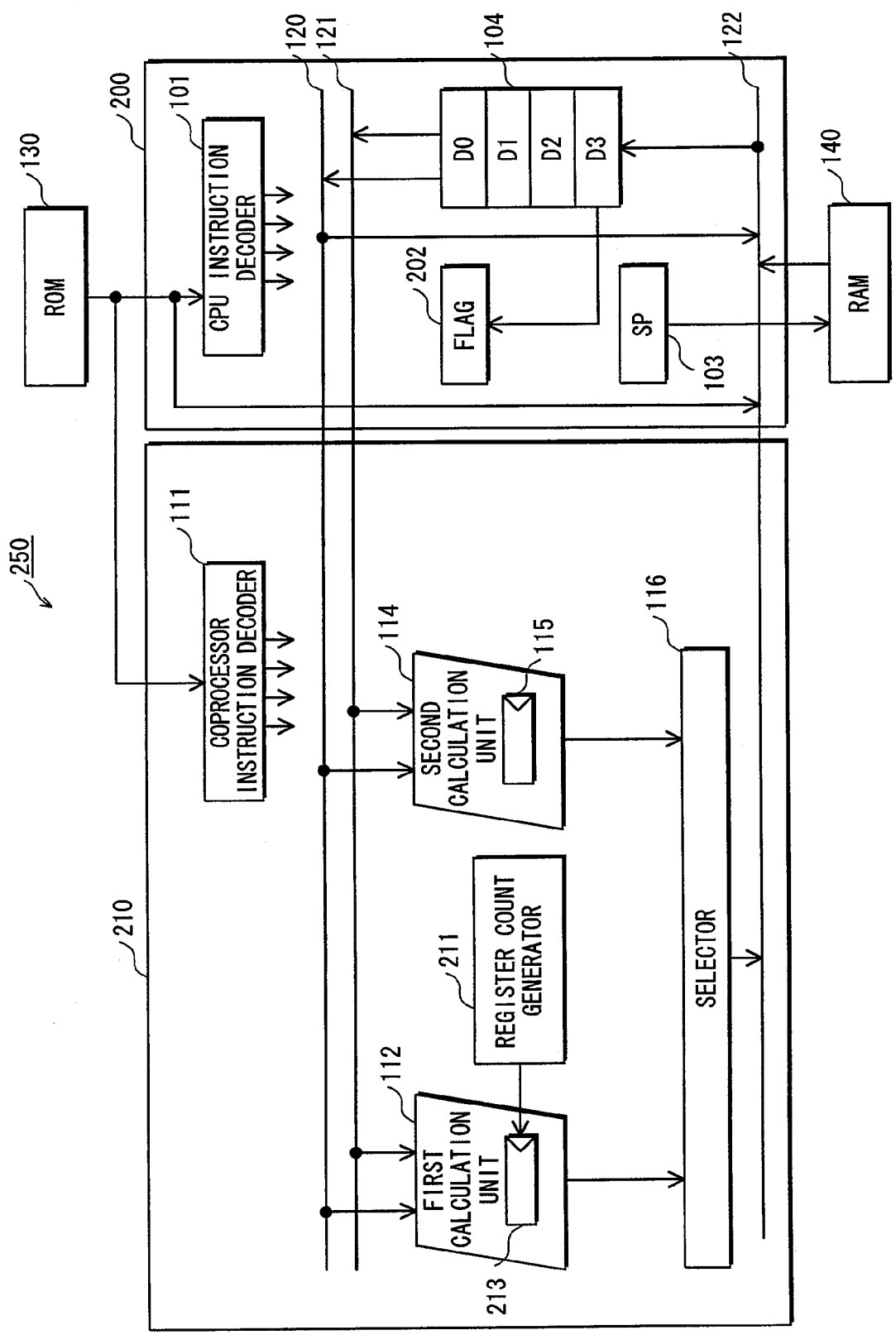
FIG. 7 is a block diagram showing the functional structure of an information processing apparatus 250 according to a second embodiment.

Lastly, the operations of the information processing apparatus 150 are described based on a specific instruction sequence shown in FIG. 6. FIG. 6 shows an instruction sequence that is an example of an assembler program using the instructions described in FIGS. 2 and 3. The following describes operations for executing the instruction sequence.

The CPU 100 executes an instruction sequence 600 that is normal processing stored in the ROM 130. The CPU 100 reads an instruction "CLR D2" included in the instruction sequence 600 from the ROM 130, and stores a value "0" in a second register of the general register group 104.

The CPU 100 and the coprocessor 110 read an instruction "MULQ D0,D1" from the ROM 130. The first calculation unit 112 stores the higher bits of a multiplication result in the first calculation result storage register 113, and outputs the lower bits of the multiplication result to the selector 116. The selector 116 outputs, to the data output bus 122, the data output from the first calculation unit 112. The general register group 104 stores the lower bits of the multiplication result in the first register thereof. The flag register 102 stores therein the calculation result flag output by the first calculation unit 112.

After executing the instruction "MULQ D0,D1", the CPU 100 receives an interruption, and executes an instruction at a head of an instruction sequence 610 of an interruption handler.

First, the CPU 100 saves, to the RAM 140, a value stored in the general register group 104 which is included in the instruction sequence 610 of the interrupt handler. The value "0" stored in the second register of the general register group 104 at this time is also saved to the RAM 140. Note that a value that has been stored in the general register group 104 and a register number of a register of the general register group 104 in which the value has been stored are stored in the RAM 140 in correspondence with each other. Also, the address value stored in the stack pointer storage register 103 at this time is stored as an SP initial value in the RAM 140 in order to restore the saved data.

The CPU 100 reads the instruction "CLR D0" from the ROM 130, and stores a value "0" in the zeroth register of the general register group 104.

The CPU 100 reads the instruction "INC SP" from the ROM 130, and increments the address value stored in the stack pointer storage register 103 by the constant value, and stores the incremented address value in the stack pointer storage register 103.

The CPU 100 and the coprocessor 110 read the instruction "GETACX D0,D1" from the ROM 130, and execute the read instruction "GETACX D0,D1". As a result, the value stored in the first calculation result storage register 113 is stored in the first register of the general register group 104. Also, a flag value "0" of the implemented calculation unit information output circuit 117 is stored in the flag register 102.

The CPU 100 reads the instruction "MOV D1, (SP)" from the ROM 130, and executes the read instruction "MOV D1, (SP)". The CPU 100 writes, into an address of the RAM 140 specified by the address value stored in the stack pointer storage register 103, the value stored in the first register of the general register group 104.

The CPU 100 reads the instruction "INC D0" from the ROM 130, and executes the read instruction "INC D0". The CPU 100 increments the value stored in the zeroth register of the general register group 104 by 1, and stores the incremented value in the zeroth register. Here, the zeroth register stores therein a value "1".

The CPU 100 reads the instruction "Bcc <Label__1>" from the ROM 130, and executes the read instruction "Bcc <Label__1>". The value stored in the flag register 102 is not "1" but "0". Accordingly, the CPU 100 branches the processing to <Label__1>. The CPU 100 reads the instruction "INC SP" from the ROM 130, and executes the read instruction "INC SP". The CPU 100 increments the address value stored in the stack pointer storage register 103 by the constant value, and stores the incremented address value in the stack pointer storage register 103.

The CPU 100 and the coprocessor 110 read the instruction "GETACX D0,D1" from the ROM 130, and execute the read instruction "GETACX D0,D1". The CPU 100 stores, in the first register of the general register group 104, the value stored in the second calculation result storage register 115. The implemented calculation unit information output circuit 117 reads a value "1" of the first data input bus 120, and compares the value "1" with calculation unit information stored therein. The value "1" matches the calculation unit information, and therefore the circuit 117 outputs a flag value "1" to the flag register 102. Then, the flag register 102 stores therein the flag value "1".

The CPU 100 reads the instruction "MOV D1, (SP)" from the ROM 130, and executes the read instruction "MOV D1, (SP)". The CPU 100 writes, into an address of the RAM 140 specified by an address value stored in the stack pointer storage register 103, the value stored in the first register of the general register group 104.

The CPU 100 reads the instruction "INC D0" from the ROM 130, and executes the read instruction "INC D0". The CPU 100 increments the value stored in the zeroth register of the general register group 104 by 1, and stores the incremented value in the zeroth register.

The CPU 100 reads the instruction "Bcc <Label__1>" from the ROM 130, and executes the read instruction "Bcc <Label__1>". The value stored in the flag register 102 is "1". Accordingly, the CPU 100 does not branch the processing to <Label__1>.

Then, the CPU 100 executes an instruction included in an instruction sequence of an interruption handler that is to be actually executed.

After completion of the execution of the instruction sequence of the interruption handler, the CPU 100 decodes the instruction "CLR D0", and stores a value "0" in the zeroth register of the general register group 104. Also, the CPU 100 writes the SP initial value stored in the RAM 140 into the stack pointer storage register 103.

The CPU 100 reads the instruction "INC SP" from the ROM 130, and executes the read instruction "INC SP". The CPU 100 increments the address value stored in the stack pointer storage register 103 by the constant value, and stores the incremented address value in the stack pointer storage register 103.

The CPU 100 reads the instruction "MOV (SP),D1" from the ROM 130, and executes the read instruction "MOV (SP), D1". The CPU 100 writes, into the first register of the general register group 104, data stored at an address specified by an address value stored in the stack pointer storage register 103 of the RAM 140.

The CPU 100 and the coprocessor 110 read an instruction "PUTACX D0,D1" from the ROM 130, and execute the read instruction "PUTACX D0,D1". As a result, the first calculation unit 112 stores, in the first calculation result storage register 113, the value stored in the first register of the general register group 104. Also, the implemented calculation unit information output circuit 117 compares the count of calculation units stored therein "1" with a value "0" of the first data input bus 120. The value "0" is smaller than the count of calculation units "1", and therefore the implemented calculation unit information output circuit 117 outputs a flag value "0" to the flag register 102. Then, the flag register 102 stores therein the flag value "0".

The CPU 100 reads the instruction "INC D0" from the ROM 130, and executes the read instruction "INC D0". The CPU 100 increments the address value stored in the zeroth register of the general register group 104 by 1, and stores the incremented value in the zeroth register.

The CPU 100 reads the instruction "Bcc <Label__2>" from the ROM 130, and executes the read instruction "Bcc <Label__2>". The value stored in the flag register 102 is "0". Accordingly, the CPU 100 branches the processing to <Label__2>.

The CPU 100 reads the instruction "INC SP" from the ROM 130, and executes the read instruction "INC SP". The CPU 100 increments the address value stored in the stack pointer storage register 103 by the constant value, and stores the incremented address value in the stack pointer storage register 103.

The CPU 100 reads the instruction "MOV (SP),D1" from the ROM 130, and executes the read instruction "MOV (SP), D1". The CPU 100 writes, into the first register of the general register group 104, the value stored at the address specified by the address value stored in the stack pointer storage register 103 of the RAM 140.

The CPU 100 and the coprocessor 110 read instruction "PUTACX D0,D1" from the ROM 130, and execute the read instruction "PUTACX D0,D1". The second calculation unit 114 stores, in the second calculation result storage register 115, the value stored in the first register of the general register group 104. Moreover, the implemented calculation unit information output circuit 117 stores the flag value "1" in the flag register 102.

The CPU 100 reads the instruction "INC D0" from the ROM 130, and executes the read instruction "INC D0". The CPU increments the value stored in the zeroth register of the general register group 104 by 1, and stores the incremented value in the zeroth register.

The CPU 100 reads the instruction "Bcc <Label__2>" from the ROM 130, and executes the read instruction "Bcc <Label__2>". The value stored in the flag register 102 is "1". Accordingly, the CPU 100 does not branch the processing to <Label__2>.

The CPU 100 restores, to the general register group 104, the value saved to the RAM 140 that has been stored in the general register group 104. At this time, the value "0" that has been saved from the second register of the general register group 104 to the RAM 140 is also stored in the second register of the general register group 104.

The CPU 100 reads the instruction "RTI" from the ROM 130, and executes the read instruction "RTI". As a result, the CPU 100 executes an instruction included in the instruction sequence 600 that is normal processing. Accordingly, the CPU 100 returns to the status in which when the interruption has occurred.

As have been described in the first embodiment, when an interruption occurs, execution of only a single extended calculation instruction "GETACX Dm,Dn" realizes saving of data from all the registers. Also, execution of only a single extended calculation instruction "PUTACX Dm,Dn" realizes restoration of the saved data to the registers.

Second Embodiment

In the above first embodiment, the calculation unit information output circuit included in the coprocessor 110 outputs a flag indicating that saving/restoration of data from/to all the registers has been completed. This makes it possible for the CPU 100 to detect that the saving/restoration of the data from/to all the registers has been completed.

The second embodiment describes a method different from the method in the first embodiment, for enabling the CPU to detect that saving/restoration of data from/to all the registers has been completed. According to this method, when the information processing apparatus is reset, the count of registers is transmitted from the coprocessor to the CPU.

<Structure>

An information processing apparatus 250 according to the second embodiment includes a ROM 130, a RAM 140, a CPU 200, and a coprocessor 210.

The CPU 200 includes a CPU instruction decoder 101, a stack pointer storage register 103, a general register group 104, and a flag register 202.

The coprocessor 210 includes a coprocessor instruction decoder 111, a first calculation unit 112, a second calculation unit 114, a second calculation result storage register 115, a selector 116, a register count generator 211, and a first calculation result storage register 213.

The above first embodiment has the structure in which calculation result flags of the first calculation unit 112 and the second calculation unit 114 are output via the OR circuit 118. This structure is omitted in description and drawing of the second embodiment because of not being a characteristic of the second embodiment.

Also, the functional units in the second embodiment having the same names and reference numerals as those in the first embodiment perform the same functions as those in the first embodiment. Therefore, descriptions thereof are omitted.

In accordance with a control signal output by the CPU instruction decoder 101, the flag register 202 compares D0 with D3, based on a result of a comparison instruction executed in the CPU 200. Hereinafter, Dx (x is an integer) represents a value stored in an x-th register of the general register group 104. When D0 is no less than D3, the flag register 202 stores a value "1" indicating that saving/restoration of data from/to all the registers of the coprocessor 210 has been completed. When D0 is less than D3, the flag register 202 stores a value "0" indicating that saving/restoration of data from/to all the registers of the coprocessor 210 is not complete.

The register count generator 211 stores therein the count of registers included in the coprocessor 210. In accordance with a timing when the information processing apparatus 250 is reset, the register count generator 211 outputs the count of registers that is stored therein to the first calculation result storage register 213.

In addition to the functions of the first calculation result storage register 113 described in the first embodiment, the first calculation result storage register 213 includes a function for storing therein the count of registers that is output by the register count generator 211, and a function for outputting the count of registers stored therein to the selector 116.

This completes the description of the functions of the information processing apparatus 250 according to the second embodiment, which is a modification of the first embodiment.

<Command>

The following describes instructions used in the second embodiment as well as in the first embodiment.

<CPU Execution Instruction>

FIG. 8 is a list showing an example of mnemonics of instructions to be read from the ROM 130 by the CPU 200 for saving/restoring data to/from the RAM 140 and operations of the CPU 200 corresponding to the mnemonics. The following describes instructions used in the second embodiment with reference to FIG. 8.

<Instruction "CMP Dm,Dn">

An instruction "CMP Dm,Dn" is an instruction for comparing Dm with Dn.

The CPU 200 reads the instruction "CMP Dm,Dn" from the ROM 130, and the CPU instruction decoder 101 decodes the read instruction "CMP Dm,Dn". In accordance with the decoded instruction, the CPU instruction decoder 101 outputs a control signal to each circuit included in the CPU 200. The general register group 104 compares a value stored in the m-th register with a value stored in the n-th register. If the values match each other, the general register group 104 stores a value "1" in the flag register 202. If the values do not match each other, the general register group 104 stores a value "0" in the flag register 202. The flag register 202 stores therein the comparison result value output by the general register group 104.

This completes the description of the instruction "CMP Dm,Dn".

<Operations>

The operations of the information processing apparatus 250 according to the second embodiment are described with reference to the drawings.

Figure 9:
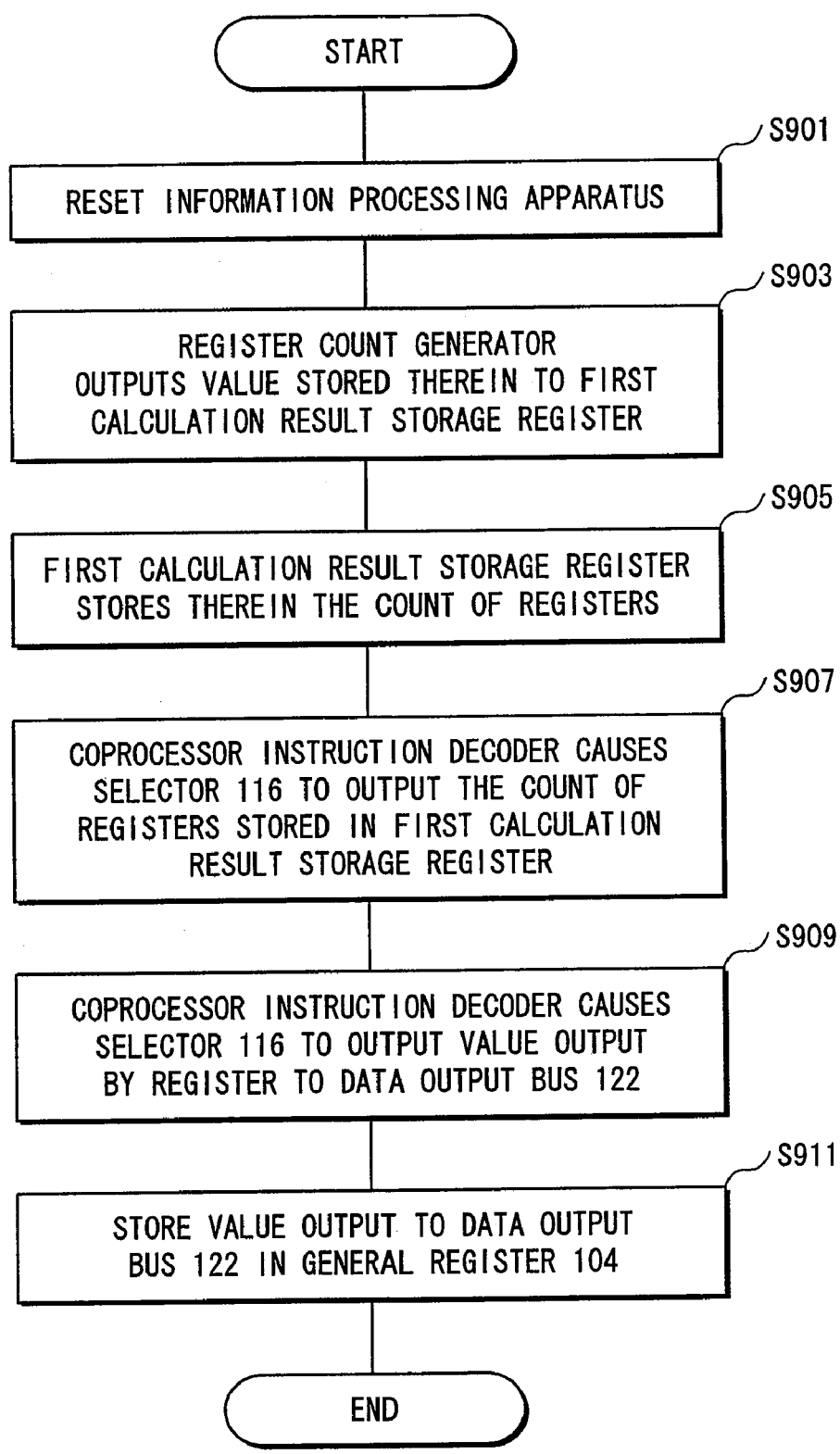
FIG. 9 is a flow chart showing operations in a case where the information processing apparatus 250 according to the second embodiment is reset.

Firstly, the following describes the operations at a time when the information processing apparatus 250 is reset, which are the characteristics of the second embodiment, with reference to a flow chart shown in FIG. 9 and a block diagram shown in FIG. 8.

At start-up or based on a user's reset operation, the information processing apparatus 250 is reset (Step S901).

The register count generator 211 of the coprocessor 210 outputs, to the first calculation result storage register 213, the count of registers stored therein (Step S903).

The first calculation result storage register 213 stores therein the output count of registers (Step S905).

The coprocessor instruction decoder 111 decodes the instruction "GETACX Dm,Dn", and causes the first calculation unit 112 to output a value stored in the first calculation result storage register 213, and causes the selector 116 to output, to the data output bus 122, the value output by the first calculation unit 112 (Step S907).

The coprocessor instruction decoder 111 outputs a control signal for causing the selector 116 to output, to the data output bus 122, the data that has been output by the first calculation result storage register 213 (Step S909).

Then, the CPU 200 stores, in the general register group 104, the count of registers that has been output to the data output bus 122 (Step S911).

This completes the description of the operations at a time when the information processing apparatus 250 is reset. Next, the following describes specific operations according to the second embodiment with reference to an instruction sequence shown in FIG. 10.

Figure 10:
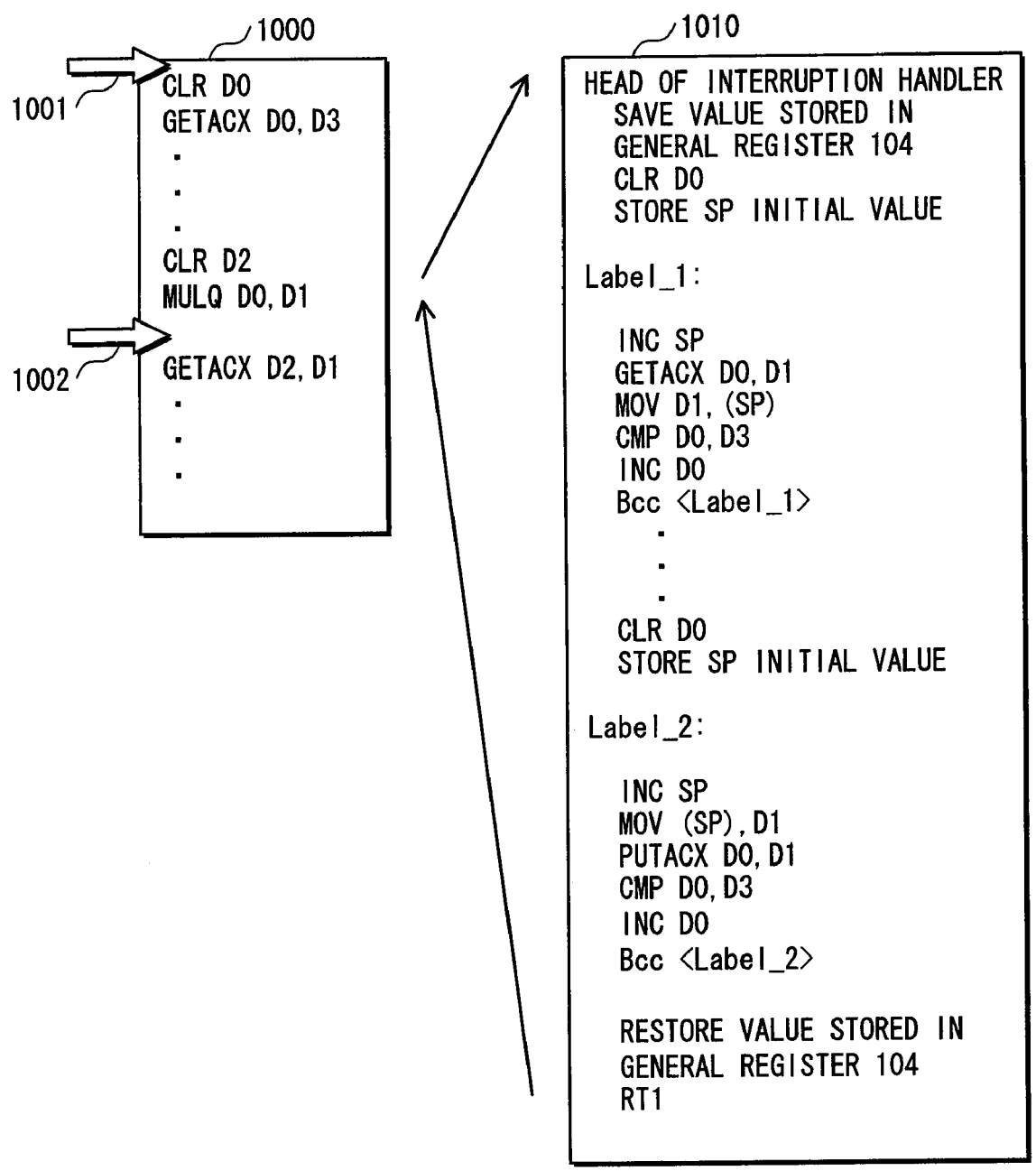
FIG. 10 shows an instruction sequence representing an example of an assembler program according to the second embodiment.
Figure 11:
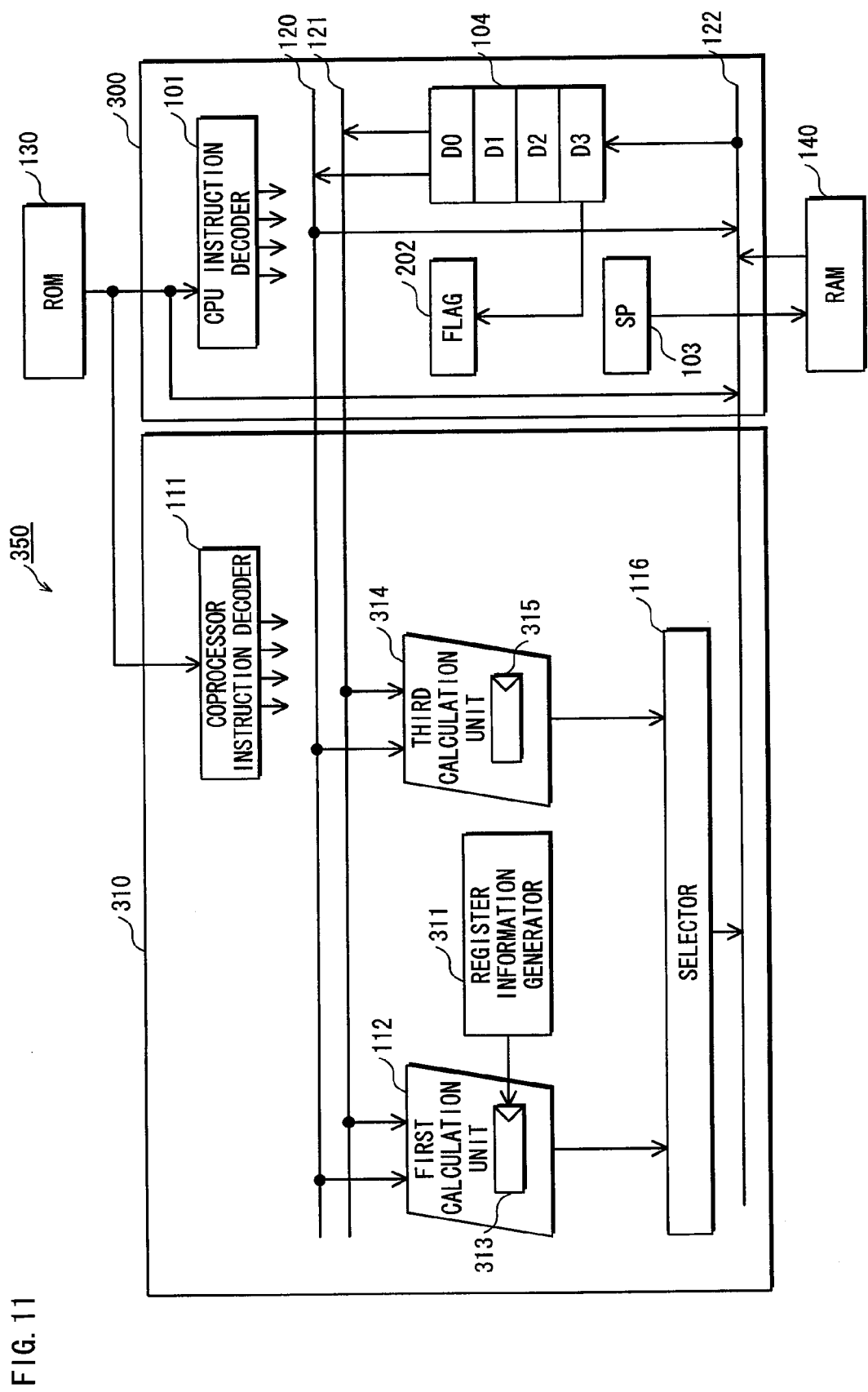
FIG. 11 is a block diagram showing the functional structure of an information processing apparatus 350 according to a third embodiment.

FIG. 10 shows an instruction sequence representing an example of an assembler program using the instructions described in FIGS. 2, 3, and 8. The following describes the operations for executing this instruction sequence. In FIG. 10, an arrow 1001 indicates a timing when the information processing apparatus 250 is reset. An arrow 1002 indicates a timing when an interruption occurs during execution of an instruction sequence 1000 that is normal processing.

After the reset, the CPU 200 reads the instruction "CLR D0" from the ROM 130, and executes the read instruction "CLR D0". As a result, the CPU 200 stores a value "0" in the zeroth register of the general register group 104.

The CPU 200 reads the instruction "GETACX D0,D3" from the ROM 130, and executes the read instruction "GETACX D0,D3". As a result, the CPU 200 stores therein the count of registers "1" that is output by the register count generator 211. Accordingly, information relating to the count of registers output by the first calculation result storage register 213 is stored in the third register of the general register group 104.

The CPU 200 executes an instruction sequence that is normal processing stored in the ROM 130.

The CPU 200 reads, from the ROM 120, the instruction "CLR D2" included in an instruction sequence 1000 that is normal processing, and executes the read instruction "CLR D2". As a result, the CPU 200 stores a value "0" in the second register of the general register group 104.

The CPU 200 reads the instruction "MULQ D0,D1" from the ROM 130, and executes the read instruction "MULQ D0,D1". The first calculation unit 112 stores the higher bits of a multiplication result in the first calculation result storage register 213. Also, the CPU 200 stores the lower bits of the multiplication result in the first register of the general register group 104, and stores a calculation result flag in the flag register 202.

After executing the instruction "MULQ D0,D1", the CPU 200 receives an interruption, and executes an instruction at a head of an instruction sequence 1010 of an interruption handler.

The CPU 200 saves, to the RAM 140, a value stored in the general register group 104 in the instruction sequence of the interruption handler. At this time, a value "0" stored in the second register of the general register group 104 is also saved to the RAM 140. Also, the CPU 200 stores, as an SP initial value, in the RAM 140, the address value stored at this time in the stack pointer storage register 103.

The CPU 200 reads the instruction "CLR D0" from the ROM 130, and executes the read instruction "CLR D0". As a result, the CPU 200 stores a value "0" in the zeroth register of the general register group 104.

The CPU 200 reads the instruction "INC SP" from the ROM 130, and executes the read instruction "INC SP". As a result, the CPU 200 increments the address value stored in the stack pointer storage register 103 by a constant value, and stores the incremented address value in the stack pointer storage register 103.

The CPU 200 reads the instruction "GETACX D0,D1" from the ROM 130, and executes the read instruction "GETACX D0,D1". The CPU 200 stores, in the first register of the general register group 104, the value stored in the first calculation result storage register 213.

The CPU 200 reads the instruction "MOV D1, (SP)" from the ROM 130, and executes the read instruction "MOV D1, (SP)". As a result, the CPU 200 writes, into an address of the RAM 140 specified by the address value stored in the stack pointer storage register 103, the value stored in the first register of the general register group 104.

The CPU 200 reads the instruction "CMP D0,D1" from the ROM 130, and executes the read instruction "CMP D0,D1". D0 and D1 do not match each other. Accordingly, the CPU 200 writes a value "0" into the flag register 202.

The CPU 200 reads the instruction "INC D0" from the ROM 130, and executes the read instruction "INC D0". As a result, the CPU 200 increments the value stored in the zeroth register of the general register group 104 by 1, and stores the value in the zeroth register.

The CPU 200 reads the instruction "Bcc <Label__1>" from the ROM 130, and executes the read instruction "Bcc <Label__1>". The value stored in the flag register 202 is "0", and therefore the CPU 200 branches the processing to <Label__1>.

The CPU 200 reads the instruction "INC SP" from the ROM 130, and executes the read instruction "INC SP". As a result, the CPU 200 increments the address value stored in the stack pointer storage register 103 by the constant value, and stores the incremented address value in the stack pointer storage register 103.

The CPU 200 reads the instruction "GETACX D0,D1" from the ROM 130, and executes the read instruction "GETACX D0,D1". As a result, the value stored in the second calculation result storage register 115 is stored in the first register of the general register group 104.

The CPU 200 reads the instruction "MOV D1, (SP)" from the ROM 130, and executes the read instruction "MOV D1, (SP)". As a result, the CPU 200 writes, into an address of the RAM 140 specified by the address value stored in the stack pointer storage register 103, the value stored in the first register of the general register group 104.

The CPU 200 reads the instruction "CMP D0,D1" from the ROM 130, and executes the read instruction "CMP D0,D1". D0 and D1 each have a value "1", and therefore these values match each other. Accordingly, the CPU 200 writes a value "1" into the flag register 202.

The CPU 200 reads the instruction "INC D0" from the ROM 130, and executes the read instruction "INC D0". As a result, the CPU 200 increments the value stored in the zeroth register of the general register group 104 by 1, and stores the incremented value in the zeroth register.

The CPU 200 reads the instruction "Bcc <Label__1>" from the ROM 130, and executes the read instruction "Bcc <Label__1>". The value stored in the flag register 202 is "1". Accordingly, the CPU 200 does not branch the processing to <Label__1>.

The CPU 200 completes execution of an instruction sequence of an interruption handler that is to be actually executed. Then, the CPU 200 reads the instruction "CLR D0" from the ROM 130, and executes the read instruction "CLR D0". As a result, the CPU 200 stores a value "0" in the zeroth register of the general register group 104. Also, the CPU 200 reads the SP initial value from the RAM 140, and writes the read value into the stack pointer storage register 103.

The CPU 200 reads the instruction "INC SP" from the ROM 130, and executes the read instruction "INC SP". As a result, the CPU 200 increments the address value stored in the stack pointer storage register 103 by the constant value, and stores the incremented address value in the stack pointer storage register 103.

The CPU 200 reads the instruction "MOV (SP),D1" from the ROM 130, and executes the read instruction "MOV (SP), D1". As a result, the CPU 200 reads, into the first register of the general register group 104, a value stored in an address specified by the address value stored in the stack pointer storage register 103 of the RAM 140.

The CPU 200 reads the instruction "PUTACX D0,D1" from the ROM 130, and executes the read instruction "PUTACX D0,D1". As a result, the first calculation unit 112 stores, in the first calculation result storage register 213, the value stored in the first register of the general register group 104.

The CPU 200 reads the instruction "CMP D0,D1" from the ROM 130, and executes the read instruction "CMP D0,D1". D0 and D1 do not match each other. Accordingly, the CPU 200 writes a value "0" into the flag register 202.

The CPU 200 reads the instruction "INC D0" from the ROM 130, and executes the read instruction "INC D0". As a result, the CPU 200 increments the value stored in the zeroth register of the general register group 104 by 1, and stores the incremented value in the zeroth register.

The CPU 200 reads the instruction "Bcc <Label_2>" from the ROM 130, and executes the read instruction "Bcc <Label_2>". The value stored in the flag register 202 is "0". Accordingly, the CPU 200 branches the processing to <Label_2>.

The CPU 200 reads the instruction "INC SP" from the ROM 130, and executes the read instruction "INC SP". As a result, the CPU 200 increments the address value stored in the stack pointer storage register 103 by the constant value, and stores the incremented address value in the stack pointer storage register 103.

The CPU 200 reads the instruction "MOV (SP),D1" from the ROM 130, and executes the read instruction "MOV (SP), D1". As a result, the CPU 200 reads, into the first register of the general register group 104, a value stored in an address specified by the address value stored in the stack pointer storage register 103 of the RAM 140.

The CPU 200 reads the instruction "PUTACX D0,D1" from the ROM 130, and executes the read instruction "PUTACX D0,D1". As a result, the second calculation unit 114 stores, in the second calculation result storage register 115, the value stored in the first register of the general register group 104.

The CPU 200 reads the instruction "CMP D0,D1" from the ROM 130, and executes the read instruction "CMP D0,D1". D0 and D1 match each other. Accordingly, the CPU 200 writes a value "1" into the flag register 202.

The CPU 200 reads the instruction "INC D0" from the ROM 130, and executes the read instruction "INC D0". As a result, the CPU 200 increments the value stored in the zeroth register of the general register group 104 by 1, and stores the incremented value in the zeroth register.

The CPU 200 reads the instruction "Bcc <Label_2>" from the ROM 130, and executes the read instruction "Bcc <Label_2>". The value stored in the flag register 202 is "1". Accordingly, the CPU 200 does not branch the processing to <Label_2>.

The CPU 200 restores, to the general register group 104, the value that has been saved to the RAM 140. At this time, a value "0" that has been saved from the second register of the general register group 104 to the RAM 140 is stored in the second register of the general register group 104.

The CPU 200 reads the instruction "RTI" from the ROM 130, and executes the read instruction "RTI". As a result, the CPU 200 executes an instruction included in the instruction sequence 1000 that is normal processing.

The CPU 200 reads the instruction "GETACX D2,D1" from the ROM 130, and executes the read instruction "GETACX D2,D1". As a result, the value stored in the first calculation result storage register 213 is stored in the second register of the general register group 104. The flag value "0" stored in the implemented calculation unit information output circuit 117 is stored in the flag register 202.

As have been described, in the second embodiment, in accordance with a timing when the information processing apparatus 250 is reset, the count of registers implemented in the coprocessor stored in the register count generator 211 is stored in the first calculation result storage register 213. Before performing processing, the CPU 200 acquires a value stored in the first calculation result storage register 213. This makes it possible for the CPU 200 to detect the count of registers implemented in the coprocessor 210. When an interruption occurs, the CPU 200 can detect that an instruction for saving data from registers has been issued to all the registers, without inquiring the coprocessor for the count of the registers.

Third Embodiment

The second embodiment has the structure in which the count of registers is simply output. If the CPU stores therein beforehand a type of a calculation unit implemented in the coprocessor, it is possible to determine the count of registers based on the type of the calculation unit. In view of this, a third embodiment describes a structure in which the CPU is capable of detecting not the count of registers but information of a calculation unit implemented in the coprocessor, and specifying the count of the registers implemented in the coprocessor based on the detected information.

<Structure>

An information processing apparatus 350 according to the third embodiment includes a ROM 130, a RAM 140, a CPU 300, and a coprocessor 310.

The CPU 300 includes a CPU instruction decoder 101, a stack pointer storage register 103, a general register group 104, and a flag register 202.

The coprocessor 310 includes a coprocessor instruction decoder 111, a first calculation unit 112, a selector 116, a register information generator 311, a first calculation result storage register 313, a third calculation unit 314, and a third calculation result storage register 315.

The above first embodiment has the structure in which calculation result flags of the first calculation unit 112 and the second calculation unit 114 are output via the OR circuit 118. This structure is omitted in description and drawing of the third embodiment because of not being a characteristic of the third embodiment.

Also, the functional units in the third embodiment having the same names and reference numerals as those in the first embodiment or the second embodiment perform the same functions as those in the first embodiment or the second embodiment. Therefore, descriptions thereof are omitted.

The register information generator 311 stores therein information relating to a type of calculation units implemented in the coprocessor 310. In accordance with a timing when the information processing apparatus 350 is reset, the register information generator 311 outputs a value stored therein to the first calculation result storage register 313.

Specifically, the register information stored in the register information generator 311 is information "0b0101". In the third embodiment, four types of calculation units can be implemented in the coprocessor. A first bit to a fourth bit of a value stored in the register information generator 311 indicate whether a first calculation unit to a fourth calculation unit are implemented in the coprocessor, respectively. If a calculation unit is implemented in the coprocessor 310, a value "1" is used for indicating that the calculation unit is implemented. If a calculation unit is not implemented in the coprocessor 310, a value "0" is used for indicating that the calculation unit is not implemented. Here, the first calculation unit 112 and the third calculation unit 314 are implemented in the coprocessor 310. Accordingly, a value stored in the register information generator 311 is "0b0101". If the second calculation unit and the fourth calculation unit are implemented in the coprocessor 310, a value stored in the register information generator 311 is "0b1010".

The third calculation unit 314 is a product-sum calculation unit for performing a product-sum calculation. Specifically, in accordance with a control signal output by the coprocessor instruction decoder 110, the third calculation unit 314 performs a product-sum calculation of data transmitted via the first data input bus 120 and data transmitted via the second data input bus 121, and a value stored beforehand in the third calculation result storage register 315. The third calculation unit 314 performs a multiplication of the data transmitted via the first data input bus 120 and the data transmitted via the second data input bus 121. Then, the third calculation unit 314 performs a sum of the value stored beforehand in the third calculation result storage register 315 and a result of the multiplication, and stores a result of the product-sum in the third calculation result storage register 315.

The third calculation result storage register 315 stores therein data necessary for the third calculation unit 314 to perform a calculation and data of a result of the calculation.

<Command>

The following describes instructions used in the third embodiment.

<Extended Calculation Instruction>

FIG. 12 is a list showing an example of mnemonics of coprocessor instructions to be read from the ROM 130 by the CPU 300 and the coprocessor 310 and operations of the CPU 300 and operations of the coprocessor 310 corresponding to the mnemonics.

<Instruction "MAC Dm,Dn">

An instruction "MAC Dm,Dn" is an instruction for the coprocessor 310 to perform a product-sum calculation.

The CPU 300 and the coprocessor 310 read the instruction "MAC Dm,Dn", and execute the read instruction "MAC Dm,Dn".

The CPU instruction decoder 101 decodes the instruction "MAC Dm,Dn". In accordance with the decoded instruction, the CPU instruction decoder 101 outputs a control signal to each circuit included in the CPU 300. Here, "m" and "n" are each a register number specified by an operand of the instruction.

The coprocessor instruction decoder 111 decodes the instruction "MAC Dm,Dn", and outputs a control signal to each circuit included in the coprocessor 310.

The general register group 104 outputs Dm to the first data input bus 120, and outputs Dn to the second data input bus 121. The third calculation unit 314 acquires Dm via the first data input bus 120, and acquires Dn via the second data input bus 121. The third calculation unit 314 performs a multiplication of Dm as a multiplicand and Dn as a multiplier. Then, the third calculation unit 314 calculates a sum of a result of the multiplication and a value stored beforehand in the third calculation result storage register 315. The third calculation unit 314 stores a result of the sum in the third calculation result storage register 315. The third calculation result storage register 315 stores therein the value of the product-sum calculation result performed by the third calculation unit 314.

This completes the description of the instruction "MAC Dm,Dn".

<CPU Execution Instruction>

The following describes CPU execution instructions used in the third embodiment.

FIG. 13 is a list showing an example of mnemonics of instructions to be used by the CPU 300 for saving/restoring data to/from the RAM 140 and operations of the CPU 300 corresponding to the mnemonics.

<Instruction "MOV Dm,Dn">

An instruction "MOV Dm,Dn" is an instruction for storing Dm in the n-th register of the general register group 104.

The CPU 300 reads the instruction "MOV Dm,Dn" from the ROM 130, and executes the read instruction "MOV Dm,Dn". The CPU instruction decoder 101 decodes the instruction "MOV Dm,Dn", and in accordance with the decoded instruction, the CPU instruction decoder 101 outputs a control signal to each circuit included in the CPU 300. In accordance with the output control signal, a value stored in the m-th register of the general register group 104 is stored in the n-th register of the general register group 104.

This completes the description of the instruction "MOV Dm,Dn".

<Instruction "AND #<Immediate>,Dm">

An instruction "AND #<Immediate>,Dm" is an instruction for calculating an AND of immediate data and Dm.

The CPU 300 reads the instruction "AND #<Immediate>, Dm" from the ROM 130, and executes the read instruction "AND #<Immediate>,Dm". The CPU instruction decoder 101 decodes the instruction "AND #<Immediate>,Dm". In accordance with the decoded instruction, the CPU instruction decoder 101 outputs a control signal to each circuit included in the CPU 300. The data output bus 122 transmits immediate data output by the ROM 130 to the general register group 104 of the CPU 300. The CPU 300 performs an AND of a value of the data output bus 122 and a value stored in the n-th register of the general register group 104. The CPU 300 stores a result of the AND in the n-th register of the general register group 104.

This completes the description of the instruction "AND #<Immediate>,Dm".

<Operations>

The operations of the information processing apparatus 350 according to the third embodiment are described.

Figure 14:
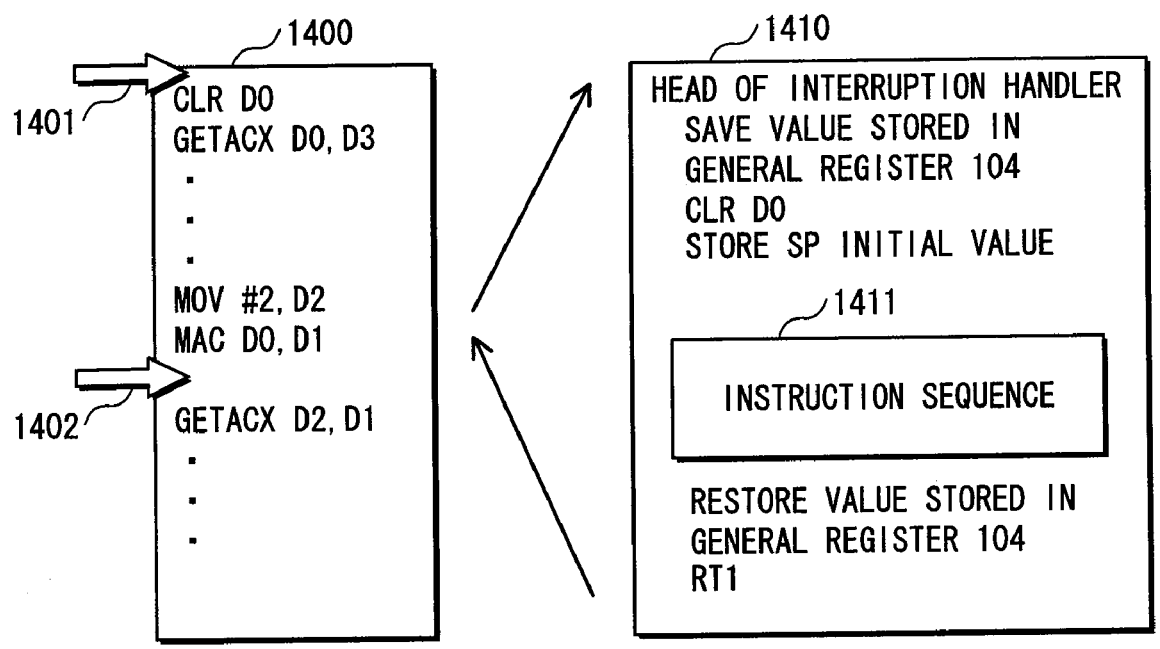
FIG. 14 shows an instruction sequence representing an example of an assembler program according to the third embodiment.
Figure 15:
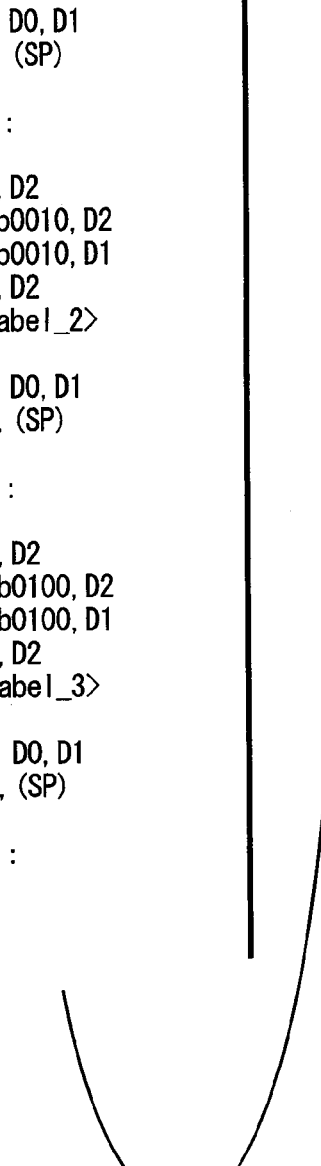
FIG. 15 shows an instruction sequence representing an example of an assembler program according to the third embodiment.

FIGS. 4 and 15 each show an instruction sequence representing an example of an assembler program using the instructions that are described with reference to FIGS. 2, 3, 8, 12, and 13. The following describes the operations of the information processing apparatus 350 executing the instruction sequences. In FIG. 14, an arrow 1401 indicates a timing when the information processing apparatus 350 is reset. An arrow 1402 indicates a timing when an interruption occurs during execution of an instruction sequence 1400.

After the reset, the CPU 300 reads the instruction "CLR D0" from the ROM 130, and executes the read instruction "CLR D0". As a result, the CPU 300 stores a value "0" in the zeroth register of the general register group 104.

The CPU 300 reads the instruction "GETACX D0,D3" from the ROM 130, and executes the read instruction "GETACX D0,D3". As a result, the first calculation result storage register 313 outputs register information "0b0101" stored therein, and the third register of the general register group 104 stores therein the output register information "0b0101". Accordingly, the CPU 300 stores therein information relating to a calculation unit implemented in the coprocessor 310.

The CPU 300 executes an instruction sequence that is normal processing stored in the ROM 130.

The CPU 300 reads the instruction "MOV #0,D2" included in the instruction sequence 1400 that is normal processing from the ROM 130, and executes the read instruction "MOV #0,D2". As a result, the CPU 300 stores a value "0" in the second register of the general register group 104.

The CPU 300 reads the instruction "MAC D0,D1" from the ROM 130, and executes the read instruction "MAC D0,D1". As a result, the CPU 300 stores a result value of a product-sum in the third calculation result storage register 315.

After executing the above instruction "MAC D0,D1", the CPU 300 receives an interruption, and executes an instruction at a head of an instruction sequence 1410 of an interruption handler.

The CPU 300 saves, to the RAM 140, a value stored in the general register group 104. At this time, the value "0" stored in the second register of the general register group 104 is also saved to the RAM 140.

The CPU 300 reads the instruction "CLR D0" from the ROM 130, and executes the read instruction "CLR D0". As a result, the CPU 300 stores a value "0" in the zeroth register of the general register group 104. Also, the CPU 300 stores, as an SP initial value, in the RAM 140, an address value stored in the stack pointer storage register 103.

The following describes the operations of the CPU 300 based on an instruction sequence 1411 shown in FIG. 15.

The CPU 300 reads the instruction "MOV D3,D2" from the ROM 130, and executes the read instruction "MOV D3,D2". As a result, the CPU 300 stores, in the second register of the general register group 104, the value "0b0101" stored in the third register of the general register group 104.

The CPU 300 reads the instruction "AND #0b0001,D2" from the ROM 130, and executes the read instruction "AND #0b0001,D2". As a result, the CPU 300 calculates an AND of the value "0b0101" stored in the second register of the general register group 104 and a value "0b0001" given as an immediate value. Then, the CPU 300 stores a calculation result "0b0001" in the second register of the general register group 104.

The CPU 300 reads the instruction "MOV #0b0001,D1" from the ROM 130, and executes the read instruction "MOV #0b0001, D1". As a result, the CPU 300 stores a value "0b0001" in the first register of the general register group 104.

The CPU 300 reads the instruction "CMP D1,D2" from the ROM 130, and executes the read instruction "CMP D1,D2". As a result, D1 and D2 match each other, and therefore the CPU 300 writes a value "1" into the flag register 202.

The CPU 300 reads the instruction "Bcc <Label_1>" from the ROM 130, and executes the read instruction "Bcc <Label_1>". The value stored in the flag register 202 is "1". Accordingly, the CPU 300 does not branch the processing to <Label_1>.

The CPU 300 reads the instruction "INC SP" from the ROM 130, and executes the read instruction "INC SP". As a result, the CPU 300 increments the address value stored in the stack pointer storage register 103 by a constant value, and stores the incremented address value in the stack pointer storage register 103.

The CPU 300 reads the instruction "GETACX D0,D1" from the ROM 130, and executes the read instruction "GETACX D0,D1". As a result, the CPU 300 stores, in the first register of the general register group 104, the value stored in the first calculation result storage register 313.

The CPU 300 reads the instruction "MOV D1, (SP)" from the ROM 130, and executes the read instruction "MOV D1, (SP)". As a result, the CPU 300 writes, into an address of the RAM 140 specified by the address value stored in the stack pointer storage register 103, the value stored in the first register of the general register group 104.

The CPU 300 reads the instruction "INC D0" from the ROM 130, and executes the read instruction "INC D0". As a result, the CPU 300 increments the value stored in the zeroth register of the general register group 104 by 1, and stores the incremented value in the zeroth register.

The CPU 300 reads the instruction "MOV D3,D2" from the ROM 130, and stores, in the second register of the general register group 104, the value "0b0101" stored in the third register of the general register group 104.

The CPU 300 reads the instruction "AND #0b0010,D2" from the ROM 130, and executes the read instruction "AND #0b0010, D2". The CPU 300 performs an AND of the value "0b0101" stored in the second register of the general register group 104 and a value "0b0010" given as an immediate value. Then, the CPU 300 stores a result value of the AND "0b0000" in the second register of the general register group 104.

The CPU 300 reads the instruction "MOV #0b0010,D1" from the ROM 130, and executes the read instruction "MOV #0b0010,D1". As a result, the CPU 300 stores a value "0b0010" in the first register of the general register group 104.

The CPU 300 reads the instruction "CMP D1,D2" from the ROM 130, and executes the read instruction "CMP D1,D2". As a result, D1 and D2 do not match each other. Accordingly, the CPU 300 writes a value "0" into the flag register 202.

The CPU 300 reads the instruction "Bcc <Label_2>" from the ROM 130, and executes the read instruction "Bcc <Label_2>". As a result, the value stored in the flag register 202 is "0". Accordingly, the CPU 300 branches the processing to <Label_2>.

The CPU 300 reads the instruction "INC D0" from the ROM 130, and executes the read instruction "INC D0". As a result, the CPU 300 increments the value stored in the zeroth register of the general register group 104 by 1, and stores the incremented value in the zeroth register.

The CPU 300 reads the instruction "MOV D3,D2" from the ROM 130, and stores, in the second register of the general register group 104, the value "0b0101" stored in the third register of the general register group 104.

The CPU 300 reads the instruction "AND #0b0100,D2" from the ROM 130, and performs an AND of the value "0b0101" stored in the second register of the general register group 104 and a value "0b0100" given as an immediate value. The CPU 300 stores a calculation result value "0b0100" in the second register of the general register group 104.

The CPU 300 reads the instruction "MOV #0b0100,D1" from the ROM 130, and executes the read instruction "MOV #0b0100,D1". As a result, the CPU 300 stores a value "0b0100" in the first register of the general register group 104.

The CPU 300 reads the instruction "CMP D1,D2" from the ROM 130, and executes the read instruction "CMP D1,D2". As a result, D1 and D2 match each other. Accordingly, the CPU 300 writes a value "1" into the flag register 202.

The CPU 300 reads the instruction "Bcc <Label_3>" from the ROM 130, and executes the read instruction "Bcc <Label_3>". The value stored in the flag register 202 is "1". Accordingly, the CPU 300 does not branch the processing to <Label_3>, and executes subsequent instructions.

The CPU 300 reads the instruction "INC SP" from the ROM 130, and executes the read instruction "INC SP". As a result, the CPU 300 increments the address value stored in the stack pointer storage register 103 by the constant value, and stores the incremented address value in the stack pointer storage register 103.

The CPU 300 reads the instruction "GETACX D0,D1" from the ROM 130, and executes the read instruction "GETACX D0,D1". As a result, the value stored in the third calculation result storage register 315 is stored in the first register of the general register group 104.

The CPU 300 reads the instruction "MOV D1, (SP)" from the ROM 130, and executes the read instruction "MOV D1, (SP)". As a result, the CPU 300 writes, into an address of the RAM 140 specified by the address value stored in the stack pointer storage register 103, the value stored in the first register of the general register group 104.

Then, the CPU 300 executes an instruction sequence of an interruption handler.

After completing the execution of the instruction sequence that needs to be actually executed, the CPU 300 reads a SP initial value from the RAM 140, and writes the SP initial value into the stack pointer storage register 103.

Then, the CPU 300 reads the instruction "MOV D3,D2" from the ROM 130, and stores, in the second register of the general register group 104, the value "0b0101" stored in the third register of the general register group 104.

The CPU 300 reads the instruction "AND #0b0001,D2" from the ROM 130, and executes the read instruction "AND #0b0001,D2". The CPU 300 performs an AND of the value "0b0101" stored in the second register of the general register group 104 and a value "0b0000" given as an immediate value. The CPU 300 stores a calculation result value "0b0001" in the second register of the general register group 104.

The CPU 300 reads the instruction "MOV #0b0001,D1" from the ROM 130, and executes the read instruction "MOV #0b0001,D1". As a result, the CPU 300 stores a value "0b0001" in the first register of the general register group 104.

The CPU 300 reads the instruction "CMP D1,D2" from the ROM 130, and executes the read instruction "CMP D1,D2". As a result, D1 and D2 match each other. Accordingly, the CPU 300 writes a value "1" to the flag register 202.

The CPU 300 reads the instruction "Bcc <Label_4>" from the ROM 130, and executes the read instruction "Bcc <Label_4>". As a result, the value stored in the flag register 202 is "1". Accordingly, the CPU 300 does not branch the processing to <Label_4>.

The CPU 300 reads the instruction "INC SP" from the ROM 130, and executes the read instruction "INC SP". As a result, the CPU 300 increments the address value stored in the stack pointer storage register 103 by the constant value, and stores the incremented address value in the stack pointer storage register 103.

The CPU 300 reads the instruction "MOV (SP),D1" from the ROM 130, and executes the read instruction "MOV (SP), D1". As a result, the CPU 300 writes, into the first register of the general register group 104, a value stored in an address specified by the address value stored in the stack pointer storage register 103 of the RAM 140.

The CPU 300 and the coprocessor 310 read the instruction "PUTACX D0,D1" from the ROM 130, and execute the read instruction "PUTACX D0,D1". As a result, the first calculation unit 112 stores, in the first calculation result storage register 313, the value stored in the first register of the general register group 104.

The CPU 300 reads the instruction "INC D0" from the ROM 130, and executes the read instruction "INC D0". As a result, the CPU 300 increments the value stored in the zeroth register of the general register group 104 by 1, and stores the incremented value in the zeroth register.

The CPU 300 reads the instruction "MOV D3,D2" from the ROM 130, and stores, in the second register of the general register group 104, the value "0b0101" stored in the third register of the general register group 104.

The CPU 300 reads the instruction "AND #0b0010,D2" from the ROM 130, and executes the read instruction "AND #0b0010,D2". The CPU 300 performs an AND of the value "0b0101" stored in the second register of the general register group 104 and a value "0b0010" given as an immediate value. The CPU 300 stores a calculation result value "0b0000" in the second register of the general register group 104.

The CPU 300 reads the instruction "MOV #0b0010,D1" from the ROM 130, and executes the read instruction "MOV #0b0010,D1". As a result, the CPU 300 stores a value "0b0010" in the first register of the general register group 104.

The CPU 300 reads the instruction "CMP D1,D2" from the ROM 130, and executes the read instruction "CMP D1,D2". As a result, D1 and D2 do not match each other. Accordingly, the CPU 300 writes a value "0" into the flag register 202.

The CPU 300 reads the instruction "Bcc <Label_5>" from the ROM 130, and executes the read instruction "Bcc <Label_5>". As a result, the value stored in the flag register 202 is "0". Accordingly, the CPU 300 branches the processing to <Label_5>.

The CPU 300 reads the instruction "INC D0" from the ROM 130, and executes the read instruction "INC D0". As a result, the CPU 300 increments the value stored in the zeroth register of the general register group 104 by 1, and stores the incremented value in the zeroth register.

The CPU 300 reads the instruction "MOV D3,D2" from the ROM 130, and stores, in the second register of the general register group 104, the value "0b0101" stored in the third register of the general register group 104.

The CPU 300 reads the instruction "AND #0b0100,D2" from the ROM 130, and executes the read instruction "AND #0b0100,D2". The CPU 300 performs an AND of the value "0b0101" stored in the second register of the general register group 104 and a value "0b0100" given as an immediate value. The CPU 300 stores a calculation result value "0b0100" in the second register of the general register group 104.

The CPU 300 reads the instruction "MOV #0b0100,D1" from the ROM 130, and executes the read instruction "MOV #0b0001, D1". As a result, the CPU 300 stores the value "0b0100" in the first register of the general register group 104.

The CPU 300 reads the instruction "CMP D1,D2" from the ROM 130, and executes the read instruction "CMP D1,D2". As a result, D1 and D2 match each other. Accordingly, the CPU 300 writes a value "1" into the flag register 202.

The CPU 300 reads the instruction "Bcc <Label_6>" from the ROM 130, and executes the read instruction "Bcc <Label_6>". As a result, the value stored in the flag register 202 is "1". Accordingly, the CPU 300 does not branch the processing to <Label_6>.

The CPU 300 reads the instruction "INC SP" from the ROM 130, and executes the read instruction "INC SP". As a result, the CPU 300 increments the address value stored in the stack pointer storage register 103 by the constant value, and stores the incremented address value in the stack pointer storage register 103.

The CPU 300 reads the instruction "MOV (SP),D1" from the ROM 130, and executes the read instruction "MOV (SP) D1". As a result, the CPU 300 reads, into the first register of the general register group 104, a value stored in an address specified by the address value stored in the stack pointer storage register 103 of the RAM 140.

The CPU 300 reads the instruction "PUTACX D0,D1" from the ROM 130, and executes the read instruction "PUTACX D0,D1". As a result, the third calculation unit 314 stores, in the third calculation result storage register 315, the value stored in the first register of the general register group 104.

Returning to the instruction sequence 1410 shown in FIG. 14, the subsequent operations are described.

The CPU 300 restores, to the general register group 104, the value that has been saved to the RAM 140.

At this time, the value "0" that has been saved from the second register of the general register group 104 to the RAM 140 is also stored in the second register of the general register group 104.

The CPU 300 reads the instruction "RTI" from the ROM 130, and executes the read instruction "RTI". As a result, the CPU 300 executes an instruction included in the instruction sequence 1400 that is normal processing, and reads the subsequent instruction "GETACX D2,D1" from the ROM 130, and executes the read instruction "GETACX D2,D1".

As have been described above, the third embodiment has the structure in which when the information processing apparatus 350 is reset, information relating to a calculation unit is transmitted from the coprocessor 310 to the CPU 300. Accordingly, the CPU 300 can detect a type of the calculation unit implemented in the coprocessor 310. Based on the acquired information relating to the calculation unit, the CPU 300 can output a number for designating a register to the first data input bus 120. Also, the CPU 300 can detect a number that needs to be output.

Fourth Embodiment

In the above first to third embodiments, data is saved from all the registers. However, saving data from all the registers is not necessarily required. At a time when an interruption occurs, if data is saved from a register from which the data does not need to be saved, it takes an unnecessary long time period to start executing an instruction that is to be actually executed in interruption processing. In view of this problem, the fourth embodiment aims to eliminate such an unnecessary time period.

The following case is a case in which saving of data from all the registers is not necessarily required in the fourth embodiment. For example, a certain calculation unit is not used for an interruption handler. In such a case, no data is written over data stored in a register implemented in the certain calculation unit that is not used. That is, a calculation that has been performed in normal processing does not disappear.

Therefore, the fourth embodiment describes a case in which when an interruption occurs, data is not saved from a register that corresponds to a calculation unit that is not used in such interruption processing.

<Structure>

Figure 16:
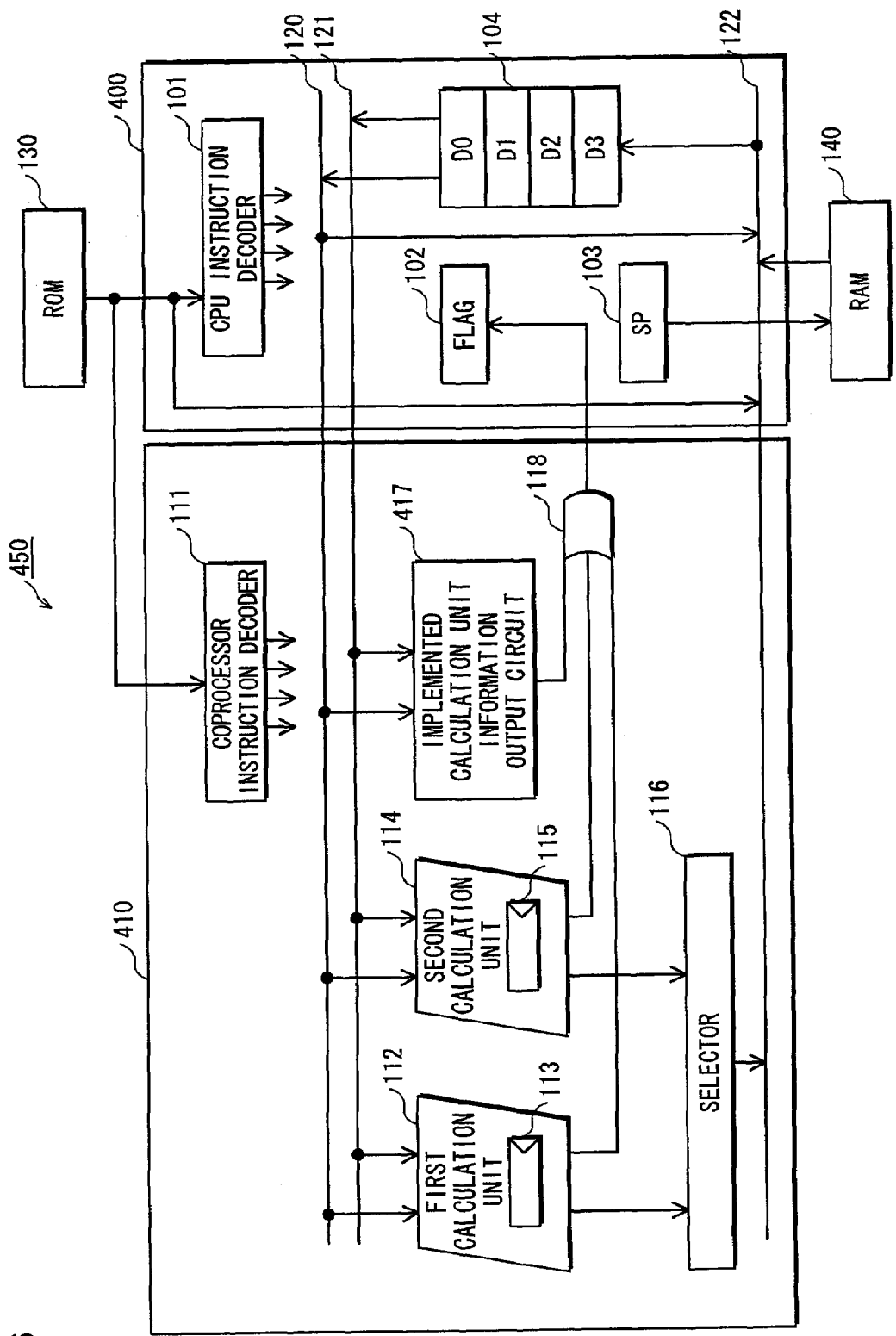
FIG. 16 is a block diagram showing the functional structure of an information processing apparatus 450 according to a fourth embodiment.

FIG. 16 shows the functional structure of an information processing apparatus 450 according to the fourth embodiment. The information processing apparatus 450 includes, as shown in FIG. 16, a CPU 400, a coprocessor 410, a ROM 130, and a RAM 140.

The CPU 400 includes a CPU instruction decoder 101, a flag register 102, a stack pointer storage register 103, and a general register group 104.

The coprocessor 410 includes a coprocessor instruction decoder 111, a first calculation unit 112, a second calculation unit 114, a first calculation result storage register 113, a second calculation result storage register 115, and a selector 116.

The functional units in the fourth embodiment having the same names and reference numerals as those in the first embodiment perform the same functions as those in the first embodiment. Therefore, descriptions thereof are omitted.

The information processing apparatus 450 according to the fourth embodiment includes an implemented calculation unit information output circuit 417, which functions differently from the implemented calculation unit information output circuit 117 included in the information processing 150 according to the first embodiment.

The implemented calculation unit information output circuit 417 stores therein a correspondence between an interruption level and the count of registers from which data is to be saved. When the later-described instruction "PUTLVL Dm,Dn" is executed, the implemented calculation unit information output circuit 417 determines the count of registers from which data is to be saved, based on an interruption level acquired via the first data input bus 120. When the instruction "GETACX Dm,Dn" is executed, the implemented calculation unit information output circuit 417 compares the determined count of registers from which data is to be saved with a value of the first data input bus 120. When the determined count of registers matches the value of the first data input bus 120, the implemented calculation unit information output circuit 417 outputs a flag value "1". When the determined count of registers does not match the value of the first data input bus 120, the implemented calculation unit information output circuit 417 outputs a flag value "0".

In the fourth embodiment, the interruption level includes a level "0" and a level "1". When an interruption occurs at the level "0", the implemented calculation unit information output circuit 417 determines that the count of registers from which data is to be saved is two. Also, when an interruption occurs at the level "1", the implemented calculation unit information output circuit 417 determines that the count of the registers from which data is to be saved is one.

<Command>

The following describes instructions according to the fourth embodiment.

<Extended Calculation Instruction>

The coprocessor instructions according to the fourth embodiment are described. FIG. 17 is a list showing an example of mnemonics of coprocessor instructions to be read from the ROM 130 by the CPU 400 and the coprocessor 410 and operations of the CPU 400 and operations of the coprocessor 410 corresponding to the mnemonics.

<Instruction "PUTLVL Dm,Dn">

An instruction "PUTLVL Dm,Dn" is an instruction for determining the count of registers from which data is to be saved in accordance with an interruption level, and setting the determined count of the registers as a value of the implemented calculation unit information output circuit 417 of the coprocessor 410.

The CPU 400 and the coprocessor 410 read the instruction "PUTLVL Dm,Dn", and execute the read instruction "PUTLVL Dm,Dn". The CPU instruction decoder 101 decodes the instruction "PUTLVL Dm,Dn". In accordance with the decoded instruction, the CPU instruction decoder 101 outputs a control signal to each circuit included in the CPU 400. The coprocessor instruction decoder 111 decodes the instruction "PUTLVL Dm,Dn". In accordance with the decoded instruction, the coprocessor instruction decoder 111 outputs a control signal to each circuit included in the coprocessor 410. The general register group 104 outputs Dm to the first data input bus 120, and outputs Dn to the second data input bus 121. The implemented calculation unit information output circuit 417 stores therein, as an interruption level, a value acquired via the first data input bus 120. Depending on the stored value, the implemented calculation unit information output circuit 417 generates information indicating the count of registers from/to which data is to be saved/restored.

<Instruction "GETACX Dm,Dn">

Here, with respect to the instruction "GETACX Dm,Dn", the operations of the information processing apparatus 450 according to the fourth embodiment are described for each interruption level.

The CPU 400 and the coprocessor 410 read the instruction "GETACX Dm,Dn" from the ROM 130, and execute the read instruction "GETACX Dm,Dn".

The CPU instruction decoder 101 decodes the instruction "GETACX Dm,Dn", and outputs a control signal to each circuit included in the CPU 400. Also, the coprocessor instruction decoder 111 decodes the instruction "GETACX Dm,Dn", and outputs a control signal to each circuit included in the coprocessor 410.

The general register group 104 outputs Dm to the first data input bus 120, and outputs Dn to the second data input bus 121. The first data input bus 120 transmits Dm to the first calculation unit 112 of the coprocessor 410. The second data input bus 121 transmits Dn to the first calculation unit 112 of the coprocessor 410. Three cases are described below:

(1) a case where a value is read from the first calculation result storage register 113 when the implemented calculation unit information output circuit 417 stores therein an interruption level "0";

(2) a case where a value is read from the first calculation result storage register 113 when the implemented calculation unit information output circuit 417 stores therein an interruption level "1"; and (3) a case where a value is read from the second calculation result storage register 115 when the implemented calculation unit information output circuit 417 stores therein an interruption level "0".

Note when an interruption level is "1", data is not read from the second calculation result storage register 115.

(1) Case where Value is Read from First Calculation Result Storage Register 113 when Implemented Calculation Unit Information Output Circuit 417 Stores therein Interruption Level "0".

The first calculation unit 112 reads, via the first data input bus 120, that Dm is "1" representing the first calculation unit 112. The first calculation result storage register 113 outputs a value stored therein to the selector 116.

In accordance with the control signal output by the coprocessor instruction decoder 111, the selector 116 selects data that has been output by the first calculation result storage register 113, and outputs the selected data to the data output bus 122.

In accordance with the control signal output by the coprocessor instruction decoder 111, the implemented calculation unit information output circuit 417 compares a value acquired via the first data input bus 120 with the count of registers from/to which data is saved/restored. The acquired value is smaller than the count of the registers, and therefore the implemented calculation unit information output circuit 417 outputs a flag value "0".

The OR circuit 118 performs an OR of a calculation result flag of the first calculation unit 112, a calculation result flag of the second calculation unit 114, and an output value of the implemented calculation unit information output circuit 417. In this case, the OR circuit 118 outputs the flag value "0" of the implemented calculation unit information output circuit 417.

The output value of the first calculation result storage register 113 output by the selector 116 is transmitted to the general register group 104 of the CPU 400 via the data output bus 122. The general register group 104 acquires the value of the data output bus 122, and stores the acquired value in the n-th register thereof. The flag register 102 stores therein, as a calculation result flag, the flag value "0" output by the implemented calculation unit information output circuit 417 of the coprocessor 410.

(2) Case where Value is Read from First Calculation Result Storage Register 113 when Implemented Calculation Unit Information Output Circuit 417 Stores therein Interruption Level "1"

The first calculation unit 112 reads, via the first data input bus 120, a value "1" representing the first calculation unit 112. The first calculation result storage register 113 outputs a value stored therein to the selector 116.

In accordance with the control signal output by the coprocessor instruction decoder 111, the selector 116 selects data that has been output by the first calculation result storage register 113, and outputs the selected data to the data output bus 122.

In accordance with the control signal output by the coprocessor instruction decoder 111, the implemented calculation unit information output circuit 417 compares a value acquired via the first data input bus 120 with the count of registers from/to which data is saved/restored. The acquired value is greater than the count of the registers, and therefore the implemented calculation unit information output circuit 417 outputs a flag value "1".

The OR circuit 118 performs an OR of a calculation result flag of the first calculation unit 112, a calculation result flag of the second calculation unit 114, and an output value of the implemented calculation unit information output circuit 417. In this case, the OR circuit 118 outputs the flag value "1" of the implemented calculation unit information output circuit 417.

The output value of the first calculation result storage register 113 output by the selector 116 is transmitted to the general register group 104 of the CPU 400 via the data output bus 122.

The general register group 104 acquires the value of the data output bus 122, and stores the acquired value in the n-th register thereof. The flag register 102 stores therein, as a calculation result flag, the flag value "1" output by the implemented calculation unit information output circuit 417 of the coprocessor 410.

(3) Case where Value is Read from Second Calculation Result Storage Register 115 when Implemented Calculation Unit Information Output Circuit 417 Stores therein Interruption Level "0"

The second calculation unit 114 reads, via the first data input bus 120, a value "2" representing the second calculation unit 114. The second calculation result storage register 115 outputs a value stored therein to the selector 116.

In accordance with the control signal output by the coprocessor instruction decoder 111, the selector 116 selects data that has been output by the second calculation result storage register 115, and outputs the selected data to the data output bus 122.

In accordance with the control signal output by the coprocessor instruction decoder 111, the implemented calculation unit information output circuit 417 compares a value acquired via the first data input bus 120 with the count of registers from/to which data is saved/restored. The acquired value is greater than the count of the registers, and therefore the implemented calculation unit information output circuit 417 outputs a flag value "1".

The OR circuit 118 performs an OR of a calculation result flag of the first calculation unit 112, a calculation result flag of the second calculation unit 114, and an output value of the implemented calculation unit information output circuit 417. In this case, the OR circuit 118 outputs the flag value "1" of the implemented calculation unit information output circuit 417.

The output value of the second calculation result storage register 115 output by the selector 116 is transmitted to the general register group 104 of the CPU 400 via the data output bus 122.

The general register group 104 acquires the value of the data output bus 122, and stores the acquired value in the n-th register thereof. The flag register 102 stores therein, as a calculation result flag, the flag value "1" output by the implemented calculation unit information output circuit 417 of the coprocessor 410.

This completes the description of the instruction "GETACX-Dm,Dn" according to the fourth embodiment.

<Operations>

The operations of the information processing apparatus 450 according to the fourth embodiment are described with use of a specific example of an instruction sequence. Firstly, a case of occurrence of an interruption at an interruption level "0" is described with reference to FIG. 18. Then, a case of occurrence of an interruption at an interruption level "1" is described with reference to FIG. 19.

Figure 18:
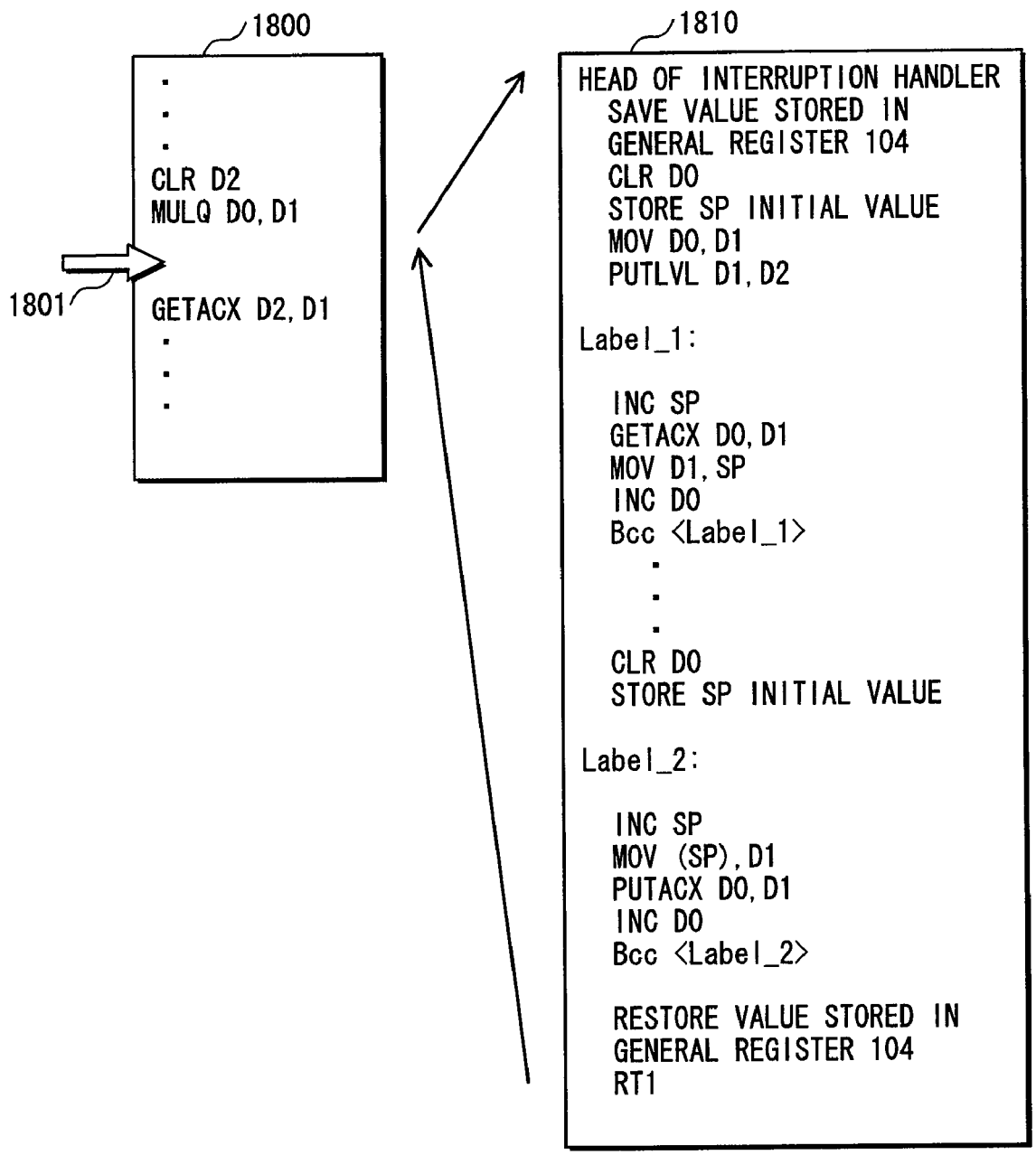
FIG. 18 shows an instruction sequence representing an example of an assembler program in a case where an interruption at an interruption level "0" occurs.

FIG. 18 shows an instruction sequence representing an example of an assembler program using the instructions described in FIGS. 2, 3, 13, and 17 in a case where an interruption at an interruption level "0" occurs. The following describes the operations for executing this instruction sequence. An arrow 1801 shown in FIG. 18 indicates a timing when an interruption occurs.

The CPU 400 executes an instruction sequence 1800 that is normal processing stored in the ROM 130.

The CPU 400 reads the instruction "CLR D2" included in the instruction sequence 1800 that is the normal processing from the ROM 130, and executes the read instruction "CLR D2". As a result, the CPU 400 stores a value "0" in the second register of the general register group 104.

The CPU 400 reads the instruction "MULQ D0,D1" from the ROM 130, and executes the read instruction "MULQ D0,D1". As a result, the first calculation unit 112 stores the higher bits of a multiplication result in the first calculation result storage register 113. Also, the CPU 400 stores the lower bits of the multiplication result in the first register of the general register group 104, and stores a calculation result flag in the flag register 102.

After executing the above instruction "MULQ D0, D1", the CPU 400 receives an interruption, and executes an instruction at a head of an instruction sequence 1810 of an interruption handler.

The CPU 400 saves a value stored in the general register group 104 to the RAM 140. At this time, the value "0" stored in the second register of the general register group 104 is also saved to the RAM 140.

The CPU 400 reads the instruction "CLR D0" from the ROM 130, and executes the read instruction "CLR D0". As a result, the CPU 400 stores a value "0" in the zeroth register of the general register group 104. Also, the CPU 400 stores, as an SP initial value, in the RAM 140, an address value stored in the stack pointer storage register 103.

The CPU 400 reads the instruction "MOV D0,D1" from the ROM 130, and stores, in the first register of the general register group 104, the value "0" stored in the zeroth register of the general register group 104.

The CPU 400 reads the instruction "PUTLVL D1,D2" from the ROM 130, and executes the read instruction "PUTLVL D1,D2". As a result, the implemented calculation unit information output circuit 417 stores therein a value "0" as an interruption level, and determines that the count of registers from/to which data is to be saved/restored is two based on the interruption level "0".

The CPU 400 reads the instruction "INC SP" from the ROM 130, and executes the read instruction "INC SP". As a result, the CPU 400 increments the address value stored in the stack pointer storage register 103 by a constant value, and stores the incremented address value in the stack pointer storage register 103.

The CPU 400 reads the instruction "GETACX D0,D1" from the ROM 130, and executes the read instruction "GETACX D0,D1". As a result, the CPU 400 stores, in the first register of the general register group 104, the value stored in the first calculation result storage register 113. Also, the CPU 400 stores, in the flag register 102, the flag value "0" output by the implemented calculation unit information output circuit 417.

The CPU 400 reads the instruction "MOV D1,SP" from the ROM 130, and executes the read instruction "MOV D1,SP". As a result, the CPU 400 writes, into an address of the RAM 140 specified by the address value stored in the stack pointer storage register 103, the value stored in the first register of the general register group 104.

The CPU 400 reads the instruction "INC D0" from the ROM 130, and executes the read instruction "INC D0". As a result, the CPU 400 increments the value stored in the zeroth register of the general register group 104 by 1, and stores the incremented value in the zeroth register.

The CPU 400 reads the instruction "Bcc <Label_1>" from the ROM 130, and executes the read instruction "Bcc <Label_1>". The value stored in the flag register 102 is "0". Accordingly, the CPU 400 branches the processing to <Label_1>.

The CPU 400 reads the instruction "INC SP" from the ROM 130, and executes the read instruction "INC SP". As a result, the CPU 400 increments the address value stored in the stack pointer storage register 103 by the constant value, and stores the incremented address value in the stack pointer storage register 103.

The CPU 400 reads the instruction "GETACX D0,D1" from the ROM 130, and executes the read instruction "GETACX D0,D1". As a result, the CPU 400 stores, in the first register of the general register group 104, the value stored in the second calculation result storage register 115. Also, the CPU 400 stores, in the flag register 102, the flag value "1" output by the implemented calculation unit information output circuit 417.

The CPU 400 reads the instruction "MOV D1, (SP)" from the ROM 130, and executes the read instruction "MOV D1, (SP)". As a result, the CPU 400 writes, into an address of the RAM 140 specified by the address value stored in the stack pointer storage register 103, the value stored in the first register of the general register group 104.

The CPU 400 reads the instruction "INC D0" from the ROM 130, and executes the read instruction "INC D0". As a result, the CPU 400 increments the value stored in the zeroth register of the general register group 104 by 1, and stores the incremented value in the zeroth register.

The CPU 400 reads the instruction "Bcc <Label__1>" from the ROM 130, and executes the read instruction "Bcc <Label__1>". The value stored in the flag register 102 is "1". Accordingly, the CPU 400 does not branch the processing to <Label__1>. After this, the CPU 400 executes an instruction included in the instruction sequence of the interruption handler.

After executing the instruction sequence of the interruption handler, the CPU 400 reads the instruction "CLR D0" from the ROM 130, and executes the read instruction "CLR D0". As a result, the CPU 400 stores a value "0" in the zeroth register of the general register group 104. Also, the CPU 400 reads the SP initial value from the RAM 140, and writes the read SP initial value into the stack pointer storage register 103.

The CPU 400 reads the instruction "INC SP" from the ROM 130, and executes the read instruction "INC SP". As a result, the CPU 400 increments the address value stored in the stack pointer storage register 103 by the constant value, and stores the incremented address value in the stack pointer storage register 103.

The CPU 400 reads the instruction "MOV (SP),D1" from the ROM 130, and executes the read instruction "MOV (SP), D". As a result, the CPU 400 reads, to the first register of the general register group 104, a value stored in an address specified by the address value stored in the stack pointer storage register 103 of the RAM 140.

The CPU 400 reads the instruction "PUTACX D0,D1" from the ROM 130, and executes the read instruction "PUTACX D0,D1". As a result, the first calculation unit 112 stores, in the first calculation result storage register 113, the value stored in the first register of the general register group 104. Also, the CPU 400 stores, in the flag register 102, the flag value "0" output by the implemented calculation unit information output circuit 417.

The CPU 400 reads the instruction "INC D0" from the ROM 130, and executes the read instruction "INC D0". As a result, the CPU 400 increments the value stored in the zeroth register of the general register group 104 by 1, and stores the incremented value in the zeroth register.

The CPU 400 reads the instruction "Bcc <Label 2>" from the ROM 130, and executes the read instruction "Bcc <Label__2>". The value stored in the flag register 102 is "0". Accordingly, the CPU 400 branches the processing to <Label__2>.

The CPU 400 reads the instruction "INC SP" from the ROM 130, and executes the read instruction "INC SP". As a result, the CPU 400 increments the address value stored in the stack pointer storage register 103 by the constant value, and stores the incremented address value in the stack pointer storage register 103.

The CPU 400 reads the instruction "MOV (SP),D1" from the ROM 130, and executes the read instruction "MOV (SP), D1". As a result, the CPU 400 reads, to the first register of the general register group 104, a value stored in an address specified by the address value stored in the stack pointer storage register 103 of the RAM 140.

The CPU 400 reads the instruction "PUTACX D0,D1" from the ROM 130, and executes the read instruction "PUTACX D0,D1". As a result, the second calculation unit 114 stores, in the second calculation result storage register 115, the value stored in the first register of the general register group 104. Also, the CPU 400 stores, in the flag register 102, a flag value "1" output by the implemented calculation unit information output circuit 417.

The CPU 400 reads the instruction "INC D0" from the ROM 130, and executes the read instruction "INC D0". As a result, the CPU 400 increments the value stored in the zeroth register of the general register group 104 by 1, and stores the incremented value in the zeroth register.

The CPU 400 reads the instruction "Bcc <Label__2>" from the ROM 130, and executes the read instruction "Bcc <Label 2>". The value stored in the flag register 102 is "1". Accordingly, the CPU 400 does not branch the processing to <Label__2>.

The CPU 400 restores, to the general register group 104, the value that has been saved to the RAM 140. At this time, the value "0" that has been saved from the second register of the general register group 104 to the RAM 140 is stored in the second register of the general register group 104.

The CPU 400 reads the instruction "RTI" from the ROM 130, and executes the read instruction "RTI". As a result, the CPU 400 executes an instruction included in the instruction sequence 1800 that is normal processing.

The CPU 400 reads the instruction "GETACX D2,D1" from the ROM 130, and executes the read instruction "GETACX D2,D1". As a result, the CPU 400 stores, in the second register of the general register group 104, the value stored in the first calculation result storage register 113. Also, the CPU 400 stores, in the flag register 102, the flag value "0" output by the implemented calculation unit information output circuit 417.

The following describes the operations of the information processing apparatus 450 in a case where an interruption occurs at an interruption level "1".

Figure 19:
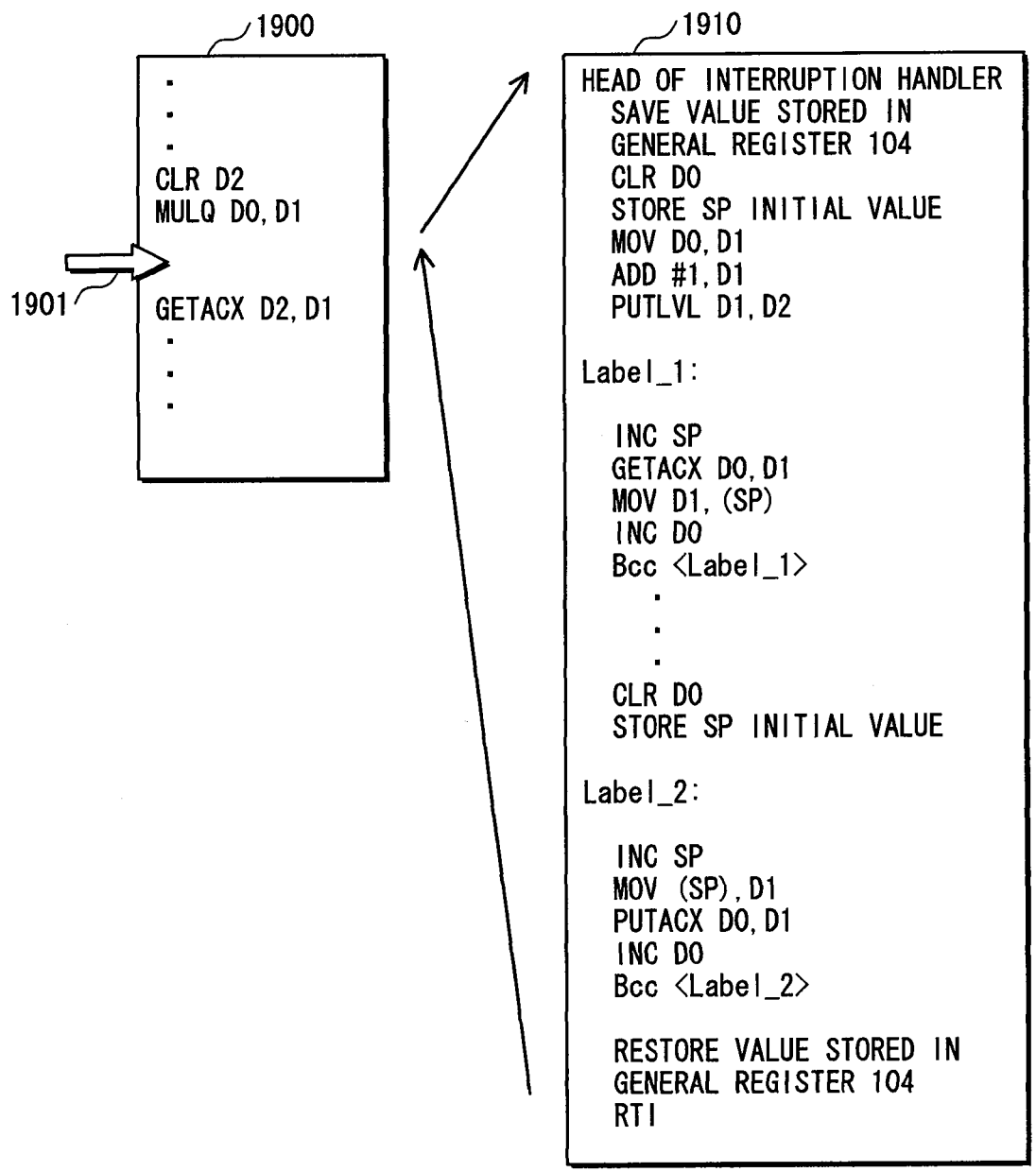
FIG. 19 shows an instruction sequence representing an example of an assembler program in a case where interruption at an interruption level "1" occurs.

FIG. 19 shows an instruction sequence representing an example of an assembler program using the instructions described in FIGS. 2, 3, 13, and 17 in a case where an interruption at an interruption level "1" occurs. The following describes the operations for executing this instruction sequence.

The CPU 400 executes an instruction sequence 1900 that is normal processing stored in the ROM 130.

The CPU 400 reads the instruction "CLR D2" included in the instruction sequence 1900 that is the normal processing from the ROM 130, and executes the read instruction "CLR D2". As a result, the CPU 400 stores a value "0" in the second register of the general register group 104.

The CPU 400 reads the instruction "MULQ D0,D1" from the ROM 130, and executes the read instruction "MULQ D0,D1". As a result, the first calculation unit 112 stores the higher bits of a multiplication result in the first calculation result storage register 113. Also, the CPU 400 stores the lower bits of the multiplication result in the first register of the general register group 104, and stores a calculation result flag in the flag register 102.

After executing the instruction "MULQ D0,D1", the CPU 400 receives an interruption, and executes an instruction at a head of an instruction sequence 1910 of an interruption handler.

The CPU 400 saves, to the RAM 140, a value stored in the general register group 104 in the instruction sequence of the interruption handler. At this time, a value "0" stored in the second register of the general register group 104 is also saved to the RAM 140.

The CPU 400 reads the instruction "CLR D0" from the ROM 130, and executes the read instruction "CLR D0". As a result, the CPU 400 stores a value "0" in the zeroth register of the general register group 104. Also, the CPU 400 stores, as an SP initial value, in the RAM 140, an address value stored at this time in the stack pointer storage register 103.

The CPU 400 reads the instruction "MOV D0,D1" from the ROM 130, and stores, in the first register of the general register group 104, the value "0" stored in the zeroth register of the general register group 104.

The CPU 400 reads the instruction "ADD #1,D1" from the ROM 130, and increments a value stored in the first register of the general register group 104 by 1, and stores a value "1" in the first register.

The CPU 400 reads the instruction "PUTLVL D1,D2" from the ROM 130, and executes the read instruction "PUTLVL D1,D2". As a result, the implemented calculation unit information output circuit 417 stores therein a value "1" as an interruption level, and determines that the count of registers from/to which data is to be saved/restored is one based on the interruption level "1".

The CPU 400 reads the instruction "INC SP" from the ROM 130, and executes the read instruction "INC SP". As a result, the CPU 400 increments the address value stored in the stack pointer storage register 103 by the constant value, and stores the incremented address value in the stack pointer storage register 103.

The CPU 400 reads the instruction "GETACX D0,D1" from the ROM 130, and executes the read instruction "GETACX D0,D1". As a result, the CPU 400 stores, in the first register of the general register group 104, the value stored in the first calculation result storage register 113. Also, the CPU 400 stores, in the flag register 102, the flag value "1" output by the implemented calculation unit information output circuit 417.

The CPU 400 reads the instruction "MOV D1, (SP)" from the ROM 130, and executes the read instruction "MOV D1, (SP)". As a result, the CPU 400 writes, into an address of the RAM 140 specified by the address value stored in the stack pointer storage register 103, the value stored in the first register of the general register group 104.

The CPU 400 reads the instruction "INC D0" from the ROM 130, and executes the read instruction "INC D0". As a result, the CPU 400 increments the value stored in the zeroth register of the general register group 104 by 1, and stores the incremented value in the zeroth register.

The CPU 400 reads the instruction "Bcc <Label_1>" from the ROM 130, and executes the read instruction "Bcc <Label_1>". The value stored in the flag register 102 is "1". Accordingly, the CPU 400 does not branch the processing to <Label_1>.

Then, the CPU 400 executes the instruction sequence of the interruption handler.

After completing the execution of the instructions included in the instruction sequence of the interruption handler, the CPU 400 reads the instruction "CLR D0" from the ROM 130, and executes the read instruction "CLR D0". Also, the CPU 400 reads the SP initial value from the RAM 140, and writes the read SP initial value into the stack pointer storage register 103.

The CPU 400 reads the instruction "INC SP" from the ROM 130, and executes the read instruction "INC SP". As a result, the CPU 400 increments the address value stored in the stack pointer storage register 103 by the constant value, and stores the incremented address value in the stack pointer storage register 103.

The CPU 400 reads the instruction "MOV (SP),D" from the ROM 130, and executes the read instruction "MOV (SP),D1". As a result, the CPU 400 reads, to the first register of the general register group 104, a value stored in an address specified by the address value stored in the stack pointer storage register 103 of the RAM 140.

The CPU 400 and the coprocessor 410 read the instruction "PUTACX D0,D1" from the ROM 130, and execute the read instruction "PUTACX D0,D1". As a result, the first calculation unit 112 stores, in the first calculation result storage register 113, the value stored in the first register of the general register group 104. Also, the CPU 400 stores, in the flag register 102, the flag value "1" output by the implemented calculation unit information output circuit 417.

The CPU 400 reads the instruction "INC D0" from the ROM 130, and executes the read instruction "INC D0". As a result, the CPU 400 increments the value stored in the zeroth register of the general register group 104 by 1, and stores the incremented value in the zeroth register.

The CPU 400 reads the instruction "Bcc <Label_2>" from the ROM 130, and executes the read instruction "Bcc <Label_2>". The value stored in the flag register 102 is "1". Accordingly, the CPU 400 does not branch the processing to <Label_2>.

The CPU 400 restores, to the general register group 104, the value that has been saved to the RAM 140. At this time, the value "0" that has been saved from the second register of the general register group 104 to the RAM 140 is restored to the second register of the general register group 104.

The CPU 400 reads the instruction "RTI" from the ROM 130, and executes the read instruction "RTI". As a result, the CPU 400 executes an instruction included in the instruction sequence 1900 that is the normal processing.

The CPU 400 reads the instruction "GETACX D2,D1" from the ROM 130, and executes the read instruction "GETACX D2,D1". As a result, the CPU 400 stores, in the second register of the general register group 104, the value stored in the first calculation result storage register 113. Also, the CPU 400 stores, in the flag register 102, the flag value "0" output by the implemented calculation unit information output circuit 417. Then, the information processing apparatus 450 performs the subsequent processing.

As have been described, in the fourth embodiment, in accordance with an interruption level, a calculation unit to be used in interruption processing corresponding to the interruption level is determined beforehand. Accordingly, the fourth embodiment is characterized in that a register from which data is to be saved is specified in accordance with interruption level. Unnecessary saving of data from a register is not performed, and therefore it is possible to reduce a time period required for saving data to perform interruption processing and a time period required for restoring the data to end the interruption processing and return to normal processing.

Fifth Embodiment

In the above embodiments, even if an extended calculation instruction is not executed during a task, task switching causes an overhead for saving/restoring data stored in a register. The fifth embodiment describes that this overhead is reduced.

<Structure>

Figure 20:
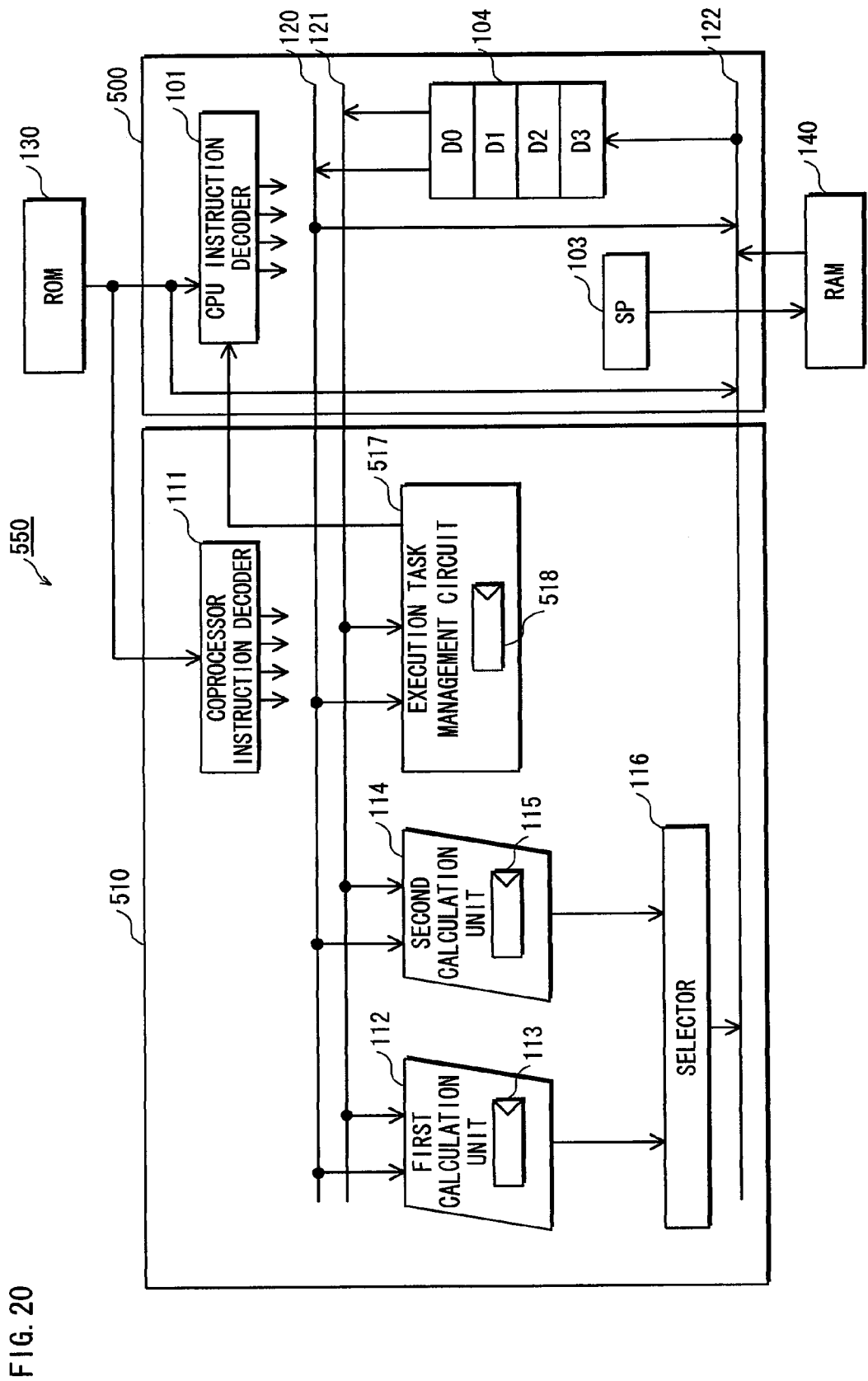
FIG. 20 is a block diagram showing the functional structure of an information processing apparatus 550 according to a fifth embodiment.

FIG. 20 is a block diagram showing the functional structure of an information processing apparatus 550 according to the fifth embodiment.

The information processing apparatus 550 includes, as shown in FIG. 20, a ROM 130, a RAM 140, a CPU 500, and a coprocessor 510.

The CPU 500 includes a CPU instruction decoder 101, a stack pointer storage register 103, and a general register group 104.

The coprocessor 510 includes a coprocessor instruction decoder 111, a first calculation unit 112, a first calculation result storage register 113, a second calculation unit 114, a second calculation result storage register 115, a selector 116, an execution task management circuit 517, and an extended calculation execution flag register 518.

The above first embodiment has the structure in which calculation result flags of the first calculation unit 112 and the second calculation unit 114 are output via the OR circuit 118. This structure is omitted in description and drawing of the fifth embodiment because of not being a characteristic of the fifth embodiment.

Also, the functional units in fifth embodiment having the same names and reference numerals as those in the first embodiment or the second embodiment perform the same functions as those in the first embodiment or the second embodiment. Therefore, descriptions thereof are omitted.

The execution task management circuit 517 includes the extended calculation execution flag register 518. The execution task management circuit 517 manages a task being executed in the coprocessor 510, and stores, in the extended calculation execution flag register 518, a value indicating whether an extended calculation has been performed. Also, the execution task management circuit 517 outputs an interruption request signal to the CPU instruction decoder 101 for requesting an interruption. Also, in the fifth embodiment, if an extended calculation instruction other than the instruction "GETACX Dm,Dn" is executed, the execution task management circuit 517 stores a value "1" in the extended calculation execution flag register 518.

The extended calculation execution flag register 518 stores therein an execution status of the coprocessor 510 that is set and cleared by the execution task management circuit 517.

<Command>

FIG. 21 is a list showing an example of mnemonics of coprocessor instructions to be read from the ROM 130 by the CPU 500 and the coprocessor 510 and operations of the CPU 500 and operations of the coprocessor 510 corresponding to the mnemonics.

<Instruction "PUTTSK Dm,Dn">

The CPU 500 and the coprocessor 510 read an instruction "PUTTSK Dm,Dn" from the ROM 130, and execute the read instruction "PUTTSK Dm,Dn". The CPU instruction decoder 101 decodes the instruction "PUTTSK Dm,Dn", and outputs a control signal to each circuit included in the CPU 500. The coprocessor instruction decoder 111 decodes the instruction "PUTTSK Dm,Dn", and outputs a control signal to each circuit included in the coprocessor 510.

The general register group 104 outputs Dm to the first data input bus 120, and outputs Dn to the second data input bus 121. The first data input bus 120 transmits Dm to the execution task management circuit 517 of the coprocessor 510. The execution task management circuit 517 stores therein, as a task number, the value acquired via the first data input bus 120, and clears a value stored in the extended calculation execution flag register 518.

<Operations>

The operations of the information processing apparatus 550 according to the fifth embodiment are described with use of a specific example of an instruction sequence.

Figure 22:
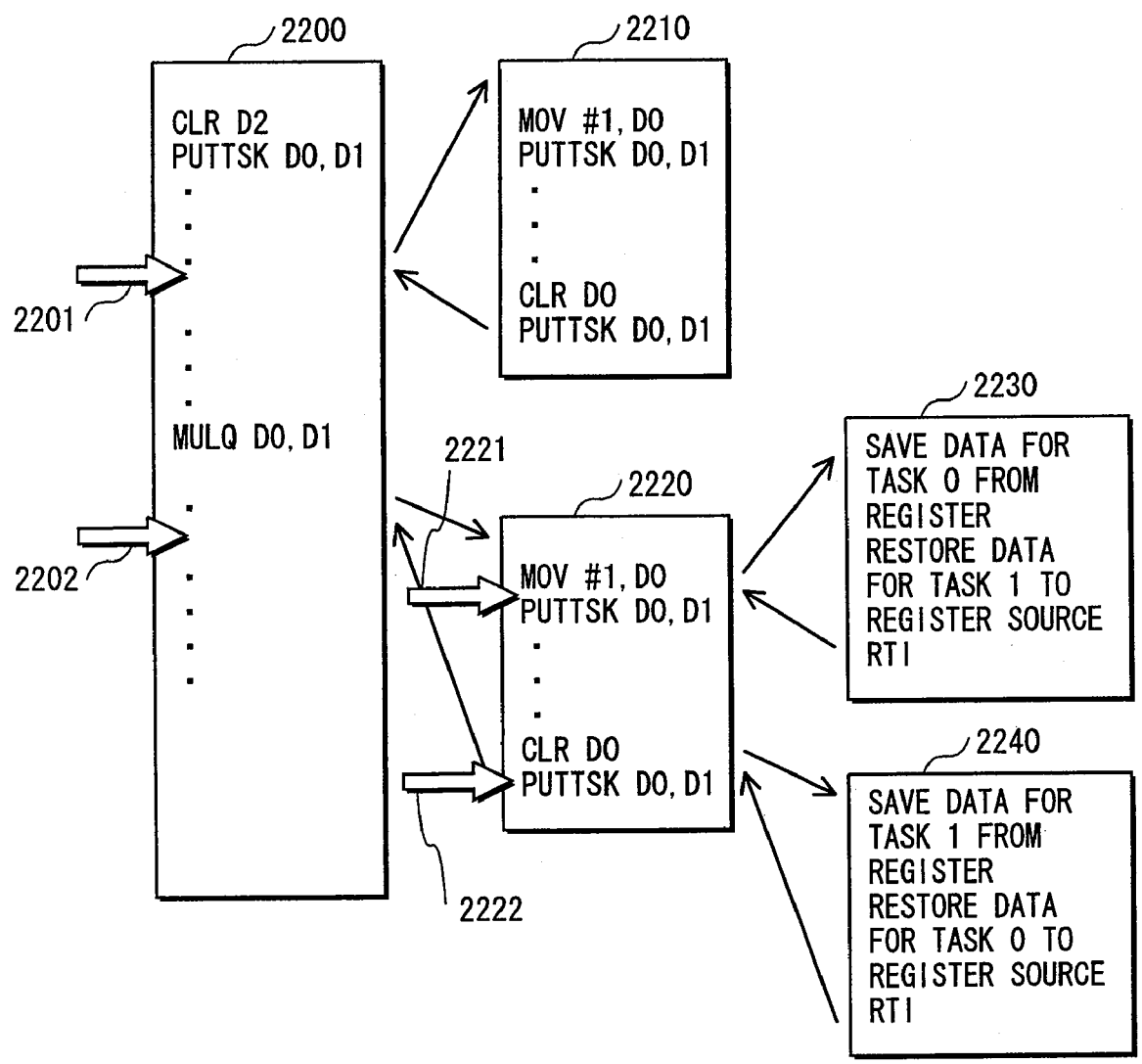
FIG. 22 shows an instruction sequence representing an example of an assembler program at task switching.

FIG. 22 shows an instruction sequence representing an example of an assembler program at task switching using the instructions described in FIGS. 2, 3, and 21. The operations for executing the instruction sequence are described below.

The CPU 500 executes an instruction sequence 2200 of a task 0 stored in the ROM 130.

The CPU 500 reads the instruction "CLR D2" included in the instruction sequence 1900 of the task 0 from the ROM 130, and executes the read instruction "CLR D2". As a result, the CPU 500 stores a value "0" in the second register of the general register group 104.

The CPU 500 reads the instruction "PUTTSK D0,D1" from the ROM 130, and executes the read instruction "PUTTSK D0,D1". As a result, the execution task management circuit 517 stores a task number "0" in the extended calculation execution flag register 518.

In accordance with a timing indicated by an arrow 2201, task switching occurs, the CPU 500 executes an instruction included in an instruction sequence 2210 of the task 1.

The CPU 500 reads the instruction "MOV #1,D0" included in the instruction sequence 2210 of the task 1 from the ROM 130, and executes the read instruction "MOV #1,D0". As a result, the CPU 500 stores a value "1" in the zeroth register of the general register group 104.

The CPU 500 reads the instruction "PUTTSK D0,D1" from the ROM 130, and executes the read instruction "PUTTSK D0,D1". As a result, the execution task management circuit 517 stores a task number "0" in the extended calculation execution flag register 518. At this time, the value stored in the extended calculation execution flag register 518 is "0". Accordingly, an interruption does not occur. After this, the CPU 500 executes an instruction included in the instruction sequence 2210 that is actually to be executed.

The CPU 500 completes the execution of the instruction included in the instruction sequence 2210 of the task 1 that is to be actually executed.

The CPU 500 reads the instruction "CLR D0" from the ROM 130, and executes the read instruction "CLR D0". As a result, the CPU 500 stores a value "0" in the zeroth register of the general register group 104.

The CPU 500 reads the instruction "PUTTSK D0,D1" from the ROM 130, and executes the read instruction "PUTTSK D0,D1". As a result, the execution task management circuit 517 stores a task number "0" in the extended calculation execution flag register 518. At this time, the value stored in the extended calculation execution flag register 518 is "0". Accordingly, an interruption does not occur.

The CPU 500 restarts executing the suspended instruction included in the instruction sequence 2200 of the task 0.

The CPU 500 reads the instruction "MULQ D0,D1" from the ROM 130, and executes the read instruction "MULQ D0,D1". As a result, the first calculation unit 112 stores the higher bits of a multiplication result in the first calculation result storage register 113. Also, the CPU 500 stores the lower bits of the multiplication result in the first register of the general register group 104, and stores a value "1" in the extended calculation execution flag register 518.

In accordance with a timing indicated by an arrow 2202, task switching occurs, and the CPU 500 executes an instruction included in an instruction sequence 2220 of the task 1.

The CPU 500 reads the instruction "MOV #1,D0" included in the instruction sequence 2220 of the task 1 from the ROM 130, and executes the read instruction "MOV #1,D0". As a result, the CPU 500 stores a value "1" in the zeroth register of the general register group 104.

The CPU 500 reads the instruction "PUTTSK D0,D1" from the ROM 130, and executes the read instruction "PUTTSK D0,D1". As a result, the execution task management circuit 517 stores a task number "1" in the extended calculation execution flag register 518. At this time, the value stored in the extended calculation execution flag register 518 is "1". Accordingly, an interruption occurs in accordance with a timing indicated by an arrow 2221.

The CPU 500 executes an instruction included in an instruction sequence 2230 of an interruption handler.

The CPU 500 executes the instruction sequence 2230 of the interruption handler, and saves, to the RAM 140, a value stored in a register of the coprocessor in the task 0. Note that specific processing for saving data is the same as those in the first to fourth embodiments.

The CPU 500 restores a value stored in a register of the coprocessor in the task 1 from the RAM 140. The CPU 500 reads the instruction "RTI" from the ROM 130, and executes the read instruction "RTI". The CPU 500 ends the interruption handler processing, and returns to the instruction sequence 2200 of the task 1.

The CPU 500 reads the instruction "MULQ D0,D1" from the ROM 130, and executes the read instruction "MULQ D0,D1". As a result, the first calculation unit 112 stores the higher bits of a multiplication result in the first calculation result storage register 113. Also, the CPU 500 stores the lower bits of the multiplication result in the first register of the general register group 104, and stores a value "1" in the extended calculation execution flag register 518.

The CPU 500 completes the execution of instructions included in the instruction sequence 2220 of the task 1 that are to be actually executed.

The CPU 500 reads the instruction "CLR D0" from the ROM 130, and executes the read instruction "CLR D0". As a result, the CPU 500 stores a value "0" in the zeroth register of the general register group 104.

The CPU 500 reads the instruction "PUTTSK D0,D1" from the ROM 130, and executes the read instruction "PUTTSK D0,D1". As a result, the execution task management circuit 517 stores a task number "0" in the extended calculation execution flag register 518. At this time, the value stored in the extended calculation execution flag register 518 is "1". Accordingly, an interruption occurs in accordance with a timing indicated by an arrow 2222.

The CPU 500 executes an instruction included in an instruction sequence 2240 of an interruption handler.

The CPU 500 executes the instruction sequence 2240 of the interruption handler, and saves, to the RAM 140, a value stored in a register of the coprocessor in the task 1. Note that specific processing for saving data is the same as those in the first to fourth embodiments.

The CPU 500 restores a value stored in a register of the coprocessor in the task 1 from the RAM 140.

The CPU 500 executes the instruction "RTI", and ends the interruption handler processing, and returns to the instruction sequence 2200 of the task 1.

The CPU 500 restarts executing the suspended instruction included in the instruction sequence 2200 of the task 0.

As have been described, in the fifth embodiment, in a case where a plurality of tasks are executed by switching between the tasks, when a task is switched to another task and data needs to be saved, the coprocessor can request the CPU to cause an interruption based on whether an extended calculation has been performed. It is possible to prevent an interruption from occurring during a task when no extended calculation has been performed.

Sixth Embodiment

In the first embodiment, when an interruption occurs, data is certainly saved from a register of the coprocessor 110. However, when an extended calculation has not been executed in the coprocessor 110 for example, processing for saving data is unnecessary. Accordingly, it takes an unnecessary long time period to start executing an instruction that is to be actually executed in interruption processing. As a result, an overhead occurs. The sixth embodiment describes that this overhead is removed.

<Structure>

Figure 23:
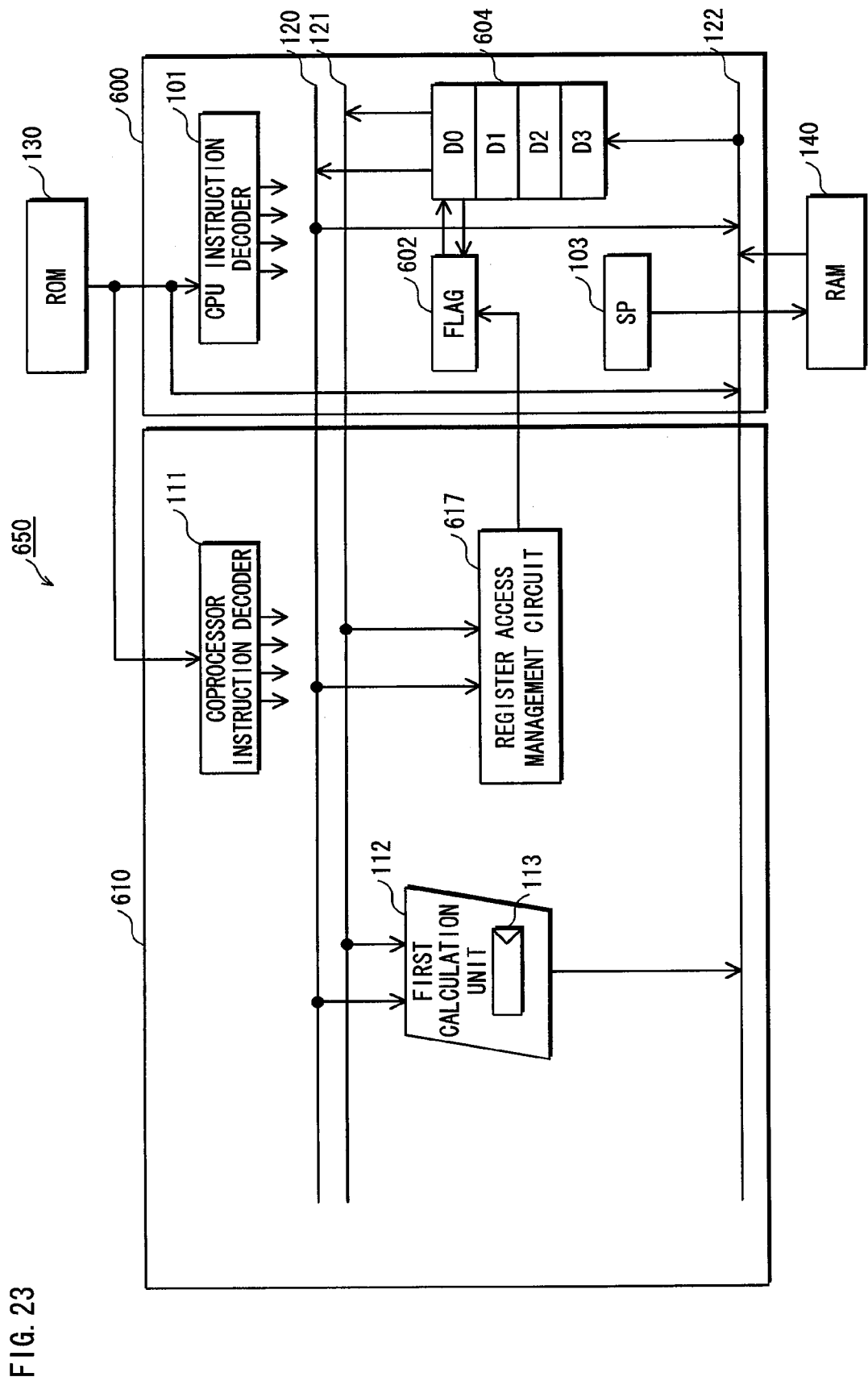
FIG. 23 is a block diagram showing the functional structure of an information processing apparatus 650 according to a sixth embodiment.

FIG. 23 is a block diagram showing the functional structure of an information processing apparatus 650 according to the sixth embodiment.

The information processing apparatus 650 includes, as shown in FIG. 23, a ROM 130, a RAM 140, a CPU 600, and a coprocessor 610.

The CPU 600 includes a CPU instruction decoder 101, a flag register 602, a stack pointer storage register 103, and a general register group 604.

The coprocessor 610 includes a coprocessor instruction decoder 111, a first calculation unit 112, a first calculation result storage register 113, and a register access management circuit 617.

The above first embodiment has the structure in which calculation result flags of the first calculation unit 112 and the second calculation unit 114 are output via the OR circuit 118. This structure is omitted in description and drawing of the sixth embodiment because of not being a characteristic of the sixth embodiment.

Also, the functional units in the sixth embodiment having the same names and reference numerals as those in the first embodiment or the second embodiment perform the same functions as those in the first embodiment or the second embodiment. Therefore, descriptions thereof are omitted.

The register access management circuit 617 manages information of whether data is stored in the first calculation result storage register 113, based on whether the first calculation unit 112 has performed a calculation. Specifically, when the coprocessor instruction decoder 111 decodes an instruction for the first calculation unit 112 to perform a calculation, the register access management circuit 617 stores therein information indicating that the calculation has been performed. Also, when the coprocessor instruction decoder 111 decodes the instruction "GETACX Dm,Dn", the register access management circuit 617 updates the information stored therein indicating that the calculation has been performed, to information indicating that no calculation has been performed, and stores therein the updated information. When the first calculation unit 112 has performed a calculation, the register access management circuit 617 stores therein a value "1". When the first calculation unit 112 has not performed a calculation, the register access management circuit 617 stores therein a value "0".

<Command>

Instructions used in the sixth embodiment are described.

<Extended Calculation Instruction>

FIG. 24 is a list showing an example of mnemonics of coprocessor instructions to be read from the ROM 130 by the CPU 600 and the coprocessor 610 and operations of the CPU 600 and operations of the coprocessor 610 corresponding to the mnemonics.

<Instruction "GETACX Dm,Dn">

The CPU 600 and the coprocessor 610 read an instruction "GETACX Dm,Dn" from the ROM 130, and execute the read instruction "GETACX Dm,Dn". Basically, when the instruction "GETACX Dm,Dn" is executed, data is acquired in the same way as in the first embodiment. Accordingly, a description thereof is omitted, and parts different from the first embodiment, that is, the operations of the register access management circuit 617 in the execution of the instruction "GETACX Dm,Dn" are described.

In accordance with a control signal output by the coprocessor instruction decoder 111 based on the instruction "GETACX Dm,Dn", the register access management circuit 617 clears register access information stored therein to be a value "0". The register access management circuit 617 outputs the register access information (the value "0" here) to the CPU 600.

Then, the flag register 602 stores, as a calculation result flag, the register access information output by the coprocessor 610.

<CPU Execution Instruction>

FIG. 25 is a list showing an example of mnemonics of instructions to be used by the CPU 600 for saving/restoring data to/from the RAM 140 and operations of the CPU 600 corresponding to the mnemonics. The operations for executing instructions "MOV Flag,Dn" and "MOV Dm,Flag" are described below.

<Instruction "MOV Flag,Dn">

The CPU reads the instruction "MOV Flag,Dn" from the ROM 130, and executes the read instruction "MOV Flag,Dn". The instruction "MOV Flag,Dn" is an instruction for storing, in the general register group 604, a flag value stored in the flag register 602.

The CPU instruction decoder 101 decodes the instruction "MOV Flag,Dn", and outputs a control signal to each circuit included in the CPU 600. The flag register 602 outputs a flag value stored therein to the general register group 604. The CPU 600 stores, in the n-th register of the general register group 604, the flag value output by the flag register 602.

<Instruction "MOV Dm,Flag">

The CPU 600 reads the instruction "MOV Dm, Flag" from the ROM 130, and executes the read instruction "MOV Dm, Flag". The instruction "MOV Dm,Flag" is an instruction for the CPU 600 to rewrite a value stored in the flag register 602.

The CPU instruction decoder 101 decodes the instruction "MOV Dm,Flag", and outputs a control signal to each circuit included in the CPU 600. The m-th register of the general register group 604 outputs a value stored therein to the flag register 602. The flag register 602 stores therein the value output by the general register group 604.

<Operations>

Figure 26:
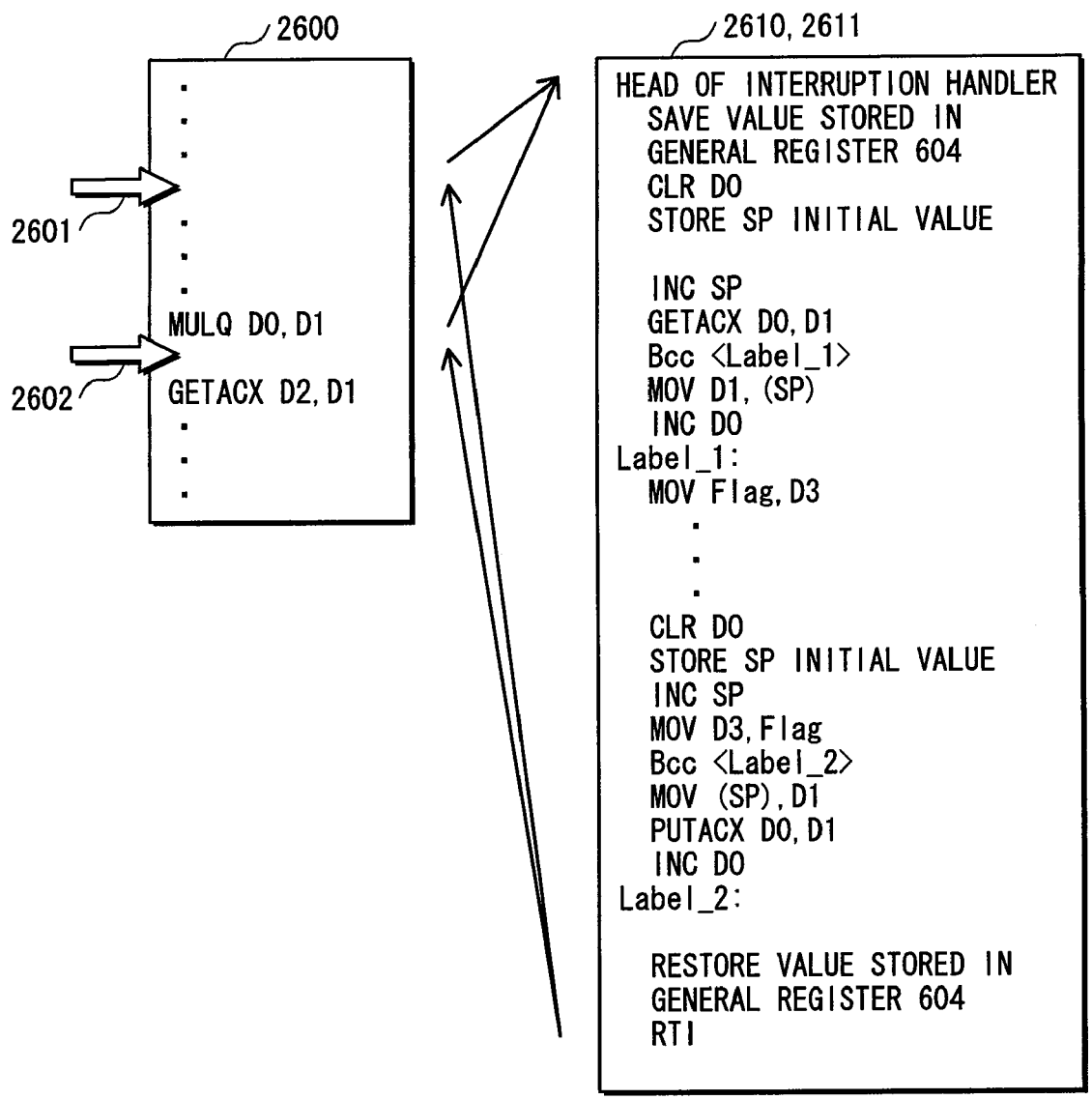
FIG. 26 shows an instruction sequence representing an example of an assembler program according to the sixth embodiment.

FIG. 26 shows an instruction sequence representing an example of an assembler program when an interruption occurs, with use of FIGS. 2, 3, 8, 12, 13, 17, 21, 24, and 25. The operations for executing the instruction sequence are described below. Arrows 2601 and 2602 shown in FIG. 26 each indicate a timing when an interruption occurs.

The CPU 600 executes an instruction sequence 2600 that is normal processing stored in the ROM 130.

An interruption occurs, and the CPU 600 executes an instruction at a head of an interruption handler 2610 in accordance with the timing indicated by the arrow 2601. At this time, no coprocessor instruction is executed.

The CPU 600 saves, to the RAM 140, a value stored in the general register group 604 included in the instruction sequence 2610 of the interruption handler.

The CPU 600 reads the instruction "CLR D0" from the ROM 130, and executes the read instruction "CLR D0". As a result, the CPU 600 stores a value "0" in the zeroth register of the general register group 604.

The CPU 600 stores, as an SP initial value, in the RAM 140, an address value stored in the stack pointer storage register 103 at that time.

The CPU 600 reads the instruction "INC SP" from the ROM 130, and executes the read instruction "INC SP". As a result, the CPU 600 increments the address value stored in the stack pointer storage register 603 by the constant value, and stores the incremented address value in the stack pointer storage register 603.

The CPU 600 reads the instruction "GETACX D0,D1" from the ROM 130, and executes the read instruction "GETACX D0,D1". The CPU 600 stores, in the first register of the general register group 604, a value stored in the first calculation result storage register 113. Also, the CPU 600 stores, in the flag register 602, a register access information value "0" stored in the register access management circuit 617.

The CPU 600 reads the instruction "Bcc <Label__1>" from the ROM 130, and executes the read instruction "Bcc <Label__1>". The value stored in the flag register 602 is "0". Accordingly, the CPU 600 branches the processing to <Label__1>.

The CPU 600 reads the instruction "MOV Flag,D3" from the ROM 130, and stores, in the third register of the general register group 604, the value "0" stored in the flag register 602.

After completing the execution of the instruction sequence 2610 of the interruption handler, the CPU 600 reads the instruction "CLR D0" from the ROM 130, and executes the read instruction "CLR D0". As a result, the CPU 600 stores a value "0" in the zeroth register of the general register group 604.

The CPU 600 reads the SP initial value from the RAM 140, and writes the read SP initial value into the stack pointer storage register 103.

The CPU 600 reads the instruction "INC SP" from the ROM 130, and executes the read instruction "INC SP". As a result, the CPU 600 increments the address value stored in the stack pointer storage register 103 by the constant value, and stores the incremented address value in the stack pointer storage register 103.

The CPU 600 reads the instruction "MOV D3, Flag" from the ROM 130, and writes, into the flag register 602, the value "0" stored in the third register.

The CPU 600 reads the instruction "Bcc <Label__2>" from the ROM 130, and executes the read instruction "Bcc <Label__2>". The value stored in the flag register 602 is "0". Accordingly, the CPU 600 branches the processing to <Label__2>.

The CPU 600 restores, to the general register group 604, a value that has been saved to the RAM 140.

The CPU 600 reads the instruction "RTI" from the ROM 130, and executes the read instruction "RTI". As a result, the CPU 600 executes an instruction included in the instruction sequence 2600 that is the normal processing.

The CPU 600 executes the instruction sequence 2600 that is the normal processing that is stored in the ROM 130.

The CPU 600 reads the instruction "MULQ D0,D1" from the ROM 130, and executes the read instruction "MULQ D0,D1". As a result, the first calculation unit 112 stores the higher bits of a multiplication result in the first calculation result storage register 113. Also, the CPU 600 stores the lower bits of the multiplication result in the first register of the general register group 604, stores a calculation result flag in the flag register 602, and sets a value "1" as the register access information.

After executing the above instruction "MULQ D0,D1", an interruption occurs. The CPU 600 executes an instruction at a head of an instruction sequence 2611 of an interruption handler.

The CPU 600 saves, to the RAM 140, a value stored in the general register group 604 in the instruction sequence 2611 of the interruption handler.

The CPU 600 reads the instruction "CLR D0" from the ROM 130, and executes the read instruction "CLR D0". As a result, the CPU 600 stores a value "0" in the zeroth register of the general register group 604.

The CPU 600 reads the instruction "INC SP" from the ROM 130, and executes the read instruction "INC SP". As a result, the CPU 600 increments the address value stored in the stack pointer storage register 103 by the constant value, and stores the incremented address value in the stack pointer storage register 103.

The CPU 600 reads the instruction "GETACX D0,D1" from the ROM 130, and executes the read instruction "GETACX D0,D1". As a result, the CPU 600 stores, in the first register of the general register group 604, the value stored in the first calculation result storage register 113. Also, the CPU 600 stores, in the flag register 602, the register access information value "1" stored in the register access management circuit 617.

The CPU 600 reads the instruction "Bcc <Label__1>" from the ROM 130, and executes the read instruction "Bcc <Label__1>". The value stored in the flag register 602 is "1". Accordingly, the CPU 600 does not branch the processing to <Label__1>.

The CPU 600 reads the instruction "MOV D1, (SP)" from the ROM 130, and executes the read instruction "MOV D1, (SP)". As a result, the CPU 600 writes, into an address of the RAM 140 specified by the address value stored in the stack pointer storage register 103, the value stored in the first register of the general register group 604.

The CPU 600 reads the instruction "INC D0" from the ROM 130, and executes the read instruction "INC D0". As a result, the CPU 600 increments the value stored in the zeroth register of the general register group 604 by 1, and stores the incremented value in the zeroth register.

The CPU 600 reads the instruction "MOV Flag,D3" from the ROM 130, and stores, in the third register of the general register group 604, the value "1" stored in the flag register 602.

After completing the execution of the instruction sequence 2611 of the interruption handler, the CPU 600 reads the instruction "CLR D0" from the ROM 130, and executes the read instruction "CLR D0". As a result, the CPU 600 stores a value "0" in the zeroth register of the general register group 604. Also, the CPU 600 reads the SP initial value from the RAM 140, and writes the read SP initial value into the stack pointer storage register 103.

The CPU 600 reads the instruction "INC SP" from the ROM 130, and executes the read instruction "INC SP". As a result, the CPU 600 increments the address value stored in the stack pointer storage register 103 by the constant value, and stores the incremented address value in the stack pointer storage register 103.

The CPU 600 reads the instruction "MOV D3,Flag" from the ROM 130, and writes, into the flag register 602, the value "1" stored in the third register of the general register group 604.

The CPU 600 reads the instruction "Bcc <Label__2>" from the ROM 130, and executes the read instruction "Bcc <Label__2>". The value stored in the flag register 602 is "1". Accordingly, the CPU 600 does not branch the processing to <Label__2>.

The CPU 600 reads the instruction "MOV (SP),D1" from the ROM 130, and executes the read instruction "MOV (SP), D1". As a result, the CPU 600 reads, to the first register of the general register group 604, a value stored in an address specified by the address value stored in the stack pointer storage register 103 of the RAM 140.

The CPU 600 reads the instruction "PUTACX D0,D1" from the ROM 130, and executes the read instruction "PUTACX D0,D1". As a result, the first calculation unit 112 stores, in the first calculation result storage register 113, the value stored in the first register of the general register group 604.

The CPU 600 reads the instruction "INC D0" from the ROM 130, and executes the read instruction "INC D0". As a result, the CPU 600 increments the value stored in the zeroth register of the general register group 604 by 1, and stores the incremented value in the zeroth register.

The CPU 600 restores, to the general register group 604, the value that has been saved to the RAM 140.

The CPU 600 reads the instruction "RTI" from the ROM 130, and executes the read instruction "RTI". As a result, the CPU 600 executes an instruction included in the instruction sequence 2600 that is the normal processing, and executes the instruction "GETACX D2,D1".

As have been described, the information processing apparatus 650 according to the sixth embodiment determines whether to save data depending on whether an extended calculation has been actually performed in the coprocessor. When no extended calculation has been performed in the coprocessor, or when an extended calculation has been performed in the coprocessor and then data is acquired from a register, it is not necessary to save data when an interruption occurs. In such a case, the information processing apparatus can omit processing for saving data.

Seventh Embodiment

The sixth embodiment has described that whether to save data from a register is determined based on whether a calculation has been performed in the coprocessor. A seventh embodiment, which is a modification of the sixth embodiment, describes a case where a plurality of calculation units are implemented in the coprocessor, and whether to save data is determined for each register.

<Structure>

Figure 27:
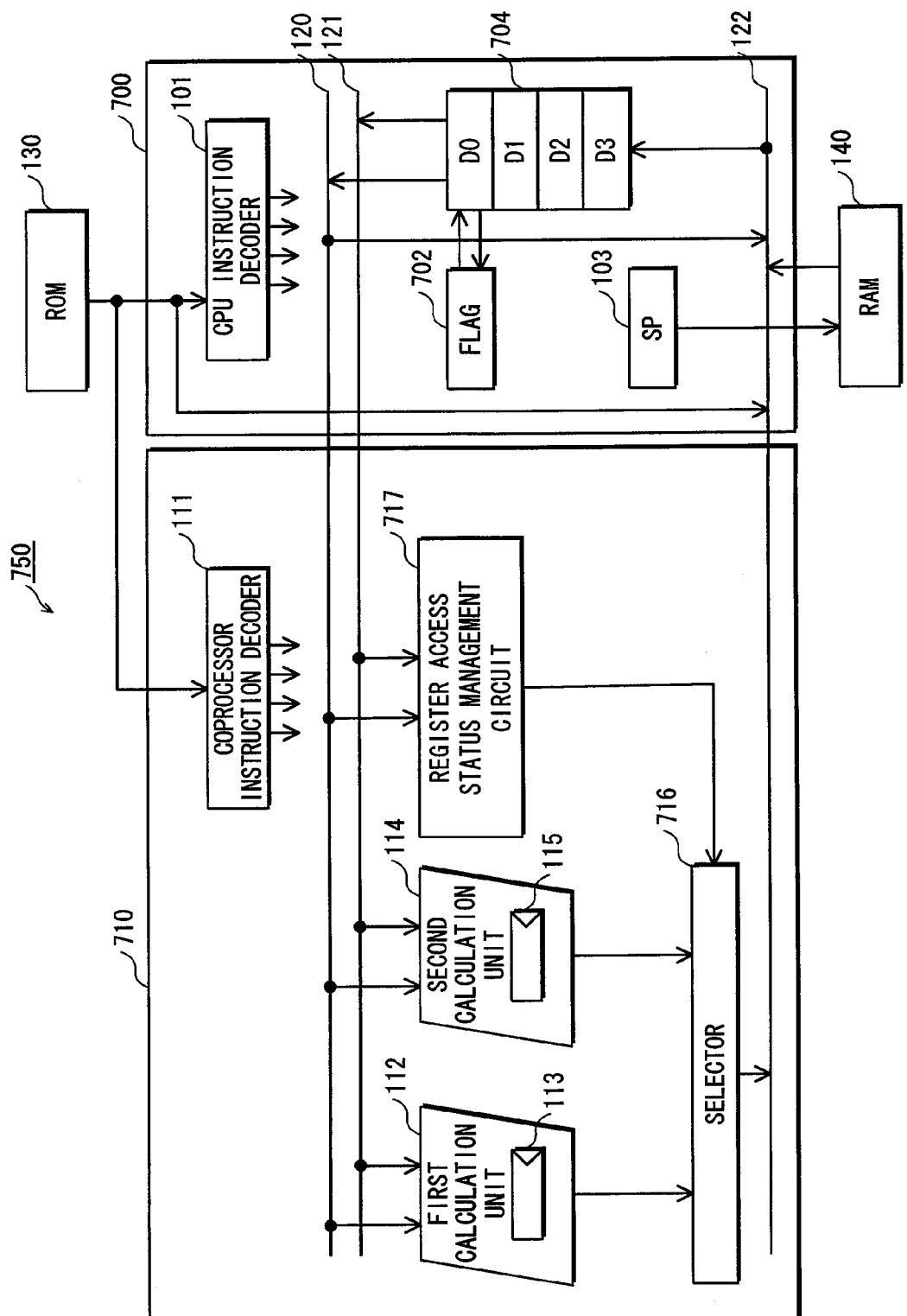
FIG. 27 is a block diagram showing the functional structure of an information processing apparatus 750 according to a seventh embodiment.
Figure 29:
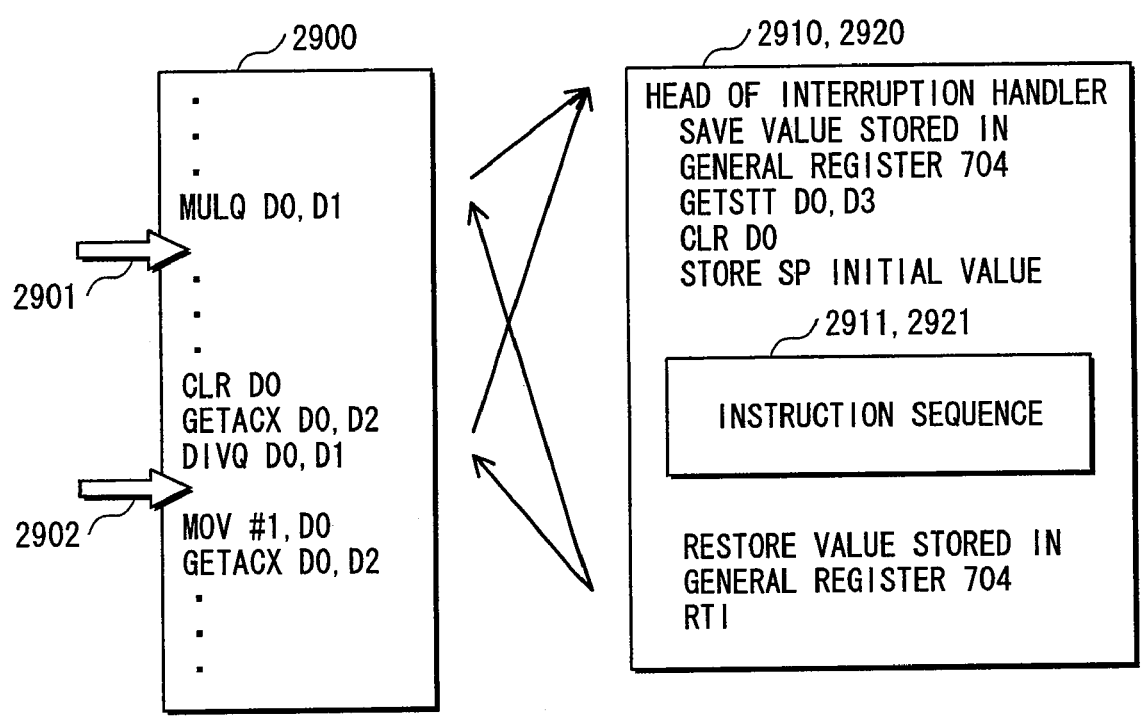
FIG. 29 shows an instruction sequence representing an example of an assembler program according to the seventh embodiment.

FIG. 27 is a block diagram showing the functional structure of an information processing apparatus 750 according to the seventh embodiment.

The information processing apparatus 750 includes, as shown in FIG. 27, a ROM 130, a RAM 140, a CPU 70b, and a coprocessor 710.

The CPU 700 includes a CPU instruction decoder 101, a flag register 702, a stack pointer storage register 103, and a general register group 704.

The coprocessor 710 includes a coprocessor instruction decoder 111, a first calculation unit 112, a first calculation result storage register 113, and a second calculation unit 114, a second calculation result storage register 115, a selector 716, and a register access status management circuit 717.

The above first embodiment has the structure in which calculation result flags of the first calculation unit 112 and the second calculation unit 114 are output via the OR circuit 118. This structure is omitted in description and drawing of the seventh embodiment because of not being a characteristic of the seventh embodiment.

Also, the functional units in the seventh embodiment having the same names and reference numerals as those in the first embodiment perform the same functions as those in the first embodiment. Therefore, descriptions thereof are omitted.

The register access status management circuit 717 manages calculation performance information of whether a calculation has been performed in each calculation unit of the coprocessor and data relating to the calculation is stored in a register corresponding to the calculation unit. In accordance with a control signal output by the coprocessor instruction decoder 111, the register access status management circuit 717 recognizes a calculation unit in which a calculation has been performed, and sets a bit value corresponding to the calculation unit to be "1". Also, when the instruction "GETACX Dm,Dn" is executed, the register access status management circuit 717 sets a bit value of the calculation unit corresponding to Dm to be "1". Furthermore, when the instruction "GETSTT Dm,Dn" is executed, the register access status management circuit 717 outputs calculation performance information stored therein to the selector 116. Moreover, when the instruction "PUTSTT Dm,Dn" is executed, the register access status management circuit 717 stores therein Dn as calculation performance information.

<Command>

The following describes various instructions according to the seventh embodiment.

<Extended Calculation Instruction>

FIG. 28 is a list showing an example of mnemonics of calculation instructions to be read from the ROM 130 by the CPU 700 and the coprocessor 710 and operations of the CPU 700 and operations of the coprocessor 710 corresponding to the mnemonics.

FIG. 28 is a list showing an example of mnemonics of coprocessor instructions to be read from the ROM 130 by a CPU 700 and a coprocessor 710 and operations of the CPU 700 and operations of the coprocessor 710 corresponding to the mnemonics.

The following describes the operations in the execution of the instructions "MULQ Dm,Dn", "DIVQ Dm,Dn", "GETACX Dm,Dn", "GETSTT Dm,Dn", and "PUTSTT Dm,Dn". Note that the instructions "MULQ Dm,Dn", "DIVQ Dm,Dn", and "GETACX Dm,Dn" are substantially the same as the instructions described in the first embodiment. Accordingly, only the operations of the register access status management circuit 717 in the execution of the instructions are described.

<Instruction "MULQ Dm,Dn">

Each of the circuits included in the coprocessor 710 performs a multiplication in accordance with the instruction "MULQ Dm,Dn", as described in the first embodiment. At this time, the register access status management circuit 717 detects that the first calculation unit 112 has performed a multiplication, and sets a bit "0" of calculation performance information to "1". Note that to set "1" on bit 0 means that "0b0000" is set to be "0b0001" or "0b1010" is set to be "0b1011".

<Instruction "DIVQ Dm,Dn">

Each of the circuits included in the coprocessor 710 performs a division in accordance with the instruction "DIVQ Dm,Dn", as described in the first embodiment. At this time, the register access status management circuit 717 detects that the second calculation unit 114 has performed a division, and sets a bit "0" of calculation performance information to "1". Note that to set "1" on bit 1 means that "0b0000" is set to be "0b0010" or "0b1001" is set to be "0b1011".

<Instruction "GETACX Dm,Dn">

The information processing apparatus 750 saves data stored in a register of the coprocessor 710, in accordance with the instruction "GETACX Dm,Dn". The operations of the register access status management circuit 717 in the following two cases are described below:

(1) a case where a value is read from the first calculation result storage register 113; and (2) a case where a value is read from the second calculation result storage register 115.

(1) Case where Value is Read from First Calculation Result Storage Register 113

The register access status management circuit 717 detects that a value stored in the first calculation result storage register 113 is read, and clears bit 0 of calculation performance information to be "0".

(2) Case where Value is Read from Second Calculation Result Storage Register 115

The register access status management circuit 717 detects that a value stored in the second calculation result storage register 115 is read, and clears bit 1 of calculation performance information to be "0".

<Instruction "GETSTT Dm,Dn">

The instruction "GETSTT Dm,Dn" is an instruction for the CPU 700 to acquire information indicating whether data is stored in each register.

The CPU 700 and the coprocessor 710 read the instruction "GETSTT Dm,Dn" from the ROM 130. The CPU instruction decoder 101 decodes the instruction "GETSTT Dm,Dn", and outputs a control signal to each circuit included in the CPU 700. Also, the coprocessor instruction decoder 111 decodes the instruction "GETSTT Dm,Dn", and outputs a control signal to each circuit included in the coprocessor 710.

The register access status management circuit 717 outputs calculation performance information stored therein to the selector 716. In accordance with the control signal output by the coprocessor instruction decoder 111, the selector 716 selects the value output by the register access status management circuit 717, and outputs the selected value to the data output bus 122.

The data output bus 122 transmits the calculation performance information to the general register group 704 of the CPU 700. The n-th register of the general register group 704 acquires the value of the data output bus 122, and stores therein the acquired value.

<Instruction "PUTSTT Dm,Dn">

The instruction "PUTSTT Dm,Dn" is an instruction for restoring access status information of each register saved in interruption, which has been stored in the register access status management circuit 717.

The CPU 700 and the coprocessor 710 read the instruction "PUTSTT Dm,Dn" from the ROM 130. The CPU instruction decoder 101 decodes the instruction "PUTSTT Dm,Dn", and outputs a control signal to each circuit included in the CPU 700. Also, the coprocessor instruction decoder 111 decodes the instruction "PUTSTT Dm,Dn", and outputs a control signal to each circuit included in the coprocessor 710.

The general register group 704 outputs Dm to the first data input bus 120, and outputs Dn to the second data input bus 121. The first data input bus 120 transmits Dm to the register access status management circuit 717 of the coprocessor 710. The register access status management circuit 717 stores therein, as calculation performance information, the value acquired via the first data input bus 120.

<Operations>

FIGS. 9 and 30 each show an instruction sequence representing an example of an assembler program with use of the instructions described in FIGS. 2, 3, 10, 14, 18, 21, 24, 25, and 28. The following describes the operations for executing the instruction sequence.

The CPU 700 executes an instruction sequence 2900 that is normal processing that is stored in the ROM 130.

The CPU 700 reads the instruction "MULQ D0,D1" from the ROM 130, and executes the read instruction "MULQ D0,D1". As a result, the first calculation unit 112 stores the higher bits of a multiplication result in the first calculation result storage register 113. Also, the CPU 700 stores the lower bits of the multiplication result in the first register of the general register group 704. Also, the register access status management circuit 717 detects that the first calculation unit 112 has performed the multiplication, and sets "1" on bit 0 of calculation performance information.

When an interruption occurs, the CPU 700 executes an instruction at a head of an instruction sequence 2910 of an interruption handler.

The CPU 700 saves, to the RAM 140, a value stored in the general register group 704 in the instruction sequence 2910 of the interruption handler.

The CPU 700 reads the instruction "GETSTT D0,D3" from the ROM 130, and executes the read instruction "GETSTT D0,D3". As a result, the CPU 700 writes, into the third register of the general register group 704, calculation performance information "0b0001" stored in the register access status management circuit 717.

The CPU 700 reads the instruction "CLR D0" from the ROM 130, and executes the read instruction "CLR D0". As a result, the CPU 700 stores a value "0" in the zeroth register of the general register group 704. The CPU 700 performs processing for storing an SP initial value, and then executes an instruction included in an instruction sequence 2911.

The CPU 700 reads the instruction "MOV D3,D2" from the ROM 130, and stores, in the second register of the general register group 704, the value "0b0001" stored in the third register of the general register group 704.

The CPU 700 reads the instruction "AND #0b0001,D2" from the ROM 130. The CPU 700 performs an AND of the value "0b0001" stored in the second register of the general register group 704 and a value "0b0001", and stores a calculation result value "0b0001" in the second register of the general register group 704.

The CPU 700 reads the instruction "MOV #0b0001,D1" from the ROM 130, and executes the read instruction "MOV #0b0001,D1". As a result, the CPU 700 stores a value "0b0001" in the first register of the general register group 704.

The CPU 700 reads the instruction "CMP D1,D2" from the ROM 130, and executes the read instruction "CMP D1,D2". As a result, D1 and D2 match each other. Accordingly, the CPU 700 writes a value "1" into the flag register 702.

The CPU 700 reads the instruction "Bcc <Label_1>" from the ROM 130, and executes the read instruction "Bcc <Label_1>". The value stored in the flag register 702 is "1". Accordingly, the CPU 700 does not branch the processing to <Label_1>.

The CPU 700 reads the instruction "INC SP" from the ROM 130, and executes the read instruction "INC SP". As a result, the CPU 700 increments the address value stored in the stack pointer storage register 103 by a constant value, and stores the incremented address value in the stack pointer storage register 103.

The CPU 700 reads the instruction "GETACX D0,D1" from the ROM 130, and executes the read instruction "GETACX D0,D1". As a result, the CPU 700 stores, in the first register of the general register group 704, the value stored in the first calculation result storage register 113.

The CPU 700 reads the instruction "MOV D1, (SP)" from the ROM 130, and executes the read instruction "MOV D1, (SP)". As a result, the CPU 700 writes, into the stack pointer storage register 103 of the EAM 140, the value stored in the first register of the general register group 704.

The CPU 700 reads the instruction "INC D0" from the ROM 130, and executes the read instruction "INC D0". As a result, the CPU 700 increments the value stored in the zeroth register of the general register group 704 by 1, and stores the incremented value in the zeroth register.

The CPU 700 reads the instruction "MOV D3,D2" from the ROM 130, and stores, in the second register of the general register group 704, the value "0b0001" stored in the third register of the general register group 704.

The CPU 700 reads the instruction "AND #0b0010,D2" from the ROM 130, and executes the read instruction "AND #0b0010,D2". As a result, the CPU 700 performs an AND of the value "0b0001" stored in the second register of the general register group 704 and a value "0b0010", and stores a calculation result value "0b0000" in the second register of the general register group 704.

The CPU 700 reads the instruction "MOV #0b0010,D1" from the ROM 130, and executes the read instruction "MOV #0b0010,D1". As a result, the CPU 700 stores a value "0b0010" in the first register of the general register group 704.

The CPU 700 reads the instruction "CMP D1,D2" from the ROM 130, and executes the read instruction "CMP D1,D2". As a result, D1 and D2 do not match each other. Accordingly, the CPU 700 writes a value "0" into the flag register 702.

The CPU 700 reads the instruction "Bcc <Label_2>" from the ROM 130, and executes the read instruction "Bcc <Label 2>". The value stored in the flag register 702 is "0". Accordingly, the CPU 700 branches the processing to <Label_2>.

The CPU 700 completes the execution of the instruction sequence 2210 of the interruption handler. The CPU 700 reads the instruction "MOV D3,D2" from the ROM 130, and stores, in the second register of the general register group 704, a value "0b0001" stored in the third register of the general register group 704.

The CPU 700 reads the instruction "AND #0b0001,D2" from the ROM 130, and executes the read instruction "AND #0b0001,D2". The CPU 700 performs an AND of the value "0b0001" stored in the second register of the general register group 704 and a value "0b0001", and stores a calculation result value "0b0001" in the second register of the general register group 704.

The CPU 700 reads the instruction "MOV #0b0001,D1" from the ROM 130, and executes the read instruction "MOV #0b0001,D1". As a result, the CPU 700 stores a value "0b0001" in the first register of the general register group 704.

The CPU 700 reads the instruction "CMP D1,D2" from the ROM 130, and executes the read instruction "CMP D1,D2". D1 and D2 match each other. Accordingly, the CPU 700 stores a value "1" in the flag register 702.

The CPU 700 reads the instruction "Bcc <Label_3>" from the ROM 130, and executes the read instruction "Bcc <Label 3>". The value stored in the flag register 702 is "1". Accordingly, the CPU 700 does not branch the processing to <Label 3>.

The CPU 700 reads the instruction "INC SP" from the ROM 130, and executes the read instruction "INC SP". As a result, the CPU 700 increments the address value stored in the stack pointer storage register 103 by the constant value, and stores the incremented address value in the stack pointer storage register 103.

The CPU 700 reads the instruction "MOV (SP),D1" from the ROM 130, and executes the read instruction "MOV (SP), D1". As a result, the CPU 700 reads a value stored in an address of the RAM 140 specified by the address value stored in the stack pointer storage register 103. Then, the CPU 700 stores the read value in the first register of the general register group 704.

The CPU 700 reads the instruction "PUTACX D0,D1" from the ROM 130, and executes the read instruction "PUTACX D0,D1". As a result, the first calculation unit 112 stores, in the first calculation result storage register 113, the value stored in the first register of the general register group 704.

The CPU 700 reads the instruction "INC D0" from the ROM 130, and executes the read instruction "INC D0". As a result, the CPU 700 increments the value stored in the zeroth register of the general register group 704 by 1, and stores the incremented value in the zeroth register.

The CPU 700 reads the instruction "MOV D3,D2" from the ROM 130, and writes, into the second register of the general register group 704, the value "0b0001" stored in the third register.

The CPU 700 reads the instruction "AND #0b0010,D2" from the ROM 130, and performs an AND of the value "0b0001" stored in the second register of the general register group 704 and a value "0b0010", and stores a calculation result value "0b0000" in the second register of the general register group 704.

The CPU 700 reads the instruction "MOV #0b0010,D1" from the ROM 130, and executes the read instruction "MOV #0b0010,D1". As a result, the CPU 700 stores a value "0b0010" in the first register of the general register group 704.

The CPU 700 reads the instruction "CMP D1,D2" from the ROM 130, and executes the read instruction "CMP D1,D2". As a result, D1 and D2 do not match each other. Accordingly, the CPU 700 writes a value "0" into the flag register 702.

The CPU 700 reads the instruction "Bcc <Label 4>" from the ROM 130, and executes the read instruction "Bcc <Label_4>". The value stored in the flag register 702 is "0". Accordingly, the CPU 700 branches the processing to <Label_4>.

The CPU 700 reads the instruction "PUTSTT D3,D0" from the ROM 130, and executes the read instruction "PUTSTT D3, D0". As a result, the register access status management circuit 717 stores therein the calculation performance information "0b001" which has been stored in the third register of the general register group 704.

The CPU 700 restores, to the general register group 704, the value that has been saved from the general register group 704 to the RAM 140.

The CPU 700 reads the instruction "RTI" from the ROM 130, and executes the read instruction "RTI". As a result, the CPU 700 executes an instruction included in the instruction sequence 2900 that is the normal processing.

The CPU 700 executes an instruction sequence that is normal processing stored in the ROM 130.

The CPU 700 reads the instruction "CLR D0" from the ROM 130, and executes the read instruction "CLR D0". As a result, the CPU 700 stores a value "0" in the zeroth register of the general register group 704.

The CPU 700 reads the instruction "GETACX D0,D1" from the ROM 130, and executes the read instruction "GETACX D0,D1". As a result, the CPU 700 stores, in the first register of the general register group 704, the value stored in the first calculation result storage register 113. Also, the register access status management circuit 717 clears bit 0 of the execution information stored therein, that is, sets bit 0 of the calculation performance information to be a value "0".

The CPU 700 reads the instruction "DIVQ D0,D1" from the ROM 130, and executes the read instruction "DIVQ D0,D1". As a result, the second calculation unit 114 stores a remainder of a division in the second calculation result storage register 115. Also, the CPU 700 stores a quotient of the division in the first register of the general register group 704. Also, the register access status management circuit 717 detects that the second calculation unit 114 has performed the division, and sets "1" on bit 1 of the calculation performance information.

When an interruption occurs, the CPU 700 executes an instruction at a head of an instruction sequence 2920 of an interruption handler.

The CPU 700 saves, to the RAM 140, the value stored in the general register group 704 included in the instruction sequence 2920 of the interruption handler.

The CPU 700 reads the instruction "GETSTT D0,D3" from the ROM 130, and executes the read instruction "GETSTT D0,D3". As a result, the CPU 700 stores, in the third register of the general register group 704, calculation performance information "0b0010" stored in the register access status management circuit 717.

The CPU 700 reads the instruction "CLR D0" from the ROM 130, and executes the read instruction "CLR D0". As a result, the CPU 700 stores a value "0" in the zeroth register of the general register group 704. Also, the CPU 700 performs processing for storing an SP initial value, and executes an instruction included in an instruction sequence 2921.

The CPU 700 reads the instruction "MOV D3,D2" from the ROM 130, stores, in the second register of the general register group 704, the value "0b0010" stored in the third register of the general register group 704.

The CPU 700 reads the instruction "AND #0b0001,D2" from the ROM 130, and performs an AND of the value "0b0010" stored in the second register of the general register group 704 and a value "0b0001", and stores a calculation result value "0b0000" in the second register of the general register group 704.

The CPU 700 reads the instruction "MOV #0b0001,D1" from the ROM 130, and executes the read instruction "MOV #0b0001,D1". As a result, the CPU 700 stores a value "0b0001" in the first register of the general register group 704.

The CPU 700 reads the instruction "CMP D1,D2" from the ROM 130, and executes the read instruction "CMP D1,D2". As a result, D1 and D2 do not match each other. Accordingly, the CPU 700 writes a value "0" into the flag register 702.

The CPU 700 reads the instruction "Bcc <Label_1>" from the ROM 130, and executes the read instruction "Bcc <Label_1>". The value stored in the flag register 702 is "0". Accordingly, the CPU 700 branches the processing to <Label_1>.

The CPU 700 reads the instruction "INC D0" from the ROM 130, and executes the read instruction "INC D0". As a result, the CPU 700 increments the value stored in the zeroth register of the general register group 704 by 1, and stores the incremented value in the zeroth register.

The CPU 700 reads the instruction "MOV D3,D2" from the ROM 130, and stores, in the second register of the general register group 704, the value "0b0010" stored in the third register of the general register group 704.

The CPU 700 reads the instruction "AND #0b0010,D2" from the ROM 130, and performs an AND of the value "0b0010" stored in the second register of the general register group 704 and a value "0b0010", and stores a calculation result value "0b0010" in the second register of the general register group 704.

The CPU 700 reads the instruction "MOV #0b0010,D1" from the ROM 130, and executes the read instruction "MOV #0b0010,D1". As a result, the CPU 700 stores the value "0b0010" in the first register of the general register group 704.

The CPU 700 reads the instruction "CMP D1,D2" from the ROM 130, and executes the read instruction "CMP D1,D2". As a result, D1 and D2 match each other. Accordingly, the CPU 700 writes a value "1" into the flag register 702.

The CPU 700 reads the instruction "Bcc <Label__2>" from the ROM 130, and executes the read instruction "Bcc <Label__2>". The value stored in the flag register 702 is "1". Accordingly, the CPU 700 does not branch the processing to <Label__2>.

The CPU 700 reads the instruction "INC SP" from the ROM 130, and executes the read instruction "INC SP". As a result, the CPU 700 increments the address value stored in the stack pointer storage register 103 by the constant value, and stores the incremented address value in the stack pointer storage register 103.

The CPU 700 reads the instruction "GETACX D0,D1" from the ROM 130, and executes the read instruction "GETACX D0,D1". As a result, the CPU 700 stores, in the first register of the general register group 704, the value stored in the second calculation result storage register 115.

The CPU 700 reads the instruction "MOV D1, (SP)" from the ROM 130, and executes the read instruction "MOV D1, (SP)". As a result, the CPU 700 stores, in an address specified by the address value stored in the stack pointer storage register 103, the value stored in the first register of the general register group 704.

Then, the CPU 700 executes an instruction sequence of an interruption handler that is to be actually executed.

After completing the execution of the instruction sequence of the interruption handler, the CPU 700 reads the instruction "MOV D3,D2" from the ROM 130, and stores, in the second register of the general register group 704, the value "0b0010" stored in the third register of the general register group 704.

The CPU 700 reads the instruction "AND #0b0001,D2" from the ROM 130, and performs an AND of the value "0b0010" stored in the second register of the general register group 704 and a value "0b0001". The CPU 700 stores a calculation result value "0b0000" in the second register of the general register group 704.

The CPU 700 reads the instruction "MOV #0b0001,D1" from the ROM 130, and executes the read instruction "MOV #0b0001,D1". As a result, the CPU 700 stores a value "0b0001" in the first register of the general register group 704.

The CPU 700 reads the instruction "CMP D1,D2" from the ROM 130, and executes the read instruction "CMP D1,D2". As a result, D1 and D2 do not match each other. Accordingly, the CPU 700 writes a value "0" into the flag register 702.

The CPU 700 reads the instruction "Bcc <Label__3>" from the ROM 130, and executes the read instruction "Bcc <Label__3>". As a result, the value stored in the flag register 702 is "0". Accordingly, the CPU 700 branches the processing to <Label__3>.

The CPU 700 reads the instruction "INC D0" from the ROM 130, and executes the read instruction "INC D0". As a result, the CPU 700 increments the value stored in the zeroth register of the general register group 704 by 1, and stores the incremented value in the zeroth register.

The CPU 700 reads the instruction "MOV D3,D2" from the ROM 130, and stores, in the second register of the general register group 704, the value "0b0010" stored in the third register of the general register group 704.

The CPU 700 reads the instruction "AND #0b0010,D2" from the ROM 130, and performs an AND of the value "0b0001" stored in the second register of the general register group 704 and a value "0b0010". The CPU 700 stores a calculation result value "0b0001" in the second register of the general register group 704.

The CPU 700 reads the instruction "MOV #0b0010,D1" from the ROM 130, and executes the read instruction "MOV #0b0010,D1". As a result, the CPU 700 stores a value "0b0010" in the first register of the general register group 704.

The CPU 700 reads the instruction "CMP D1,D2" from the ROM 130, and executes the read instruction "CMP D1,D2". As a result, D1 and D2 match each other. Accordingly, the CPU 700 writes a value "1" into the flag register 702.

The CPU 700 reads the instruction "Bcc <Label 4>" from the ROM 130, and executes the read instruction "Bcc <Label 4>". The value stored in the flag register 702 is "1". Accordingly, the CPU 700 does not branch the processing to <Label__4>.

The CPU 700 reads the instruction "INC SP" from the ROM 130, and executes the read instruction "INC SP". As a result, the CPU 700 increments the address value stored in the stack pointer storage register 103 by the constant value, and stores the incremented address value in the stack pointer storage register 103.

The CPU 700 reads the instruction "MOV (SP),D1" from the ROM 130, and executes the read instruction "MOV (SP) D1". As a result, the CPU 700 reads, to the first register of the general register group 704, a value stored in an address specified by the address value stored in the stack pointer storage register 103 of the RAM 140.

The CPU 700 reads the instruction "PUTACX D0,D1" from the ROM 130, and executes the read instruction "PUTACX D0,D1". As a result, the second calculation unit 114 stores, in the second calculation result storage register 115, the value stored in the first register of the general register group 704. The CPU 700 reads the instruction "PUTSTT D3,D0" from the ROM 130, and executes the read instruction "PUTSTT D3,D0". As a result, the register access status management circuit 717 stores therein, the calculation performance information "0b0010" stored in the third register of the general register group 704.

The CPU 700 restores, to the general register group 704, the value that has been saved to the RAM 140. The CPU 700 reads the instruction "RTI" from the ROM 130, and executes the read instruction "RTI". As a result, the CPU 700 executes an instruction included in the instruction sequence that is the normal processing.

The CPU 700 executes the instruction sequence 2900 that is the normal processing that is stored in the ROM 130.

The CPU 700 reads the instruction "MOV #1,D1" from the ROM 130, and executes the read instruction "MOV #1,D1".

As a result, the CPU 700 stores a value "1" in the first register of the general register group 704.

The CPU 700 reads the instruction "GETACX D0,D1" from the ROM 130, and executes the read instruction "GETACX D0,D1". As a result, the CPU 700 stores, in the first register of the general register group 704, the value stored in the second calculation result storage register 115. The register access status management circuit 717 clears bit 1 of the calculation performance information stored therein.

As have been described, in the seventh embodiment, the register access status management circuit recognizes whether each register stores therein data. Furthermore, when an interruption occurs, information indicating an access status for each register is transmitted from the coprocessor to the CPU. Accordingly, based on the transmitted information, the CPU can output register information for specifying a register to the first data input bus 120. In other words, since data is saved from only a register in which data has been stored. Compared with a case where processing for saving data from a register, in which no data is stored is performed, overhead can be reduced.

<Modifications>

Although the present invention has been described based on the above embodiments, the present invention is not of course limited to the embodiments, and further includes the following modifications. The following describes the modifications of the information processing apparatus.

(1) In the above embodiments, each of the calculation units stores therein data relating to a calculation. Each of the calculation units outputs a value stored in a register included therein, or stores therein given data and calculated data. Instead of this structure, a structure shown in FIG. 31 may be employed.

Figure 31:
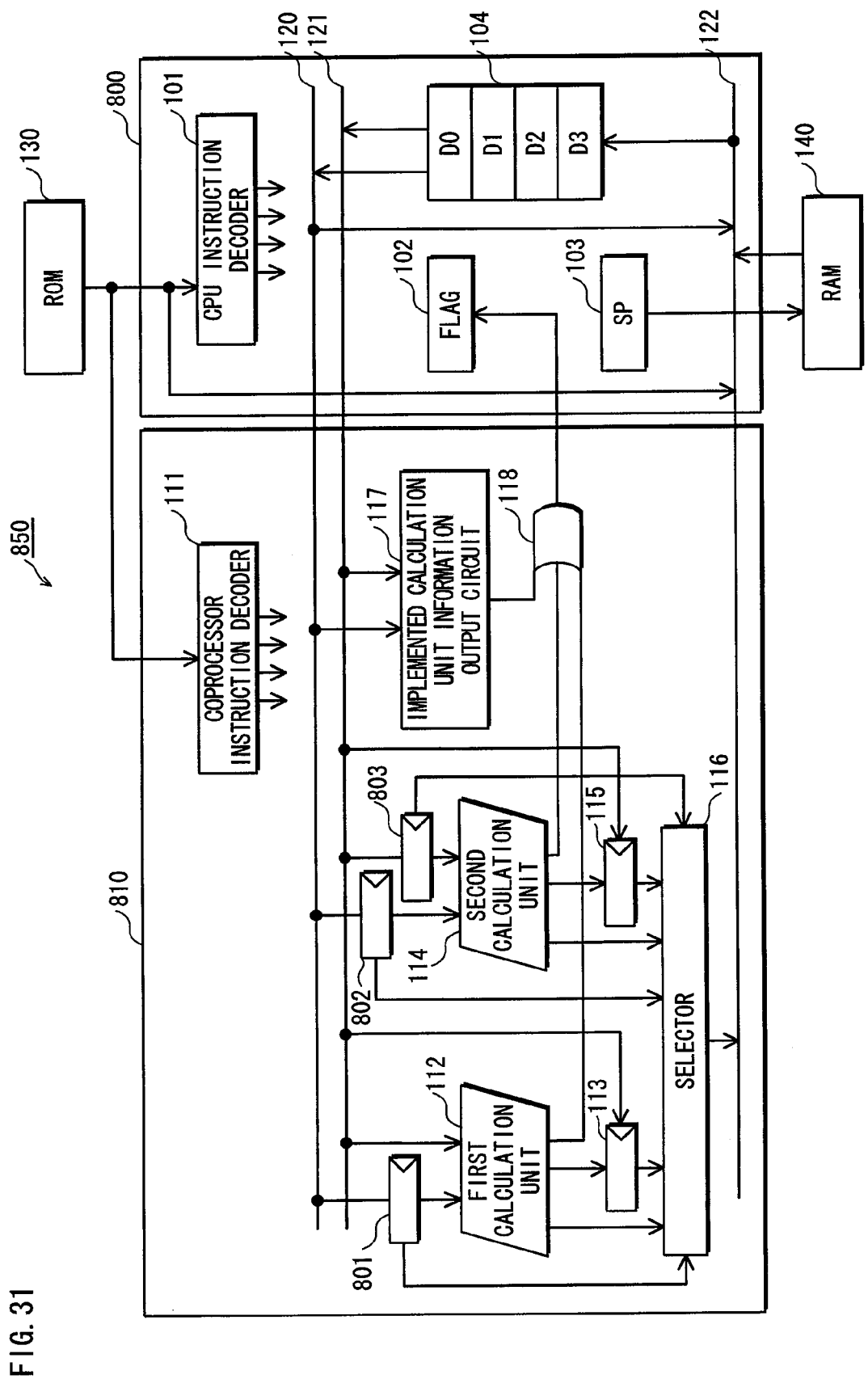
FIG. 31 is a block diagram showing an example functional structure of an information processing apparatus that does not relate to the embodiments.

An information processing apparatus 850 includes, as shown in FIG. 31, a ROM 130, a RAM 140, a CPU 800, and a coprocessor 810.

The CPU 800 includes a CPU instruction decoder 101, a flag register 102, a stack pointer storage register 103, and a general register group 104.

The coprocessor 810 includes a coprocessor instruction decoder 111, a first calculation unit 112, a first calculation result storage register 113, a second calculation unit 114, a second calculation result storage register 115, a selector 116, an implemented calculation unit information output circuit 117, an OR circuit 118, a first calculation input data storage register 801, and second calculation input data storage registers 802 and 803.

The functional units of the information processing apparatus 850 operate basically in the same way as those described in the first embodiment. However, unlike the structure of the information processing apparatus 150 according to the first embodiment, the information processing apparatus 850 has a structure in which each calculation unit does not include therein a register for storing data relating to a calculation.

Also, instead of each the calculation units, the coprocessor instruction decoder 111 may output data from each of the registers of the coprocessor 810, and store therein the output data.

In this way, each of the information processing apparatuses according to the above embodiments may have a structure in which each of the calculation units does not include therein a register.

(2) The above embodiments has shown the example in which when a value equivalent to the count of calculation units implemented in the coprocessor is input, the implemented calculation unit information output circuit 117 outputs a value "1". However, the same effect can be achieved by outputting a value "1" when a value greater than the count of calculation units implemented in the coprocessor is input.

(3) In the above embodiments, each of the information processing apparatuses has been described as a 32-bit microcomputer. Instead of the 32-bit microcomputer, a 64-bit microcomputer may be employed, for example.

(4) In the above embodiments, when data is stored after completion of interruption processing in accordance with the instruction "PUTACX D0,D1", the data is firstly stored in the first calculation result storage register 113, and then stored in the second calculation result storage register 115.

Alternatively, the data may be firstly stored in the second calculation result storage register 115, and then stored in the first calculation result storage register 113. In this case, the following structure may be employed. The zeroth register of the general register group 104 stores therein a value at a time when the flag register 102 is set to be "1". When the instruction "PUTACX, Dm,Dn" is executed, the value is decremented one by one until the value reaches "0".

(5) In the above embodiments, the two data input buses and the data output bus have been described as separate buses. However, a single bus that functions as these buses may be used if the information processing apparatus has a structure in which to which functional unit each piece of data on the bus is to be transmitted can be recognized, for example, an identifier is applied as a header of data.

What is claimed is:

1. An information processing apparatus that comprises a CPU that sequentially decodes and executes instructions included in an instruction sequence to perform calculations, and a coprocessor that is connected with the CPU via a first bus and a second bus, includes one or more registers for storing therein data relating to the calculations, decodes any of the instructions that is being decoded by the CPU in parallel with the CPU, performs a calculation relating to the any of the instructions based on data output from the CPU to the first bus, and outputs a result of the calculation to the second bus, the CPU including an information acquisition unit operable to, if an instruction to be decoded is an acquisition instruction for acquiring data stored in any of the registers, output a piece of register information designating the any of the registers to the first bus, and acquire the data stored in the any of the registers via the second bus, and the coprocessor including:

a saving register specification unit operable to, if an instruction to be decoded is the acquisition instruction, acquire the piece of register information via the first bus, and specify, based on the acquired piece of register information, the register from which the data is to be saved; and a data output unit operable to output, to the second bus, the data stored in the register specified by the saving register specification unit.

2. The information processing apparatus of claim 1, further including a signal line for outputting, from the coprocessor to the CPU, a flag in accordance with the result of the calculation performed by the coprocessor, wherein the CPU further includes a holding unit operable to hold therein a flag, receive a flag indicating whether the data has been saved, from the coprocessor via the signal line, and replace the flag held therein with the received flag, the information acquisition unit outputs, as the piece of register information, a register number for designating the register to the first bus, with incrementing the register number by 1 at every output, the coprocessor further includes an output unit operable to compare a total count of registers from which data is to be saved with a register number output to the first bus, and, if the register number is no less than the total count, output the flag indicating that the data has been saved, and when the flag held in the holding unit indicates that the data has been saved, the information acquisition unit stops outputting the register number to the first bus.

3. The information processing apparatus of claim 2, wherein the first bus is composed of at least a first input bus and a second input bus each for transmitting a different type of data, the CPU further includes:

a recording unit operable to sequentially record, to every N-th storage address value of a memory that is connected to the CPU, the data acquired by the information acquisition unit via the second bus, the N being a predetermined value; and a restoration direction unit operable to, if an instruction to be decoded is a restoration instruction for restoring the data that has been saved, read the data from the memory, output the read data to the first input bus, and output the register number for designating the register to the second input bus, and the coprocessor further includes:

a restoration register specification unit operable to, if an instruction to be decoded is the restoration instruction, acquire the register number via the second input bus, and specify, based on the acquired register number, the register from which the data has been saved; and a restoration unit operable to restore, to the register specified by the restoration register specification unit, the data acquired via the first input bus.

4. The information processing apparatus of claim 1, wherein the coprocessor further includes:

a first register count storage unit operable to store therein a total count of the registers;

a register count output unit operable to output the total count to the CPU via the second bus, the CPU further includes a second register count storage unit operable to store therein the total count that has been output by the first register count output unit, the information acquisition unit sequentially outputs, as the piece of register information, a register number for designating the any of the registers, to the first bus, with incrementing the register number by 1 at every output, and when the register number matches the total count stored in the second register count storage unit, the information acquisition unit stops outputting the register number to the first bus.

5. The information processing apparatus of claim 4, wherein the CPU further includes:

a recording unit operable to sequentially record, to every N-th storage address value of a memory that is connected to the CPU, the data acquired by the information acquisition unit via the second bus, the N being a predetermined value; and a restoration direction unit operable to, if an instruction to be decoded is a restoration instruction for restoring the data recorded in the memory, sequentially output, from every N-th storage address value of the memory to the first bus, the data stored in the memory and the register number for designating the any of the registers, and the coprocessor further includes a restoration unit operable to, if an instruction to be decoded is the restoration instruction, restore the output data to the register specified by the saving register specification unit.

6. The information processing apparatus of claim 5, wherein when the information processing apparatus is reset, the first register count output unit outputs the total count to the CPU.

7. The information processing apparatus of claim 1, wherein the coprocessor includes a calculation unit information output unit operable to output calculation unit information indicating a type of one or more calculation units that are implemented in the coprocessor, the CPU further includes:

a calculation unit information storage unit operable to store therein the calculation unit information; and a determination unit operable to determine, based on the calculation unit information, a piece of register information to be output, and the information acquisition unit outputs, to the first bus, the piece of register information determined by the determination unit.

8. The information processing apparatus of claim 7, wherein the CPU further includes:

a recording unit operable to sequentially record, to every N-th storage address value of a memory that is connected to the CPU, the data acquired by the information acquisition unit via the second bus, the N being a predetermined value; and a restoration direction unit operable to, if an instruction to be decoded is a restoration instruction for restoring the data that has been saved, read the data from the memory, and output the read data and the register number for designating the register to the first bus, and the coprocessor further includes:

a restoration register specification unit operable to, if an instruction to be decoded is the restoration instruction, acquire the register number via the first bus, and specify, based on the acquired register number, the register from which the data has been saved; and a restoration unit operable to restore, to the register specified by the saving register specification unit, the data acquired via the first bus.

9. The information processing apparatus of claim 7, wherein when the information processing apparatus is reset, the calculation unit information output unit outputs the calculation unit information to the CPU.

10. The information processing apparatus of claim 2, wherein when an interruption occurs while processing is being performed, the information processing apparatus executes the acquisition instruction, the interruption having an interruption level corresponding to processing to be performed in the interruption, the coprocessor further includes:

a determination unit operable to determine a count of registers from which data is to be saved, in accordance with the interruption level; and a level correspondence determination unit operable to determine, in accordance with the acquisition instruction, any of the registers from which the data is to be output based on the determined count, and when the determined count of the registers matches a register number output to the first bus, the data output unit outputs the flag indicating that the data has been saved.

11. The information processing apparatus of claim 10, wherein the CPU further includes:

a recording unit operable to sequentially record, to every N-th storage address value of a memory that is connected to the CPU, the data acquired by the information acquisition unit via the second bus, the N being a predetermined value; and a restoration direction unit operable to, if an instruction to be decoded is a restoration instruction for restoring the data that has been saved, read the data from the memory, output the read data and the register number for designating the register to the input bus, and the coprocessor further includes:

a restoration register specification unit operable to, if an instruction to be decoded is the restoration instruction, acquire the register number via the first bus, and specify, based on the acquired register number, the register from which the data has been saved; and a restoration unit operable to restore, to the register specified by the restoration register specification unit, the data acquired via the first bus.

12. The information processing apparatus of claim 1, wherein the coprocessor is operable to execute a first task and a second task by switching between the first task and the second task, the coprocessor further includes an interruption request unit operable to, when the first task that is being executed is switched to the second task and data relating to a calculation performed in the first task is stored in any of the registers, request the CPU to cause an interruption, in response to the interruption request, the CPU causes an interruption, and when the CPU causes the interruption, the CPU and the coprocessor execute the acquisition instruction.

13. The information processing apparatus of claim 2, wherein the coprocessor further includes:

a calculation performance information storage unit operable to store therein calculation performance information indicating whether a calculation has been performed; and a calculation performance information output unit operable to, when the acquisition instruction is decoded, output the calculation performance information to the CPU, when the CPU decodes the acquisition instruction and the calculation performance information indicates that a calculation has been performed in the coprocessor, the CPU acquires data from any of the registers, and when the CPU decodes the acquisition instruction and the calculation performance information does not indicate that a calculation has been performed in the coprocessor, the CPU does not acquire data from any of the registers.

14. The information processing apparatus of claim 13, wherein the calculation performance information storage unit further stores therein register correspondence calculation performance information indicating whether each of the registers stores therein data relating to a calculation, the coprocessor further includes a register correspondence calculation performance information output unit operable to output the register correspondence calculation performance information to the CPU, and when the CPU decodes the acquisition instruction, the CPU outputs a register number for specifying any of the registers to the first bus, based on the output register correspondence calculation performance information.

15. The information processing apparatus of claim 13, wherein the CPU further includes:

a recording unit operable to sequentially record, to every N-th storage address value of a memory that is connected to the CPU, the data acquired by the information acquisition unit via the second bus, the N being a predetermined value; and a restoration direction unit operable to, if an instruction to be decoded is a restoration instruction for restoring the data that has been saved, read the data from the memory, output the read data and the register number for designating the register to the first bus, and the coprocessor further includes:

a restoration register specification unit operable to, if an instruction to be decoded is the restoration instruction, acquire the register number via the first bus, and specify, based on the acquired register number, the register from which the data has been saved; and a restoration unit operable to restore, to the register specified by the restoration register specification unit, the data acquired via the first bus.

* * * * *